(12) United States Patent
Han et al.

(10) Patent No.: US 11,157,168 B2
(45) Date of Patent: *Oct. 26, 2021

(54) METHOD AND APPARATUS FOR CONTROLLING A PLURALITY OF INTERNET OF THINGS DEVICES

(71) Applicant: SAMSUNG ELECTRONICS CO., LTD., Suwon-si (KR)

(72) Inventors: Manjib Han, Seongnam-si (KR); Jaehong Kim, Yongin-si (KR); Jin Ra, Suwon-si (KR); Hyejung Cho, Uiwang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/983,030

(22) Filed: Aug. 3, 2020

(65) Prior Publication Data

US 2020/0363945 A1   Nov. 19, 2020

Related U.S. Application Data

(63) Continuation of application No. 15/903,297, filed on Feb. 23, 2018, now Pat. No. 10,732,827.

(30) Foreign Application Priority Data

Feb. 24, 2017   (KR) .......................... 10-2017-0024852

(51) Int. Cl.
*G06F 3/0488* (2013.01)
*G06F 3/0485* (2013.01)
(Continued)

(52) U.S. Cl.
CPC .......... *G06F 3/04883* (2013.01); *G06F 1/163* (2013.01); *G06F 1/1684* (2013.01);
(Continued)

(58) Field of Classification Search
CPC ................... G06F 1/163; G06F 1/1684; G06F 2203/04806; G06F 2203/04808;
(Continued)

(56) References Cited

U.S. PATENT DOCUMENTS 7,111,788 B2 * 9/2006 Reponen ............... G06F 3/0482
                                                235/472.01
7,649,456 B2 * 1/2010 Wakefield ............. G01S 5/0252
                                                340/539.13
(Continued)

FOREIGN PATENT DOCUMENTS

KR   10-2015-0144282   12/2015

OTHER PUBLICATIONS

U.S. Appl. No. 15/903,297, filed Feb. 23, 2018; Han et al.

*Primary Examiner* — Michael J Jansen, II
(74) *Attorney, Agent, or Firm* — Nixon & Vanderhye P.C.

(57) ABSTRACT

The present disclosure relates to techniques for a sensor network, machine-to-machine (M2M) communication, machine type communication (MTC), and Internet of things (IoT). This disclosure may be applied to intelligent services (for example, smart homes, smart buildings, smart cities, smart cars or connected cards, health care, digital education, retail business, security and safety related services, etc.), based on the above techniques. According to an embodiment, a method for selecting and controlling an external device at a portable electronic device including a touch screen includes displaying a selection area and spatial information including location information of at least one external device on the touch screen, receiving a first touch input in the selection area to select the location information, receiving a second touch input for controlling the at least one external device corresponding to the location information
(Continued)

selected in response to the first touch input, and transmitting a control message corresponding to the second touch input.

20 Claims, 64 Drawing Sheets

(51) Int. Cl.
  *G06F 1/16* (2006.01)
  *G06F 3/0484* (2013.01)
(52) U.S. Cl.
  CPC ........ *G06F 3/0485* (2013.01); *G06F 3/04842* (2013.01); *G06F 3/04845* (2013.01); *G06F 2203/04806* (2013.01); *G06F 2203/04808* (2013.01)
(58) Field of Classification Search
  CPC ............. G06F 3/04842; G06F 3/04845; G06F 3/0485; G06F 3/04883; G06F 3/0488; G06F 3/0482; G06F 3/017; G06F 3/04847; G06F 3/0484; H04L 67/12; H04L 67/125; H04L 67/18; H04L 12/2803; H04L 12/2816; H04L 12/282; G05B 19/4185; H04N 21/4126; H04N 21/43615; H04N 21/43637; H04N 21/41407; H04N 5/4403; H04N 2005/443; H04N 21/42224
  See application file for complete search history.

(56) References Cited

U.S. PATENT DOCUMENTS

| | | | | |
|---|---|---|---|---|
| 8,392,852 B2* | 3/2013 | Tokashiki | ............. | G06F 3/0481 715/839 |
| 8,650,600 B2* | 2/2014 | Ogle | ............. | G08C 17/02 725/81 |
| 8,669,945 B2* | 3/2014 | Coddington | ............. | G06F 3/0485 345/173 |
| 8,762,895 B2* | 6/2014 | Mehta | ............. | H04N 5/23296 715/863 |
| 8,830,267 B2* | 9/2014 | Brackney | ............. | G06Q 10/06 345/633 |
| 9,075,460 B2* | 7/2015 | Mak | ............. | G06F 3/048 |
| 9,110,582 B2* | 8/2015 | Baek | ............. | G06F 3/014 |
| 9,678,484 B2* | 6/2017 | Nixon | ............. | H04W 4/023 |
| 9,781,275 B2* | 10/2017 | Kim | ............. | H04L 12/282 |
| 9,823,812 B2* | 11/2017 | Kim | ............. | G06F 3/0482 |
| 9,852,388 B1* | 12/2017 | Swieter | ............. | H04Q 9/00 |
| 9,952,760 B2* | 4/2018 | Iwaizumi | ............. | G06F 3/04842 |
| 9,985,825 B2* | 5/2018 | Huang | ............. | H04W 4/70 |
| 10,002,524 B2* | 6/2018 | Shim | ............. | G08C 17/02 |
| 10,063,640 B2* | 8/2018 | Chen | ............. | H04L 12/6418 |
| 10,068,373 B2* | 9/2018 | Lee | ............. | G06F 3/04815 |
| 10,110,272 B2* | 10/2018 | Barnett, Jr. | ............. | G06F 3/017 |
| 10,129,711 B1* | 11/2018 | Saadoun | ............. | H04W 4/08 |
| 10,158,536 B2* | 12/2018 | Kim | ............. | H04L 12/2834 |
| 10,161,752 B1* | 12/2018 | Poel | ............. | G01S 5/14 |
| 10,222,928 B2* | 3/2019 | Lee | ............. | G08C 17/00 |
| 10,237,141 B2* | 3/2019 | Sasaki | ............. | G06F 3/04817 |
| 10,248,399 B2* | 4/2019 | Yoon | ............. | G06F 8/61 |
| 10,250,327 B2* | 4/2019 | Cheon | ............. | H04L 12/283 |
| 10,250,691 B2* | 4/2019 | Um | ............. | H04L 67/18 |
| 10,321,182 B2* | 6/2019 | Herz | ............. | H04N 21/44218 |
| 10,389,863 B2* | 8/2019 | Jeon | ............. | G06F 3/0482 |
| 10,448,486 B2* | 10/2019 | Baek | ............. | H05B 47/10 |
| 10,637,724 B2* | 4/2020 | Johnson | ............. | H04W 12/062 |
| 10,732,827 B2* | 8/2020 | Han | ............. | G06F 1/163 |
| 10,832,665 B2* | 11/2020 | Barnett, Jr. | ............. | H04W 4/70 |
| 2003/0197740 A1* | 10/2003 | Reponen | ............. | G06F 3/0362 715/810 |
| 2005/0022134 A1* | 1/2005 | Tokashiki | ............. | G06F 3/0489 715/764 |
| 2008/0180228 A1* | 7/2008 | Wakefield | ............. | G01S 5/0252 340/4.62 |
| 2008/0297369 A1* | 12/2008 | Pittard | ............. | H04B 1/202 340/4.32 |
| 2010/0283743 A1* | 11/2010 | Coddington | ............. | G06F 3/0488 345/173 |
| 2011/0115816 A1* | 5/2011 | Brackney | ............. | H05B 47/10 345/629 |
| 2012/0110501 A1* | 5/2012 | Baek | ............. | G06F 3/0481 715/800 |
| 2012/0324517 A1* | 12/2012 | Ogle | ............. | H04N 21/42226 725/81 |
| 2014/0047380 A1* | 2/2014 | Mak | ............. | G06F 3/041 715/800 |
| 2014/0118563 A1* | 5/2014 | Mehta | ............. | H04N 1/00411 348/207.1 |
| 2014/0167929 A1* | 6/2014 | Shim | ............. | G08C 17/02 340/12.5 |
| 2014/0277616 A1* | 9/2014 | Nixon | ............. | H04L 67/18 700/83 |
| 2014/0304381 A1* | 10/2014 | Savolainen | ............. | H04L 41/0806 709/222 |
| 2014/0331144 A1* | 11/2014 | Kim | ............. | H04L 67/025 715/739 |
| 2015/0033136 A1* | 1/2015 | Sasaki | ............. | G06F 3/0482 715/736 |
| 2015/0347114 A1* | 12/2015 | Yoon | ............. | H04L 12/2832 235/375 |
| 2015/0366035 A1* | 12/2015 | Baek | ............. | H05B 47/19 315/131 |
| 2016/0005229 A1* | 1/2016 | Lee | ............. | G06F 3/0488 345/419 |
| 2016/0154537 A1* | 6/2016 | Lee | ............. | G06F 3/04883 715/781 |
| 2016/0170635 A1* | 6/2016 | Iwaizumi | ............. | G06F 3/04842 345/173 |
| 2016/0187995 A1* | 6/2016 | Rosewall | ............. | H04W 12/06 345/156 |
| 2016/0198001 A1* | 7/2016 | Um | ............. | H04L 67/303 709/205 |
| 2016/0226732 A1* | 8/2016 | Kim | ............. | H04L 12/2807 |
| 2016/0261458 A1* | 9/2016 | Huang | ............. | H04L 67/12 |
| 2017/0083268 A1* | 3/2017 | Cho | ............. | G06F 3/04815 |
| 2017/0126809 A1* | 5/2017 | Chen | ............. | H04L 12/2816 |
| 2017/0134553 A1* | 5/2017 | Jeon | ............. | H04M 1/72454 |
| 2017/0180489 A1* | 6/2017 | Oh | ............. | H04L 67/36 |
| 2017/0195046 A1* | 7/2017 | Cheon | ............. | H04L 12/283 |
| 2017/0230511 A1* | 8/2017 | Kim | ............. | H04M 11/007 |
| 2017/0272316 A1* | 9/2017 | Johnson | ............. | G06Q 10/103 |
| 2017/0345420 A1* | 11/2017 | Barnett, Jr. | ............. | G10L 15/22 |
| 2018/0062691 A1* | 3/2018 | Barnett, Jr. | ............. | G06F 1/163 |
| 2018/0077449 A1* | 3/2018 | Herz | ............. | H04W 4/70 |
| 2018/0246639 A1* | 8/2018 | Han | ............. | G06F 3/04842 |
| 2020/0127891 A9* | 4/2020 | Johnson | ............. | H04L 67/125 |

\* cited by examiner

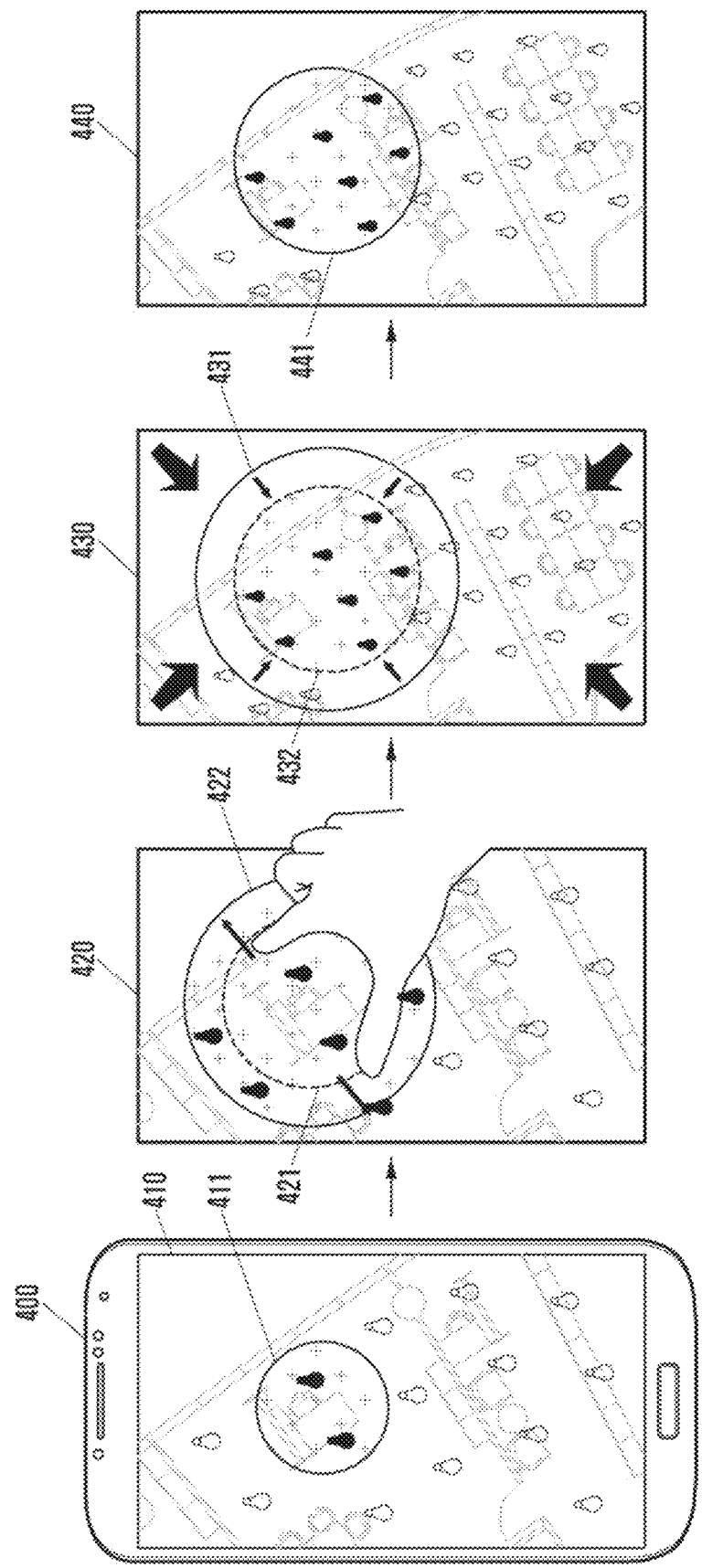

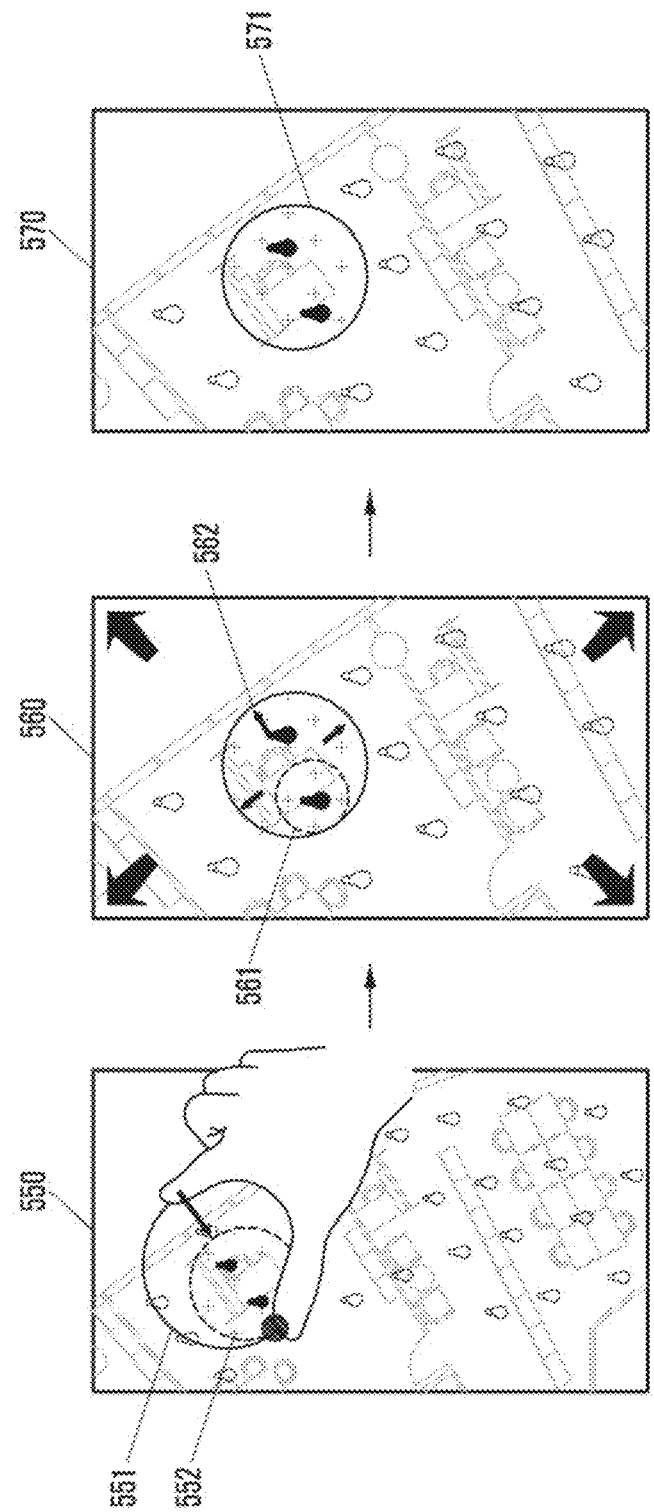

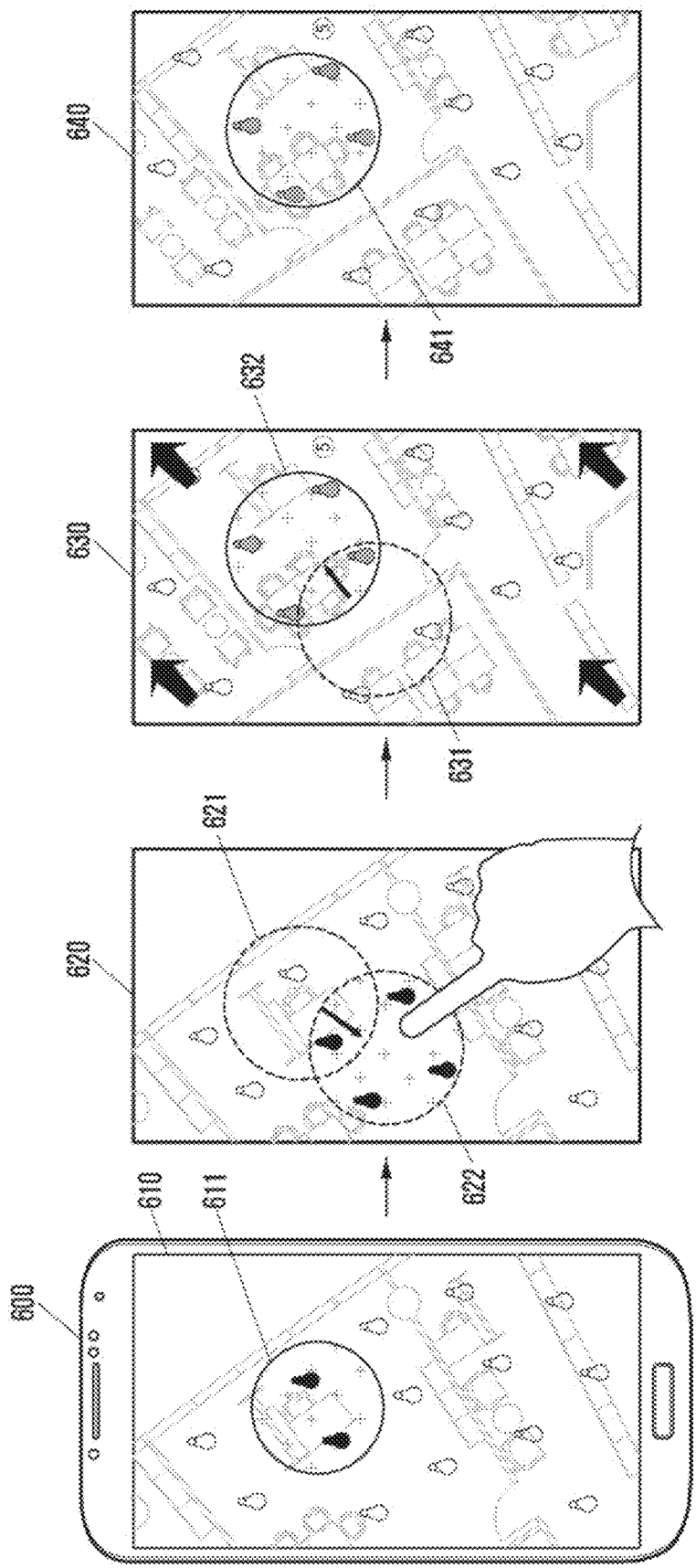

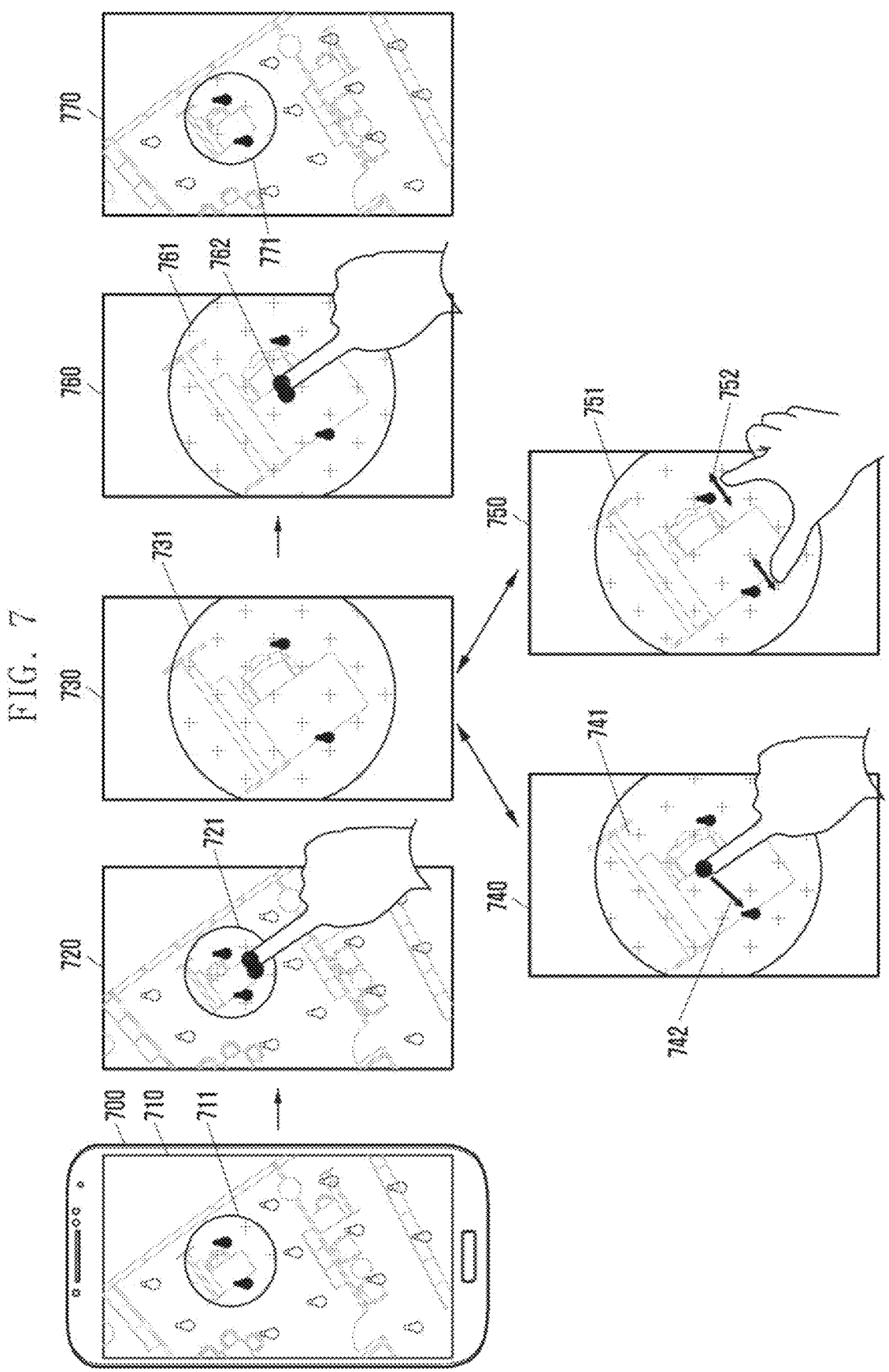

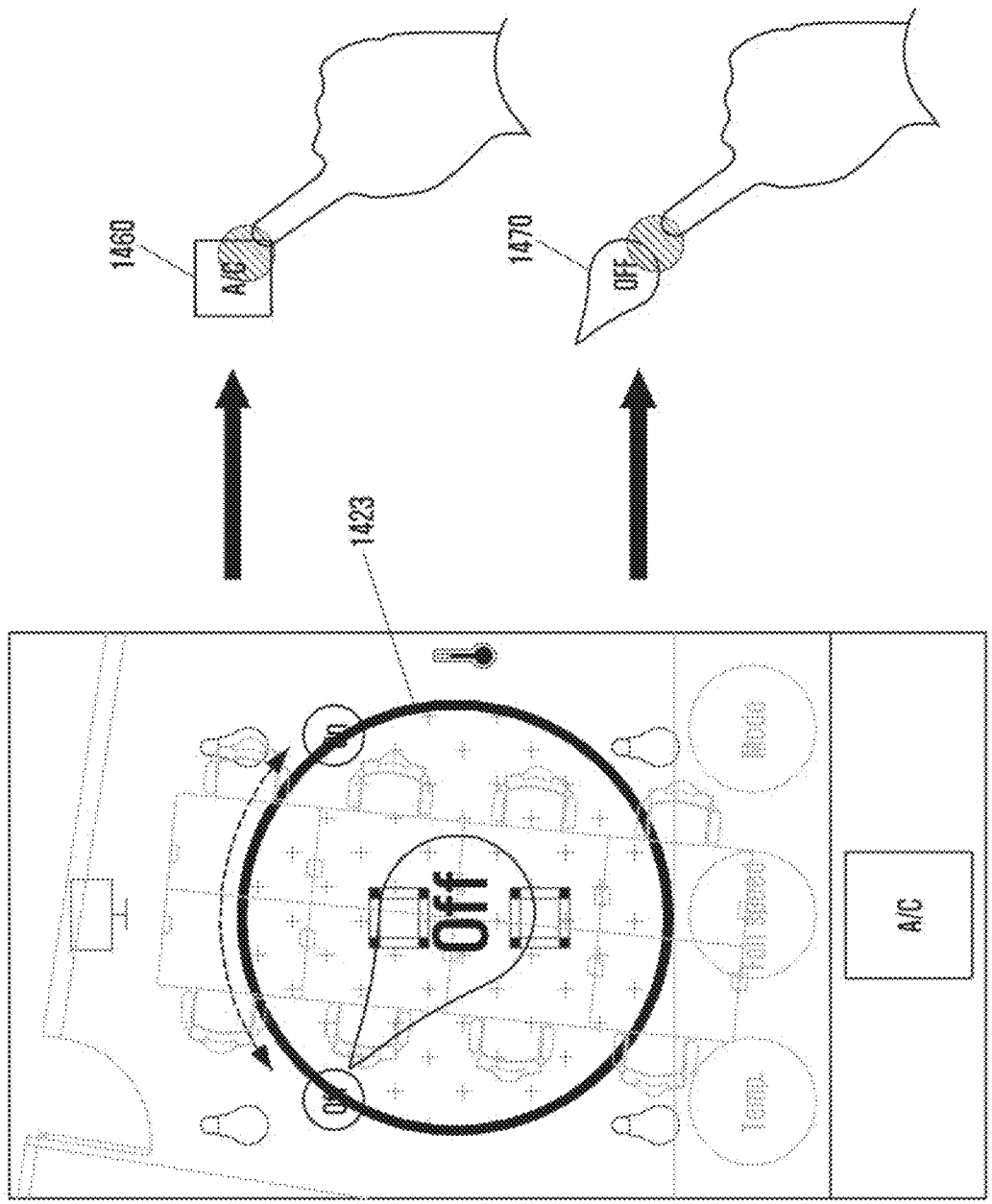

FIG. 15E
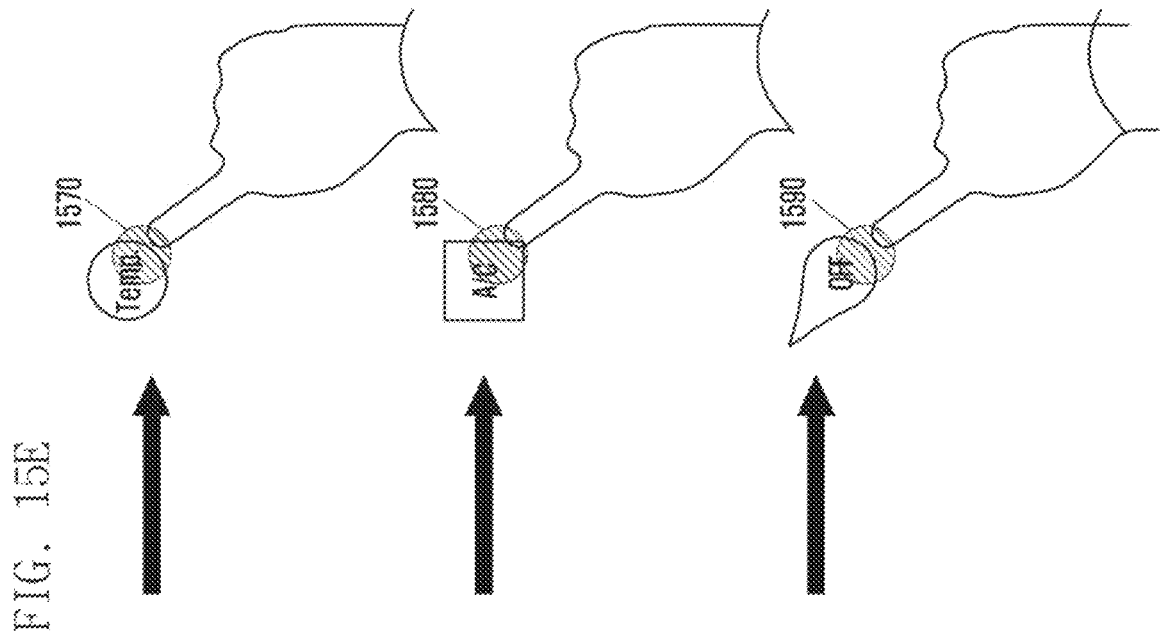
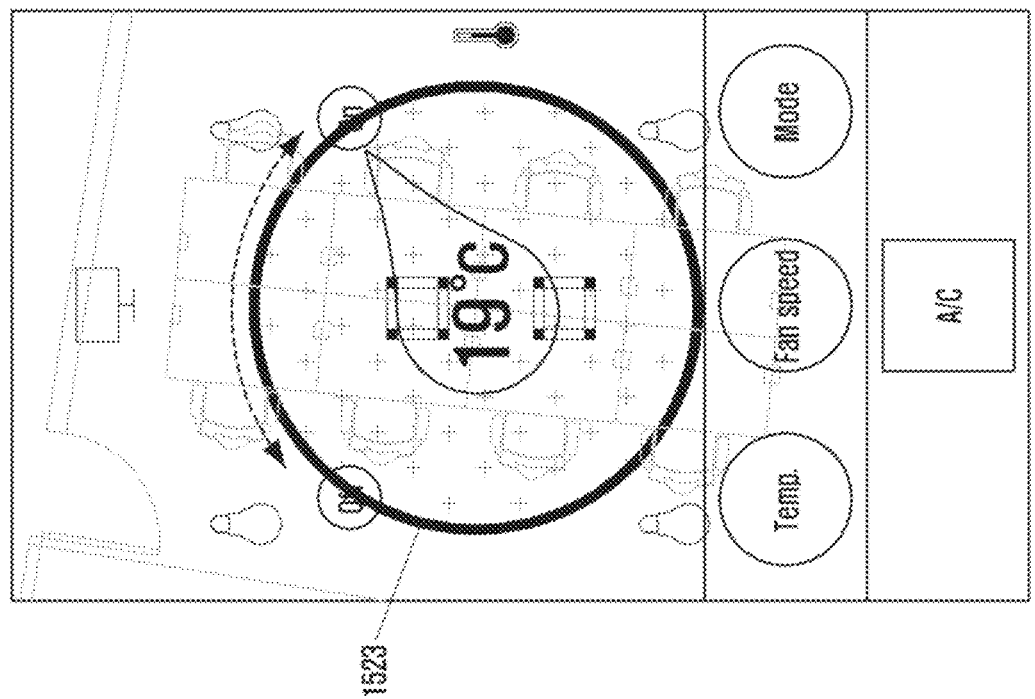

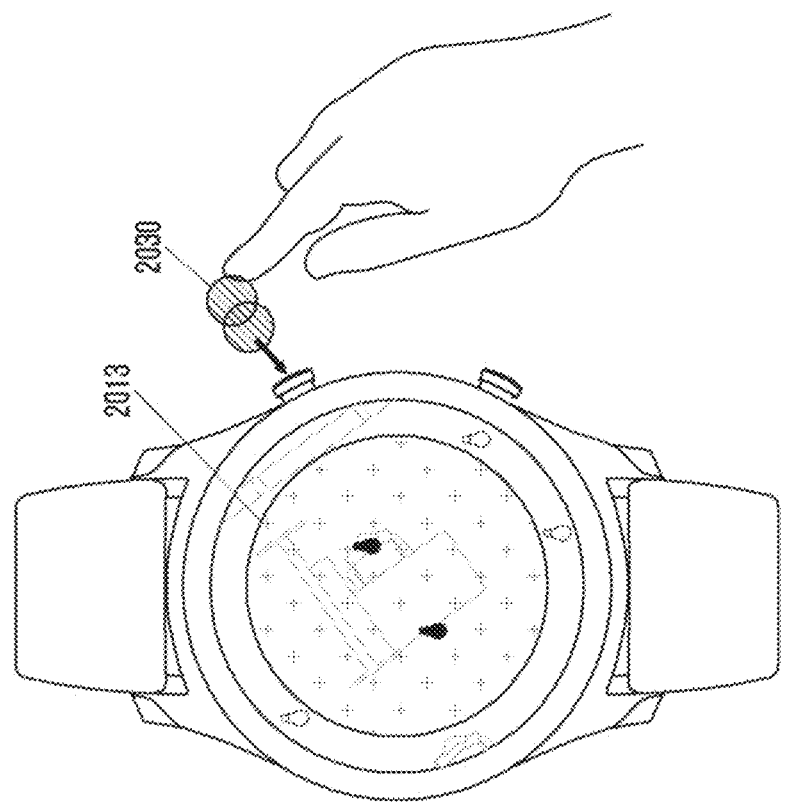
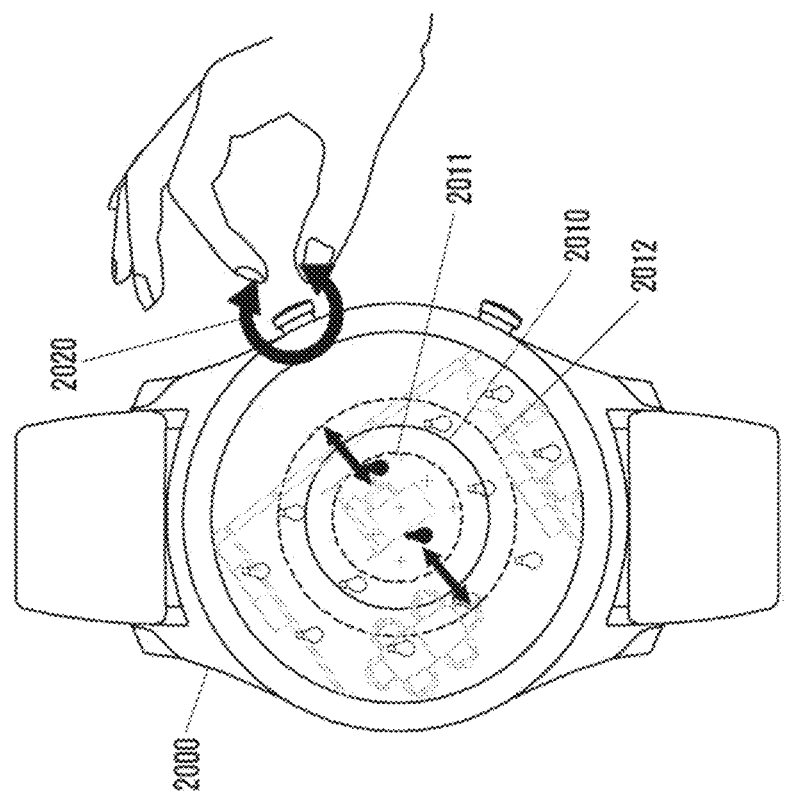
FIG. 20

FIG. 21
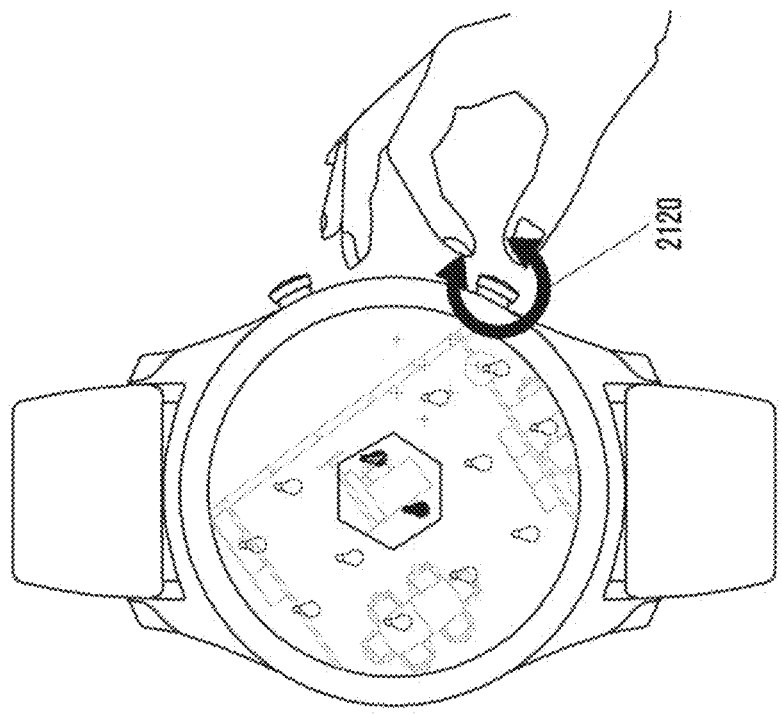
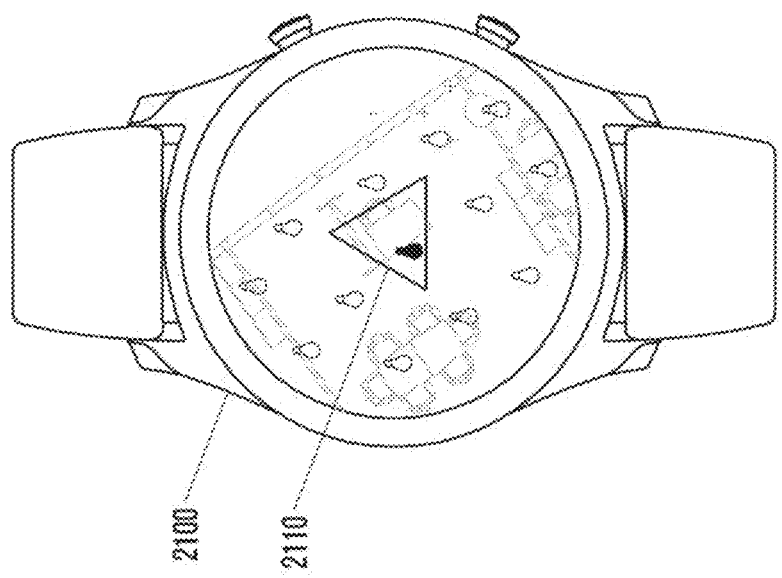

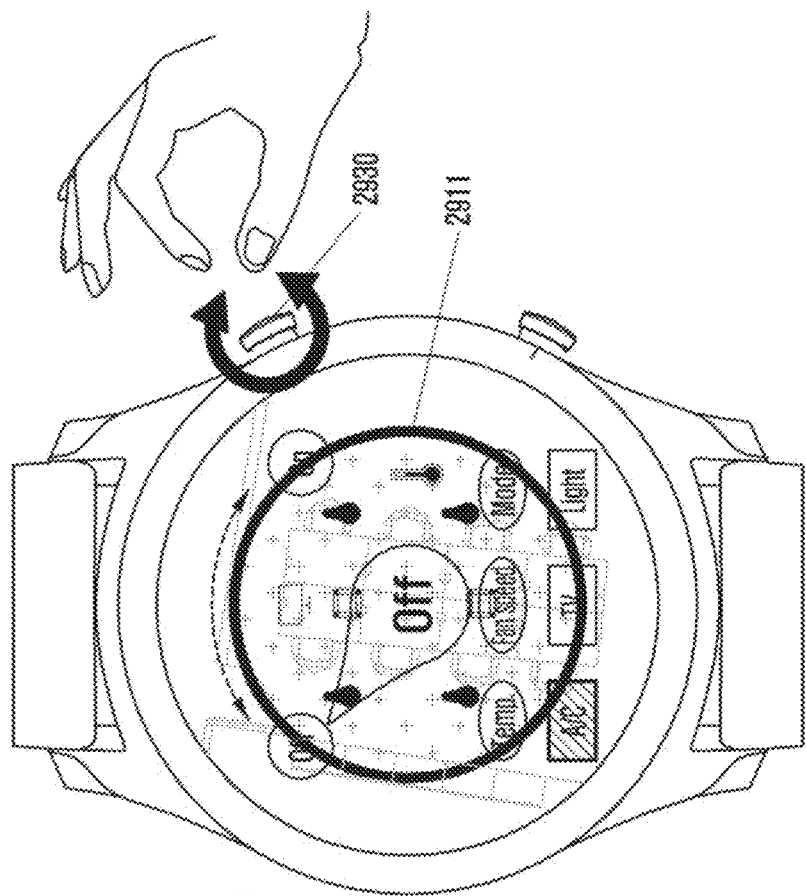
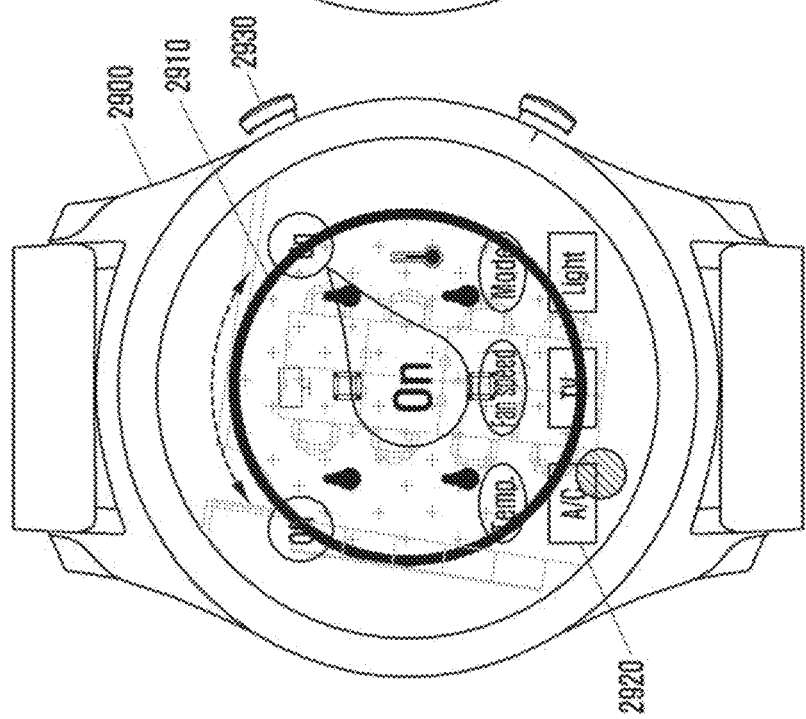
FIG. 29

METHOD AND APPARATUS FOR CONTROLLING A PLURALITY OF INTERNET OF THINGS DEVICES

CROSS-REFERENCE TO RELATED APPLICATION

This application is a Continuation of U.S. application Ser. No. 15/903,297, filed Feb. 23, 2018 (now U.S. Pat. No. 10,732,827), which claims priority to Korean Patent Application No. 10-2017-0024852, filed Feb. 24, 2017, the disclosures of which are incorporated by reference herein in their entireties.

TECHNICAL FIELD

The disclosure relates to techniques for remotely controlling one or more Internet of things (IoT) devices or external devices located in a specific area in an IoT environment using a portable or a wearable electronic device.

BACKGROUND

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements such as sensing technology, wired/wireless communication and network infrastructure, service interface technology, and security technology have been demanded for IoT implementation, a sensor network, a machine-to-machine (M2M) communication, machine type communication (MTC), and so forth have been recently researched.

Such an IoT environment may provide intelligent Internet technology services that create a new value to human life by collecting and analyzing data generated among connected things. The IoT may be applied to a variety of fields including smart home, smart building, smart city, smart car or connected car, smart grid, health care, smart appliances, and advanced medical services through convergence and combination between existing information technology (IT) and various industrial applications.

With the recent growth of IoT technology and market, the number of IoT devices is steadily increasing. In addition, it is increasingly necessary for a user to select and collectively control the operation of a plurality of IoT devices or external devices located in a specific area by using a portable electronic device such as a smart phone or a tablet PC or using a wearable electronic device such as a smart watch or a smart band. In this case, the user often suffers inconvenience of having to individually select and control such IoT devices or external devices. Further, as the number of devices to be controlled increases, a lot of time to control such devices is required or inconvenience of having to repeat the same operation many times is caused.

SUMMARY

An aspect of the disclosure provides a method and apparatus for controlling, collectively or in groups, a plurality of IoT devices or external devices located in a specific area in an IoT environment by using a portable or wearable electronic device.

According to various embodiments of the present disclosure, a method for selecting and controlling an external device at a portable electronic device including a touch screen may comprise displaying a selection area and spatial information including location information of at least one external device on the touch screen, receiving a first touch input for the selection area to select the location information, receiving a second touch input for controlling the at least one external device corresponding to the location information selected in response to the first touch input, and transmitting a control message corresponding to the second touch input.

The method may further comprise changing at least one of size, shape and position of the selection area in response to the first touch input, and selecting the location information of the at least one external device displayed in the changed selection area.

The first touch input may be a pinch-to-zoom multi-touch input for the selection area.

When the first touch input is released from the touch screen after at least one of size, shape and position of the selection area is changed in response to the first touch input, the displayed spatial information may be scaled down or up such that the changed selection area is displayed with a predetermined size at a predetermined position corresponding to the initially displayed selection area.

The spatial information may be received from a server for managing the at least one external device, and the control message generated in response to the second touch input may be transmitted to the server or the at least one external device.

When the location information of the at least one external device is selected, at least one of external device type information, control function information, control function attribute information, and current control status information for the at least one external device may be displayed on the touch screen.

The method may further comprise changing the current control status information for the control function attribute information displayed on the touch screen in response to the second touch input, and generating a control message for the at least one external device corresponding to the changed control status information.

The second touch input may be a rotate touch input for the selection area.

When the location information of the selected at least one external device is location information of a plurality of external devices of different types, common control function attribute information for the plurality of external devices of different types may be displayed on the touch screen.

The common control function attribute information may be information for collectively turning on or off power of the at least one external device, and the power of the at least one external device may be collectively turned on or off in response to the second touch input.

According to various embodiments of the present disclosure, a method for selecting and controlling an external device using a wearable electronic device including a display and at least one physical key input unit may comprise displaying a selection area and spatial information including location information of at least one external device on the display, receiving a first input for the selection area to select the location information, receiving a second input for controlling the at least one external device corresponding to the location information selected in response to the first input, and transmitting a control message corresponding to the second input.

According to various embodiments of the present disclosure, a portable electronic device configured to select and control an external device may comprise a touch screen configured to display a selection area and spatial information including location information of at least one external device and to receive a touch input, a controller configured to control the touch screen to display the selection area changed in at least one of size, shape and position in response to a first touch input received from the touch screen, and to generate a control message for the at least one external device displayed in the selection area in response to a second touch input received from the touch screen, a communication unit comprising communication circuitry configured to transmit the control message to the at least one external device or a server for managing the at least one external device, and a storage configured to store at least one of the spatial information, the location information, external device type information, control function information, control function attribute information, and current control status information for the at least one external device.

According to various embodiments of the present disclosure, a wearable electronic device configured to select and control an external device may comprise a display configured to display a selection area and spatial information including location information of at least one external device, at least one physical key input configured to receive an input, a controller configured to control the display to display the selection area changed in at least one of size, shape and position in response to a first input received from the display or the physical key, and to generate a control message for the at least one external device displayed in the selection area in response to a second input received from the display or the physical key, a communication unit comprising communication circuitry configured to transmit the control message to the at least one external device and/or a server for managing the at least one external device, and a storage configured to store at least one of the spatial information, the location information, external device type information, control function information, control function attribute information, and current control status information for the at least one external device.

According to the above method and apparatus, it is possible to intuitively select a plurality of IoT devices or external devices remotely located in a specific area in an IoT environment using a touch screen or at least one physical key equipped in a portable or wearable electronic device and also to control, collectively or in groups, the selected devices.

BRIEF DESCRIPTION OF THE DRAWINGS

The above and other aspects, features and attendant advantages of the present disclosure will more apparent from the following detailed description, taken in conjunction with the accompanying drawings, in which like reference numerals refer to like elements, and wherein:

FIGS. 4A and 4B are diagrams illustrating a process of receiving a user's pinch-to-zoom touch input for a selection area, symmetrically extending or reducing the selection area, and selecting one or more external devices at a portable electronic device having a touch screen according to an embodiment of the present disclosure;

FIGS. 5A and 5B are diagrams illustrating a process of receiving a user's pinch-to-zoom touch input for a selection area, asymmetrically extending or reducing the selection area, and selecting one or more external devices at a portable electronic device having a touch screen according to an embodiment of the present disclosure;

FIG. 6 is a diagram illustrating a process of receiving a user's touch-and-drag input for a selection area and moving the selection area at a portable electronic device having a touch screen according to the first embodiment of the present disclosure.

FIG. 7 is a diagram illustrating a process of receiving a user's double-tap touch input for a selection area and extending or reducing the selection area at a portable electronic device having a touch screen according to an embodiment of the present disclosure;

FIGS. 14A, 14B, 14C and 14D are diagrams illustrating a process of changing a selection mode for selecting an external device to be controlled to a control mode for controlling the selected external device or changing the control mode to the selection mode in response to a user's touch input for a selection area at a portable electronic device having a touch screen according to an embodiment of the present disclosure;

FIGS. 15A, 15B, 15C, 15D and 15E are diagrams illustrating a process of changing a selection mode to a control mode in response to a user's touch input, displaying control device type information, control function information, control status information and control function attribute information in the control mode, and controlling an external device in response to a user's touch input for such information at a portable electronic device having a touch screen according to an embodiment of the present disclosure;

FIG. 20 is a diagram illustrating a process of extending or reducing a selection area in response to a user's input for a physical key (e.g., crown rotate, crown double click) at a wearable electronic device having a touch screen and at least one physical key according to an embodiment of the present disclosure;

FIG. 21 is a diagram illustrating a process of changing a shape of a selection area in response to a user's input for a physical key (e.g., crown rotate) at a wearable electronic device having a touch screen and at least one physical key according to an embodiment of the present disclosure;

FIG. 29 is a diagram illustrating a process of selecting an external device to be controlled through a touch input and controlling power of the selected external device through a physical key input (e.g., crown rotate) at a wearable electronic device having a touch screen and at least one physical key according to an embodiment of the present disclosure;

DETAILED DESCRIPTION

Figure 1:
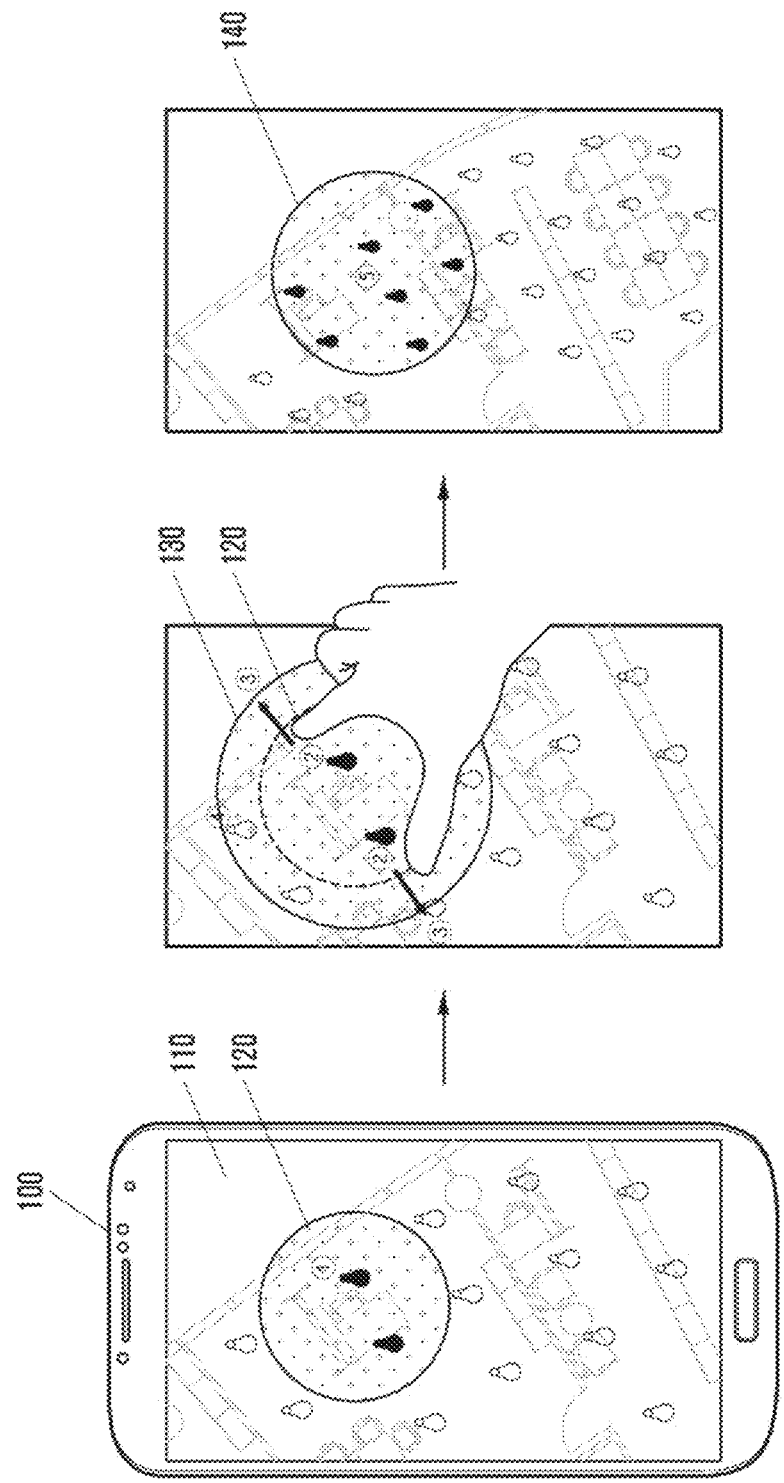
FIG. 1 is a diagram illustrating a process of receiving a user's pinch-to-zoom touch input for a selection area and selecting one or more external devices at a portable electronic device having a touch screen according to an embodiment of the present disclosure.

Hereinafter, embodiments of the present disclosure will be described in greater detail with reference to the accompanying drawings.

In describing the embodiments, descriptions of techniques which are well known in the art to which the present disclosure belongs and which are not directly related to the present disclosure may not be described or illustrated in detail. This is to avoid obscuring the subject matter of the present disclosure.

For the same reason, some elements are exaggerated, omitted or schematically illustrated in the accompanying drawings. Also, the size of each element does not entirely reflect the actual size. In the drawings, the same or corresponding elements are denoted by the same reference numerals.

The advantages and features of the present disclosure and the manner of achieving them will become apparent with reference to the embodiments described in detail below with reference to the accompanying drawings. The present disclosure may, however, be embodied in many different forms and is not limited to the embodiments set forth herein. Rather, these embodiments are provided so that this disclosure will be thorough and complete, and will fully convey the scope of the disclosure to those skilled in the art. To fully disclose the scope of the disclosure to those skilled in the art, and the disclosure is defined by the scope of the claims.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

Each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, may refer to a software or hardware component or any combination thereof, or device, such as a field programmable gate array (FPGA) or application specific integrated circuit (ASIC), which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

Hereinafter, embodiments of the present disclosure will be described in detail with reference to the accompanying drawings. In the following description, well-known elements and functions may not be described or illustrated to avoid obscuring the subject matter of the present disclosure. Also, terms used herein are defined in consideration of functions of the present disclosure, and may be changed according to the intention of a user, an operator, or the like. Therefore, the definition should be based on the contents throughout this description.

The terms used in this description may be referred to as follows.

1. Spatial information: This may be referred to, for example, as information processed in the form of digital image from location information and attribute information of a natural or artificial object existing in the ground, underground, water, or underwater including the location information of an external device. For example, the spatial information may be an electronic map, a furniture layout, a blueprint of a building, a plan view of a building, and the like.

2. Portable electronic device: This may be referred to, for example, as an electronic device that is portable and usable by the user and has a wireless communication function and a touch screen for receiving a user input. For example, the portable electronic device may be, but not limited to, a smart phone, a tablet PC, and the like. The portable electronic device may include a touch screen, a controller, a communication unit, and a storage unit. The storage unit may have a spatial information database (DB), an external device information DB (e.g., information about a location, a type, a device specification, a control function, attributes of control function, and a control status), and the like.

3. Wearable electronic device: This may be referred to, for example, as an electronic device that is worn on a part of a user's body, has a wireless communication function, and also has a touch screen and at least one physical key (e.g., a button, a bezel, a crown, etc.) for receiving a user input. For example, the wearable electronic device may be, but not limited to, a smart watch, a smart necklace, a smart ring, a smart band, smart glasses, a head mounted display (HMD), a smart helmet, and the like. The wearable electronic device may include a display, a physical key input unit, a controller, a communication unit, and a storage unit. The storage unit may have a spatial information DB, an external device information DB, a control information DB, and the like.

4. External device: This may be referred to, for example, as an electronic device that has a wired or wireless communication function that is controllable by a user input received from a user electronic device such as the above-mentioned portable or wearable electronic device. For example, the external device may include, but is not limited to, a lighting device (or light), an air conditioner, a projector, a desktop, a robot cleaner, an air cleaner, a TV, a drone, a robot, and the like.

5. External device type information: This may be referred to, for example, as information about the type or kind of an external device selected through a selection area. For example, the type information of an external device (e.g., an air conditioner, a TV, a lighting device, a thermometer, etc.) disposed in the selection area may be displayed, but not limited to, in an icon form at a lower portion of the touch screen of the portable or wearable electronic device.

6. Control function information: This may be referred to, for example, as information about controllable functions according to the type of external device. For example, the control function information may be, but not limited to, a temperature, an air volume, and a mode in case of an air conditioner, a brightness, a color temperature, and a mode in case of a lighting device, and a volume, a channel, and a screen mode in case of a TV.

7. Control function attribute information: This may be referred to, for example, as information about a category or controllable range (e.g., upper and lower limits, an adjustable range) of a control function of the selected external device and information about adjustable units for an input. For example, the control function attribute information may be, but not limited to, power on/off, a temperature adjustable range between 10 and 40 degrees (adjustable by 1 degree), and a high/medium/low air volume.

8. Control status information: This may be referred to, for example, as information indicating a current control status regarding the attributes of the selected control function. For example, the control status information may be, but not limited to, a current indoor setting temperature (or an average temperature) of an air conditioner, and turned on/off states of a plurality of lighting devices (e.g., the number of lights turned on, the number of lights turned off).

9. Common control function attribute information: This may be referred to, for example, as information about the attributes of a control function capable of being applied in common to the selected external devices of different types. For example, the common control function attribute information may be, but not limited to, an overall power on/off, and a power saving mode setting for external devices of different types.

10. Selection area: This may be referred to, for example, as a particular area that is set to allow one or more external devices to be selected in response to a user input in spatial information displayed on a portable or wearable electronic device. Namely, if the location of a certain external device is contained in the selection area whose location, size, or shape is determined by a user input, the external device may be regarded as being selected. For example, the selection area may be set to have a circular shape, an elliptical shape, a triangular shape, a rectangular shape, a polygonal shape, or the like, and may be changed in size or shape in response to a user input.

11. Selection mode: This may be referred to, for example, as a specific mode for selecting an external device to be controlled by changing the size or shape of a selection area.

12. Control mode: This may be referred to, for example, as a specific mode for providing external device type information, control function information, and control status information regarding external devices contained in a selection area, and performing a common control for the external devices.

13. Physical Key: This may be referred to, for example, as an input that is physically provided to a wearable electronic device to receive a user input. For example, the physical key may be, but not limited to, a button, a bezel, a crown, etc. equipped in a smart watch.

14. Control message: This may be referred to, for example, as a particular message generated by a portable or wearable electronic device in response to a user input to control one or more external devices. The portable or wearable electronic device may transmit the control message to one or more external devices to be controlled, or may transmit the control message to a server that manages such external devices. In this case, the external devices may adjust specific control function information (e.g., a temperature, an air volume, and a mode in case of an air conditioner) in response to the control message. Similarly, the server may instruct the external devices to adjust specific control function information (e.g., a temperature, an air volume, and a mode in case of an air conditioner) in response to the control message.

FIG. 1 is a diagram illustrating a process of selecting one or more external devices by using a selection area according to an embodiment of the present disclosure.

Referring to FIG. 1, a portable electronic device 100 may display a selection area 120 having a predetermined shape on a touch screen 110. The selection area 120 may refer, for example, to a particular area that is set to allow one or more external devices (or IoT devices) to be selected in response to a user's touch input in spatial information displayed on the touch screen 110.

Although the selection area 120 is shown as a circular shape for convenience of illustration, the selection area 120 according to embodiments of the present disclosure may be set to have various shapes (e.g., an elliptical shape, a triangular shape, a rectangular shape, a polygonal shape, or a free shape, or the like).

The portable electronic device 100 may receive location information of a plurality of external devices from a server that manages the plurality of external devices. Then, based on the received location information, the portable electronic device 100 may set spatial information (e.g., in the form of a map) related to the location information of the plurality of external devices.

The portable electronic device 100 may display the selection area 120 in the spatial information. The portable electronic device 100 may receive a user's first touch input for the selection area 120 so as to select the location information of at least one external device from the location information of the plurality of external devices. For example, the first touch input may be, but not limited to, a multi-touch input and a pinch-to-zoom input as shown in FIG. 1.

The portable electronic device 100 may display an extended selection area 130 in response to the user's first touch input for the selection area 120. Also, the portable electronic device 100 may select the location information of one or more external devices contained in the extended selection area 130 in the spatial information.

On the other hand, the portable electronic device 100 may display a reduced selection area in response to the user's first touch input for the selection area 120. In this case as well, the portable electronic device 100 may select the location information of one or more external devices contained in the reduced selection area in the spatial information.

Namely, the portable electronic device 100 may vary the size of the selection area 120 in response to the user's first touch input and then select the location information of at least one external device contained in the size-varied selection area in the spatial information.

Additionally, in some embodiment, the portable electronic device 100 may scale down the displayed spatial information such that a selection area 140 (which is identical with the extended selection area 130) is displayed to have the same size as that of the original selection area 120.

Figure 2:
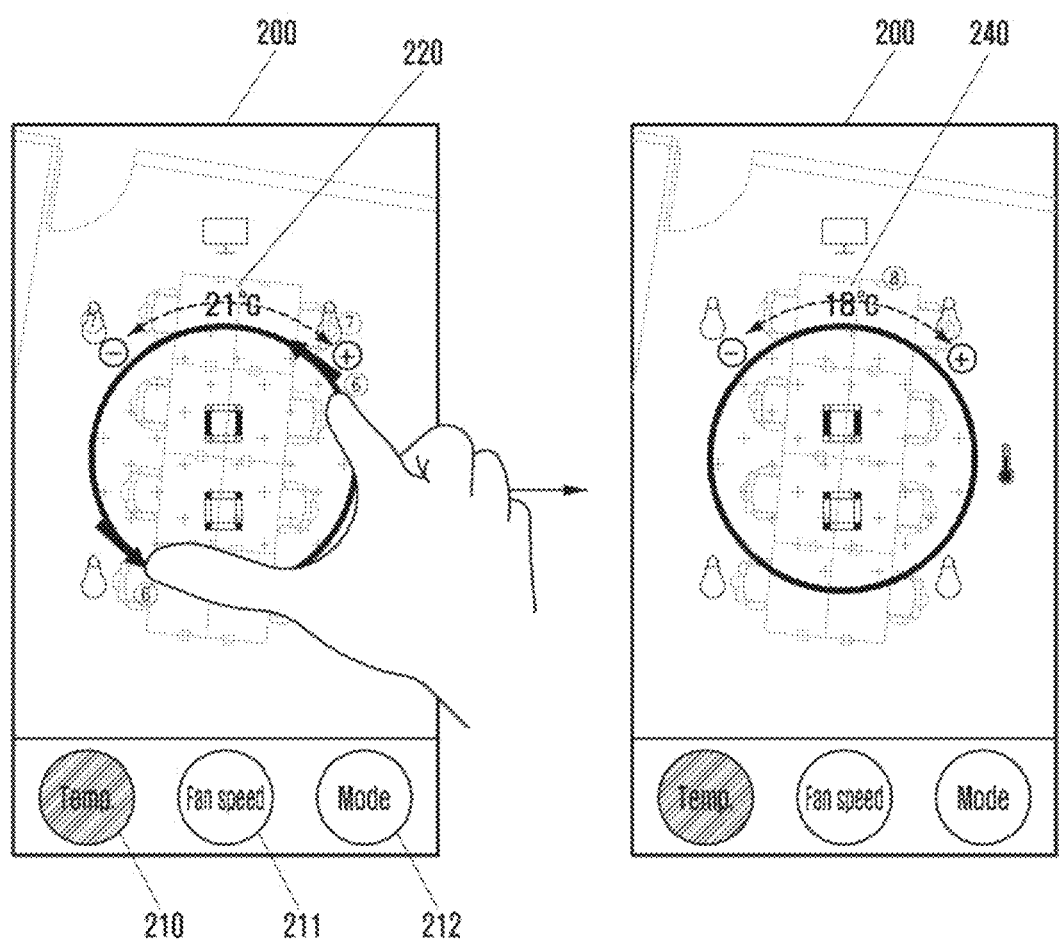
FIG. 2 is a diagram illustrating a process of receiving a user's rotate touch input for a selection area and controlling one or more external devices of the same type at a portable electronic device having a touch screen according to an embodiment of the present disclosure.

FIG. 2 is a diagram illustrating a process of receiving a user's rotate touch input for a selection area and controlling one or more external devices of the same type at a portable electronic device having a touch screen according to an embodiment of the present disclosure.

Referring to FIGS. 1 and 2, the portable electronic device 100 may display, on a touch screen 200, control function information 210, 211 and 212 for controlling the external device(s) selected as described above in FIG. 1. For example, the control function information 210, 211 and 212 may be a temperature, a fan speed, and a mode, or the like, but is not limited thereto. The control function information 210, 211 and 212 shown in FIG. 2 is, however, an example only and may be modified variously for the convenience of the user.

The portable electronic device 100 may receive a user's second touch input for the selection area so as to control the external device(s) selected as described above in FIG. 1. For example, the user's second touch input may be, but not limited to, a rotate touch input for the selection area as shown in FIG. 2.

In response to the user's second touch input, the portable electronic device 100 may perform any one of control functions indicated by the control function information 210, 211 and 212 and also display related control status information 220 and 240 (which denote the state before the control and the state after the control, respectively).

Although the control status information 220 and 240 is displayed at the top of the selection area, this is merely an example. As apparent to those skilled in the art, a display position of the control status information 220 and 240 may be varied on the touch screen 200 according to design specifications.

For example, the control status information 220 and 240 may be a setting temperature of the selected external device(s). As illustrated, the portable electronic device 100 may, for example, change the setting temperature of the selected external device(s) (e.g., air conditioners) from 21 degrees to 18 degrees in response to the user's second touch input.

Figure 3:
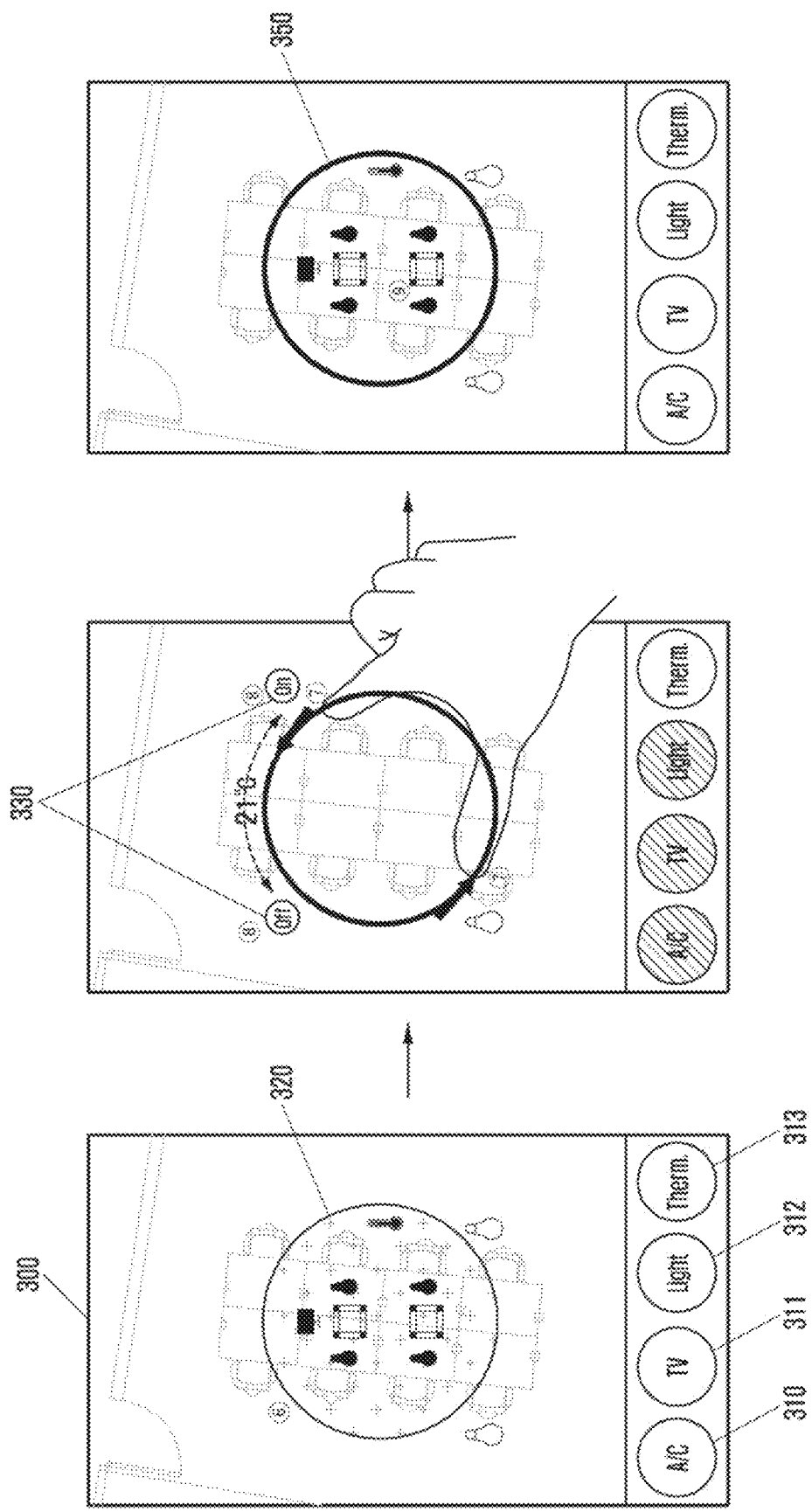
FIG. 3 is a diagram illustrating a process of receiving a user's rotate touch input for a selection area and controlling one or more external devices of different types at a portable electronic device having a touch screen according to an embodiment of the present disclosure.

FIG. 3 is a diagram illustrating a process of receiving a user's rotate touch input for a selection area and controlling one or more external devices of different types at a portable electronic device having a touch screen according to an embodiment of the present disclosure.

While the external devices disposed in the selection area (e.g., selected external devices) in FIG. 2 have the same type, the selected external devices shown in FIG. 3 are of different types.

Referring to FIGS. 1 and 3, the portable electronic device 100 may select the location information of the external devices of different types disposed in a selection area 320 in response to the user's first input. In addition, the portable electronic device 100 may identify each external device corresponding to the selected location information and then display external device type information 310, 311, 312 and 313 about the identified external devices on a lower portion of a touch screen 300. For example, the external device type information 310 to 313 may include, but is not limited to, an air conditioner, a TV, a lighting device, and a thermometer.

The portable electronic device 100 may receive a user's second touch input for the selection area 320 to control the external devices of different types selected as described above in FIG. 1. For example, the user's second touch input may be a rotate touch input 330 to the selection area 320 as shown in FIG. 3.

In response to the user's second touch input, the portable electronic device 100 may change common control function attribute information to be applied to all of the selected external devices of different types. For example, the common control function attribute information may be power on/off. For example, the portable electronic device 100 may simultaneously turn on/off the power of all the selected external devices of different types in response to the user's second touch input.

Thereafter, the portable electronic device 100 may display the changed common control function attribute information in a selection area 350 (which is identical with the former selection area 320).

Figure 4B:
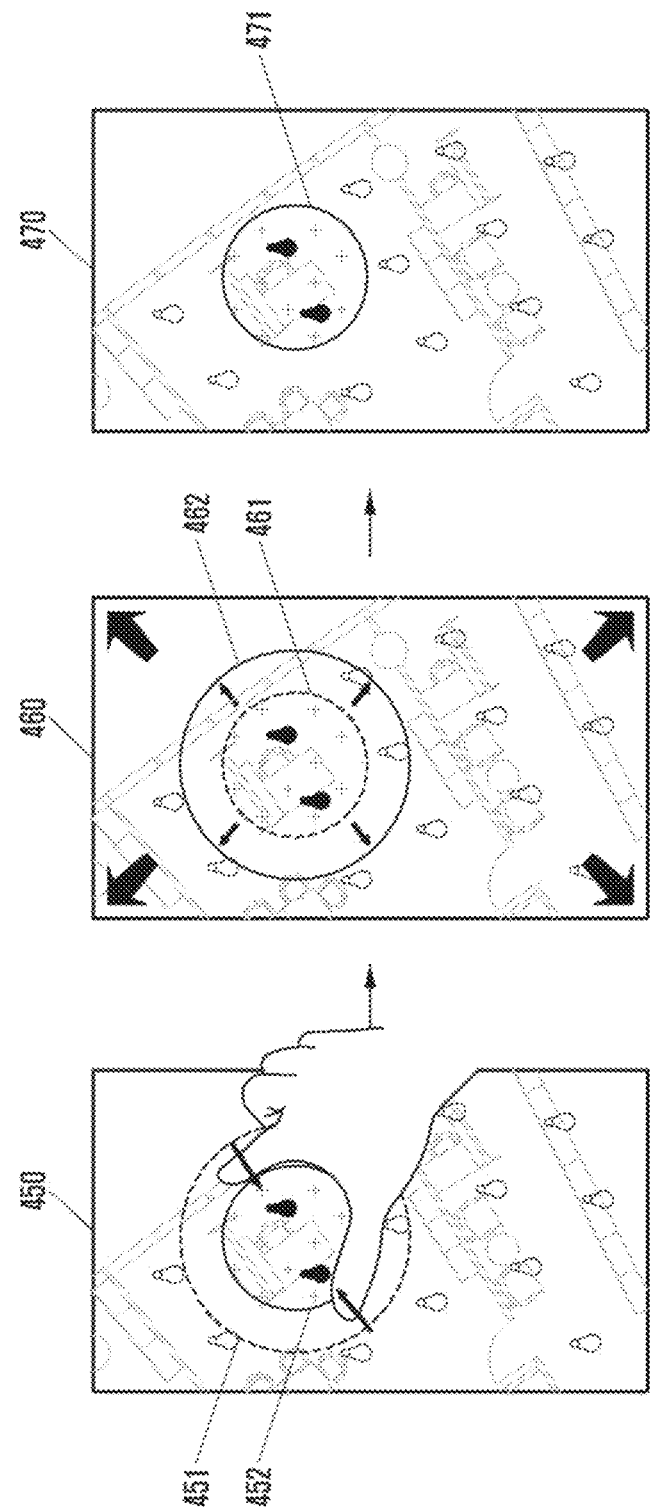

FIGS. 4A and 4B are diagrams illustrating a process of receiving a user's pinch-to-zoom touch input for a selection area, symmetrically extending or reducing the selection area, and selecting one or more external devices at a portable electronic device having a touch screen according to an embodiment of the present disclosure.

As shown in screen 410 in FIG. 4A, the portable electronic device 400 may display a selection area 411 having a predetermined size in a predetermined position on the touch screen.

Then, as shown in screen 420, the portable electronic device 400 may symmetrically extend a displayed selection area 421 to a new selection area 422 in response to a user's pinch-to-zoom-in input for the displayed selection area 421. As a result, the new extended selection area 422 may contain location information of more external devices than the former selection area 421. Namely, the portable electronic device 400 may select the location information of more external devices by symmetrically extending the displayed selection area 421.

Then, as shown in screen 430, the portable electronic device 400 may automatically scale down the spatial information displayed on the touch screen in response to a user's touch release such that an extended selection area 431 (which is identical with the extended selection area 422) is displayed as a new selection area 432 which is similar in position and size to the former selection area 411 or 421.

Therefore, as shown in screen 440, a finally displayed selection area 441 may maintain a predetermined position and size on the touch screen even after being extended. This allows the user to consistently perform similar touch input actions at a similar position, thus enhancing the convenience of user's touch input.

On the other hand, as shown in screen 450 in FIG. 4B, the portable electronic device 400 may symmetrically reduce a displayed selection area 451 to a new selection area 452 in response to a user's pinch-to-zoom-out input for the displayed selection area 451.

Then, as shown in screen 460, the portable electronic device 400 may automatically scale up the spatial information displayed on the touch screen in response to a user's touch release such that a reduced selection area 461 (which is identical with the reduced selection area 452) is displayed as a new selection area 462 which is similar in position and size to the former selection area 451.

Therefore, as shown in screen 470, a finally displayed selection area 471 may maintain a predetermined position and size on the touch screen even after being reduced.

Figure 5A:
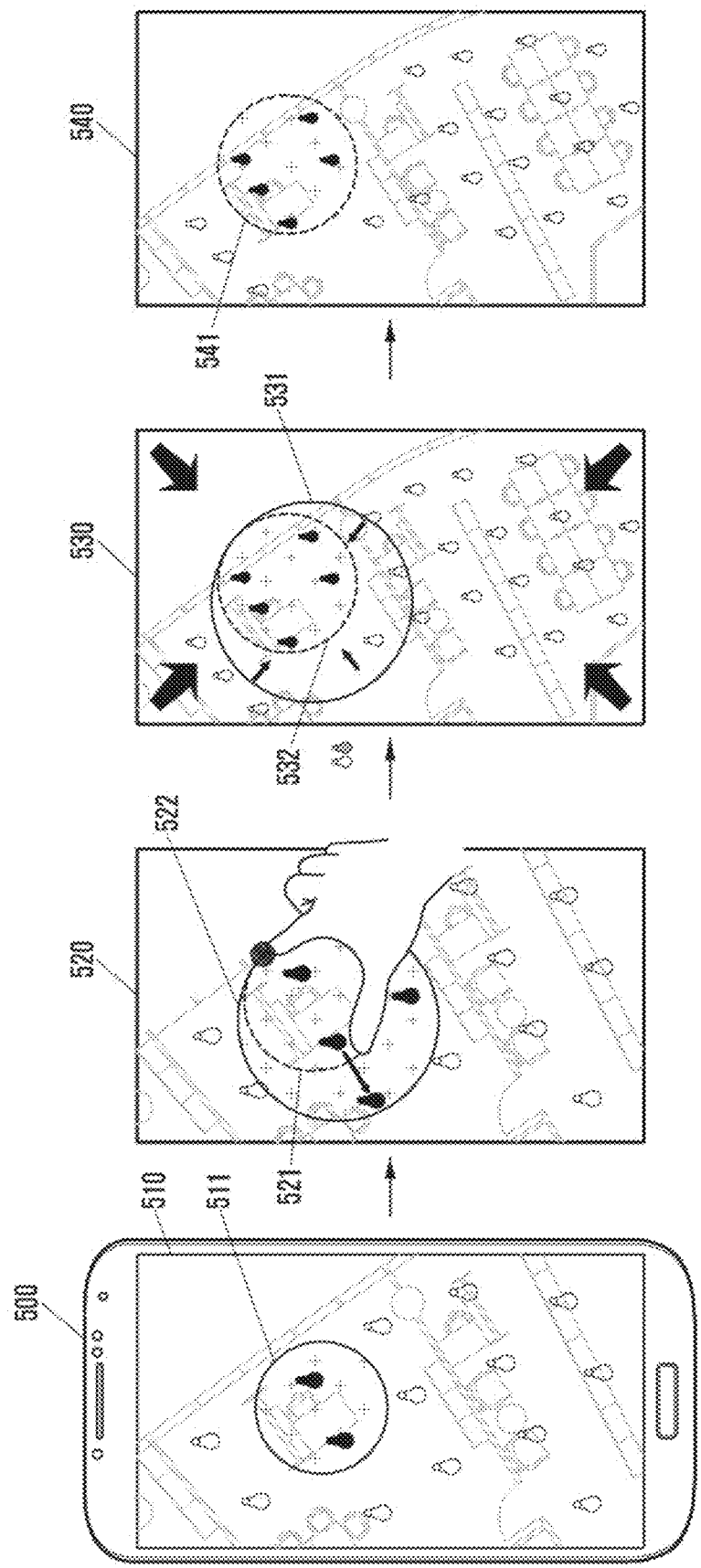

FIGS. 5A and 5B are diagrams illustrating a process of receiving a user's pinch-to-zoom touch input for a selection area, asymmetrically extending or reducing the selection area, and selecting one or more external devices at a portable electronic device having a touch screen according to an embodiment of the present disclosure.

The process of asymmetrically extending or reducing the selection area in FIGS. 5A and 5B is similar to the process of symmetrically extending or reducing the selection area in FIGS. 4A and 4B. However, in the asymmetrical process, the pinch-to-zoom input on the touch screen is received from one fixed touch point and the other moving touch point. Namely, while one touch point is fixed, the other touch point is close to or away from the center of the selection area to asymmetrically extend or reduce the selection area.

For example, as shown in FIG. 5A, while one touch input is received from a fixed point, the other touch input is received from another point moving away from the center of the selection area. As a result, the selection area is extended asymmetrically. On the other hand, as shown in FIG. 5B, while one touch input is received from a fixed point, the other touch input is received from another point approaching the center of the selection area. As a result, the selection area is reduced asymmetrically. Reference numerals 400, 410, 411, 420, 421, 422, 430, 431, 432, 440, 441, 450, 451, 452, 460, 461, 462, 470, 471 in FIGS. 4A and 4B correspond to reference numerals 500, 510, 511, 520, 521, 522, 530, 531, 532, 540, 541, 550, 551, 552, 560, 561, 562, 570 and 571 of FIGS. 5A and 5B, respectively.

FIG. 6 is a diagram illustrating a process of receiving a user's touch-and-drag input for a selection area and moving the selection area at a portable electronic device having a touch screen according to an embodiment of the present disclosure.

As shown in screen 610 in FIG. 6, the portable electronic device 600 may display a selection area 611 having a predetermined size at a predetermined position on the touch screen. Then, as shown in screen 620, the portable electronic device 600 may move a displayed selection area 621 (which is identical with the selection area 611) to a new selection area 622 in response to a user's touch-and-drag input.

Then, as shown in screen 630, the portable electronic device 600 may move the spatial information including a displayed selection area 631 (which is identical with the moved selection area 622) to area 632 in response to a user's touch release. Therefore, as shown in screenshot 640, a finally displayed selection area 641 (which is identical with a selection area 632) may be similar in position and size to the former selection area 611.

FIG. 7 is a diagram illustrating a process of receiving a user's double-tap touch input for a selection area and extending or reducing the selection area at a portable electronic device having a touch screen according to an embodiment of the present disclosure.

As shown in screen 710 in FIG. 7, the portable electronic device 700 may display a selection area 711 having a predetermined size at a predetermined position on the touch screen. Then, as shown in screens 720 and 730, the portable electronic device 700 may extend a displayed selection area 721 (which is identical with the selection area 711) to a new selection area 731 in response to a user's double-tap touch input.

Then, as shown in screen 740, the portable electronic device 700 may move the displayed spatial information in response to a user's touch and drag input in an extended selection area 741 (which is identical with the extended selection area 731). Alternatively or additionally, as shown in screen 750, the portable electronic device 700 may adjust the extension rate of an extended selection area 751 (which is identical with the extended selection area 731) in response to a user's pinch zoom in/out input in the extended selection area 751.

Then, as shown in screen 760, the portable electronic device 700 may reduce a displayed selection area 761 (which is identical with the extended selection area 731) in response to a user's double-tap touch input 762 in the selection area 761. Therefore, as shown in screenshot 770, a finally displayed selection area 771 may have the same position and size as those of the initial selection area 711.

Figure 8:
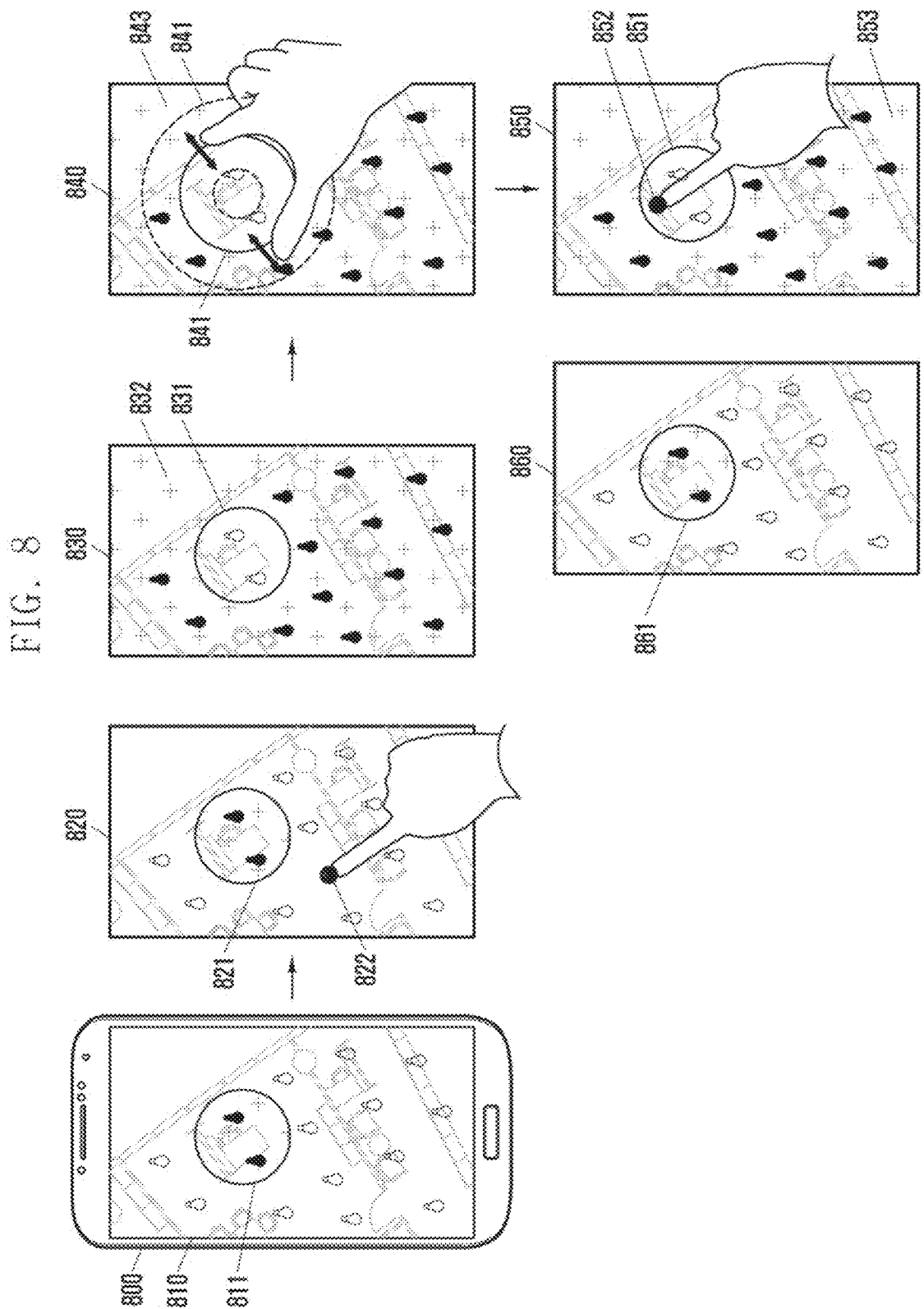
FIG. 8 is a diagram illustrating a process of receiving a user's touch-and-hold input for a selection area and inverting the selection area at a portable electronic device having a touch screen according to an embodiment of the present disclosure.

FIG. 8 is a diagram illustrating a process of receiving a user's touch-and-hold input for a selection area and inverting the selection area at a portable electronic device having a touch screen according to an embodiment of the present disclosure.

As shown in screen 810 in FIG. 8, the portable electronic device 800 may display a selection area 811 having a predetermined size at a predetermined position on the touch screen. Then, as shown in screen 820, the portable electronic device 800 may invert a displayed selection area 821 (which is identical with the selection area 811) in response to a user's touch-and-hold input 822 for an outer area of the selection area 821. For example, the touch-and-hold input may be performed for a few seconds.

Then, as shown in screen 830, the portable electronic device 800 may display a new inverted selection area 832 on the touch screen. Then, as shown in screen 840, the portable electronic device 800 may extend or reduce a displayed selection area 841 (which is identical with the former selection area 831) in response to a user's pinch zoom in/out input for the selection area 841. At this time, the portable electronic device 800 may automatically scale down or up the displayed spatial information such that the selection area 841 maintains a predetermined size and position even after being extended or reduced. In this case as well, the portable electronic device 800 may select the location information of at least one external devices included in a new inverted selection area 843.

Then, as shown in screen 850, the portable electronic device 800 may invert again a previously inverted selection area 853 (which is identical with the former selection area 832) in response to a user's touch-and-hold input 852 for an outer area 851 of the inverted selection area 853. Therefore, as shown in screen 860, the portable electronic device 800 may display a re-inverted selection area 861 on the touch screen.

Figure 9:
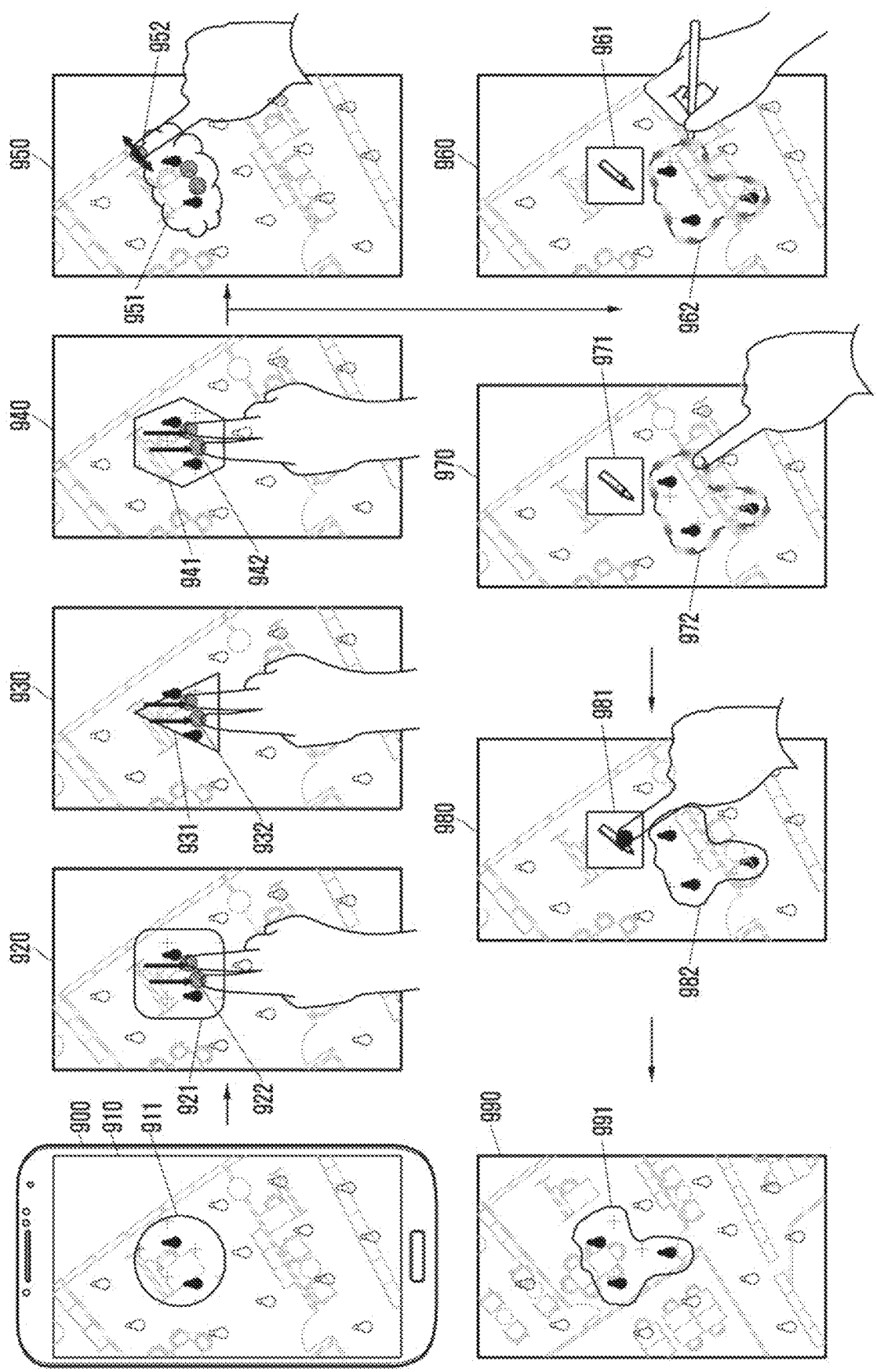
FIG. 9 is a diagram illustrating a process of receiving a user's touch-and-flick input for a selection area and changing a shape of the selection area at a portable electronic device having a touch screen according to an embodiment of the present disclosure.

FIG. 9 is a diagram illustrating a process of receiving a user's touch-and-flick input for a selection area and changing a shape of the selection area at a portable electronic device having a touch screen according to an embodiment of the present disclosure.

As shown in screen 910 in FIG. 9, the portable electronic device 900 may display a selection area 911 having a predetermined size at a predetermined position on the touch screen 910. Then, as shown in screens 920, 930 and 940, the portable electronic device 900 may change the shape of the displayed selection area to a rectangular, triangular or polygonal shape 921, 931 or 941 in response to a user's dual touch-and-flick input 922, 932 or 942 for the selection area.

In addition, according to some embodiments, the portable electronic device 900 may provide a point editing mode for displaying a selection area in a free shape formed several connected points as shown in screen 950. In the point editing mode, the portable electronic device 900 may change the shape of a selection area 951 in response to a touch-and-drag input 952 for any one of points constituting the free shape.

Also, according to some embodiments, the portable electronic device 900 may provide a pen mode 961 for drawing a selection area 962 in a free shape in response to a user's touch pen input as shown in screen 960. Further, according to some embodiments, the portable electronic device 900 may display a selection area 972 in free shape in response to a user's finger touch input as well as the touch pen input in a pen mode 971 as shown in screen 970. Thereafter, as shown in screen 980, the portable electronic device 900 may complete the selection of a selection area 982 in response to a user's touch input tapping a pen mode icon 981.

Meanwhile, after the selection of the selection area, the portable electronic device 900 may automatically scale down or up the displayed spatial information such that a displayed selection area 991 maintains a predetermined size and position on the touch screen as shown in screen 990.

Figure 10:
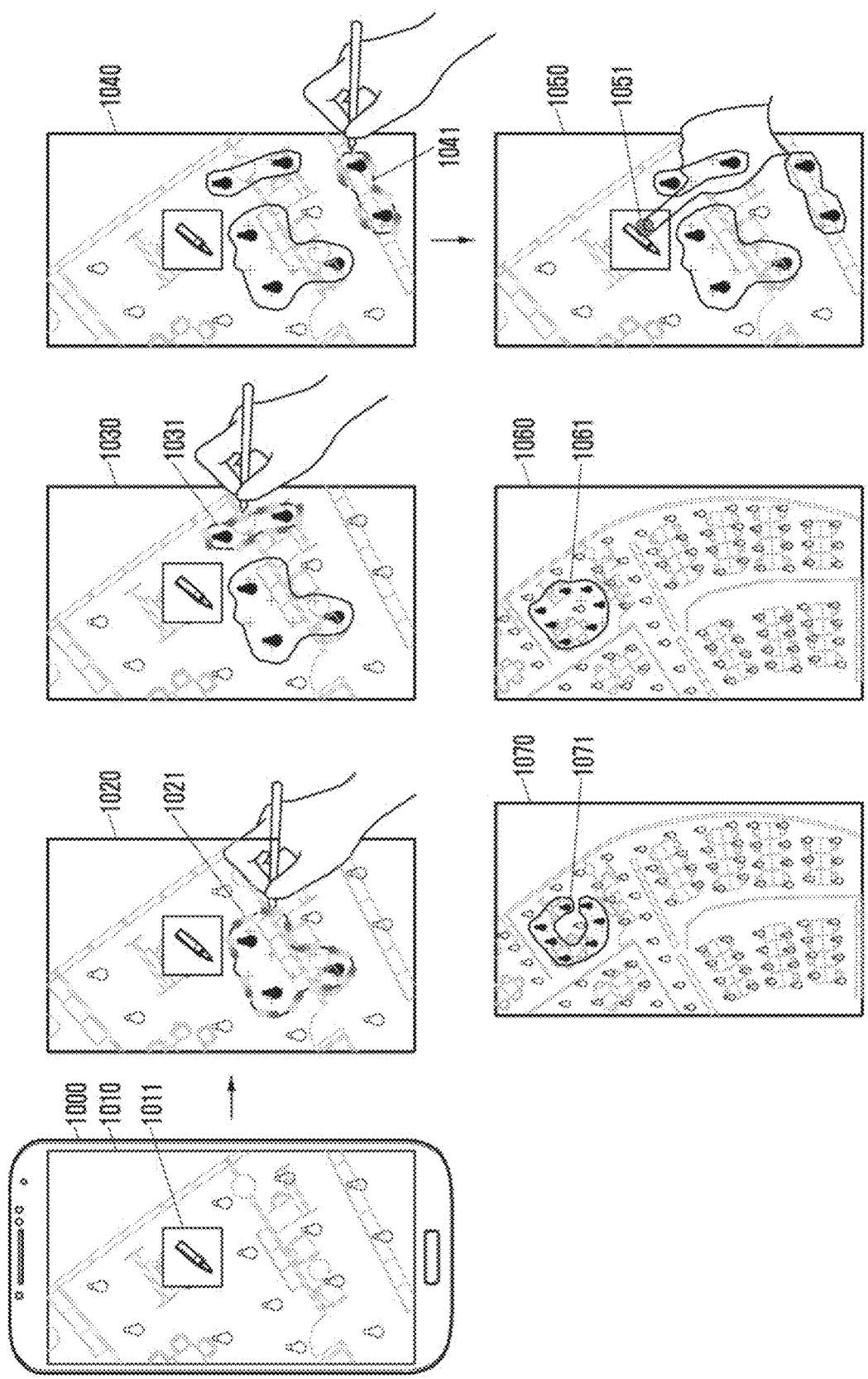
FIG. 10 is a diagram illustrating a process of receiving a user's pen touch input for a selection area and changing or adding a shape of the selection area in a pen mode at a portable electronic device having a touch screen according to an embodiment of the present disclosure.

FIG. 10 is a diagram illustrating a process of receiving a user's pen touch input for a selection area and changing or adding a shape of the selection area in a pen mode at a portable electronic device having a touch screen according to an embodiment of the present disclosure.

As shown in screen 1010 in FIG. 10, the portable electronic device 1000 may receive a user's pen touch input and provide a pen mode 1011 for determining the size and shape of a selection area. Then, as shown in screens 1020, 1030 and 1040, the portable electronic device 1000 may freely create one or more selection areas 1021, 1031 and 1041 in response to the user's pen touch input in the pen mode.

Thereafter, as shown in screen 1050, the portable electronic device 1000 may complete the selection of the selection area in response to the user's tap input for a pen mode icon 1051. Then, as shown in screen 1060 or 1070, the portable electronic device 1000 may automatically scale down or up the displayed spatial information such that a displayed selection area 1061 or 1071 maintains a predetermined size and position on the touch screen. Meanwhile, the selection area 1061 or 1071 may be displayed in a free shape, for example, but is not limited thereto.

Figure 11:
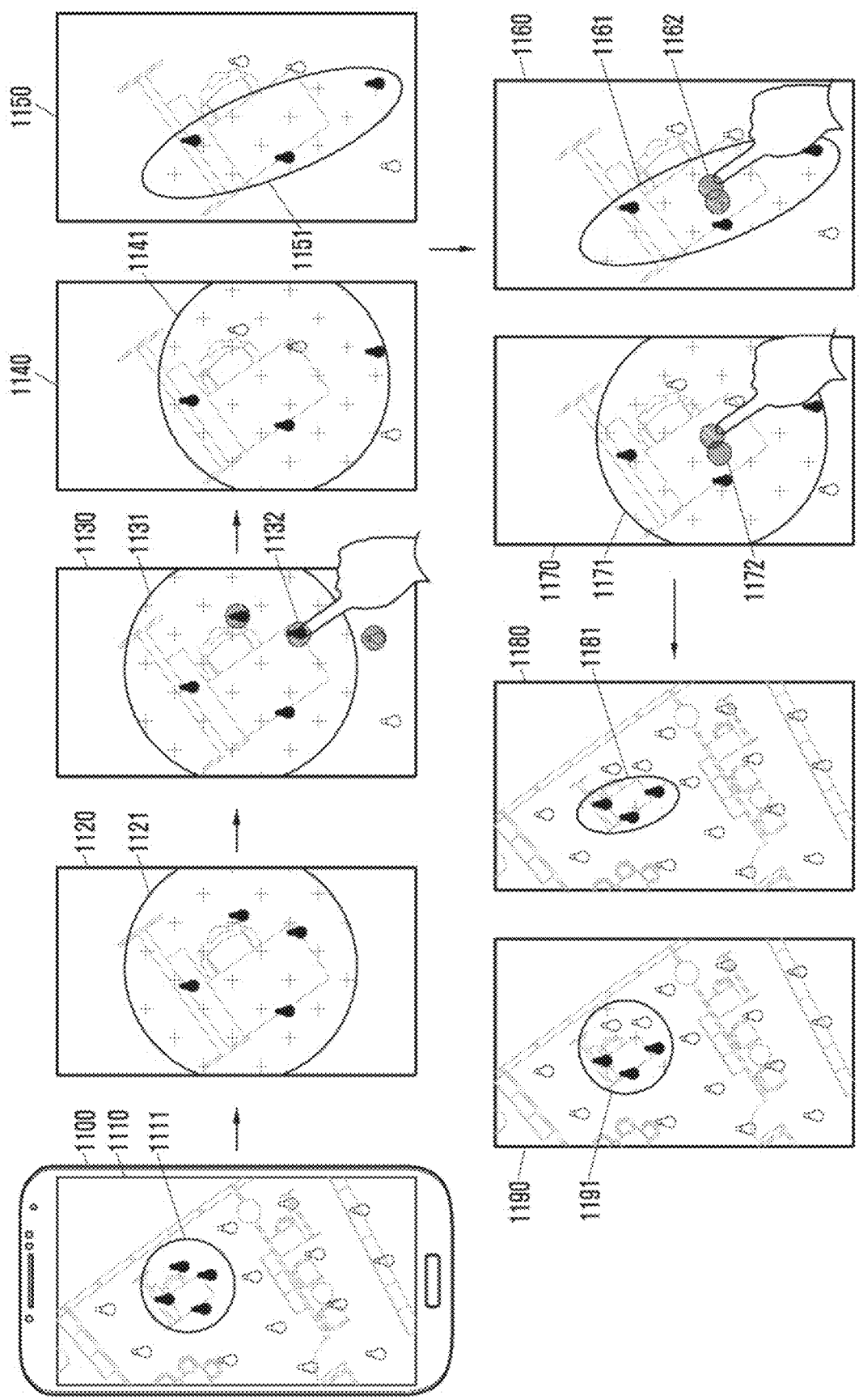
FIG. 11 is a diagram illustrating a process of receiving a user's touch-and-hold input for an external device image displayed in a selection area and deselecting a selected external device or selecting an unselected external device at a portable electronic device having a touch screen according to an embodiment of the present disclosure.

FIG. 11 is a diagram illustrating a process of receiving a user's touch-and-hold input for an external device image displayed in a selection area and deselecting a selected external device or selecting an unselected external device at a portable electronic device having a touch screen according to an embodiment of the present disclosure.

As shown in screens 1110 and 1120 in FIG. 11, the portable electronic device 1100 may extend a displayed selection area 1111 to a new selection area 1121 in response to a user's double-tap input for the displayed selection area 1111.

Then, as shown in screen 1130, the portable electronic device 1100 may deselect a selected external device in response to a user's touch-and-hold input for location information 1132 of the selected external device in a displayed selection area 1131. Further, the portable electronic device 1100 may select an unselected external device in response to a user's touch-and-hold input for location information of the unselected external device out of the displayed selection area 1131.

Then, according to some embodiments, the portable electronic device 1100 may extend, reduce or move a selection area 1141 to exclude the deselected external device and/or further include the newly selected external device while maintaining the shape of the selection area 1141 as shown in screen 1140. Alternatively, as shown in screen 1150, the portable electronic device 1100 may automatically change (e.g., resize) the shape of a selection area 1151 to exclude the deselected external device and/or further include the newly selected external device. In a certain case, the shape of the selection area may be unvaried even though the deselected external device is contained.

Thereafter, as shown in screen 1160 or 1170, the portable electronic device 1100 may automatically scale down the displayed spatial information in response to a user's double-tap input 1162 or 1172 for a displayed selection area 1161 or 1171 such that, as shown in screen 1180 or 1190, a displayed selection area 1181 or 1191 maintains a predetermined size and position on the touch screen.

Figure 12:
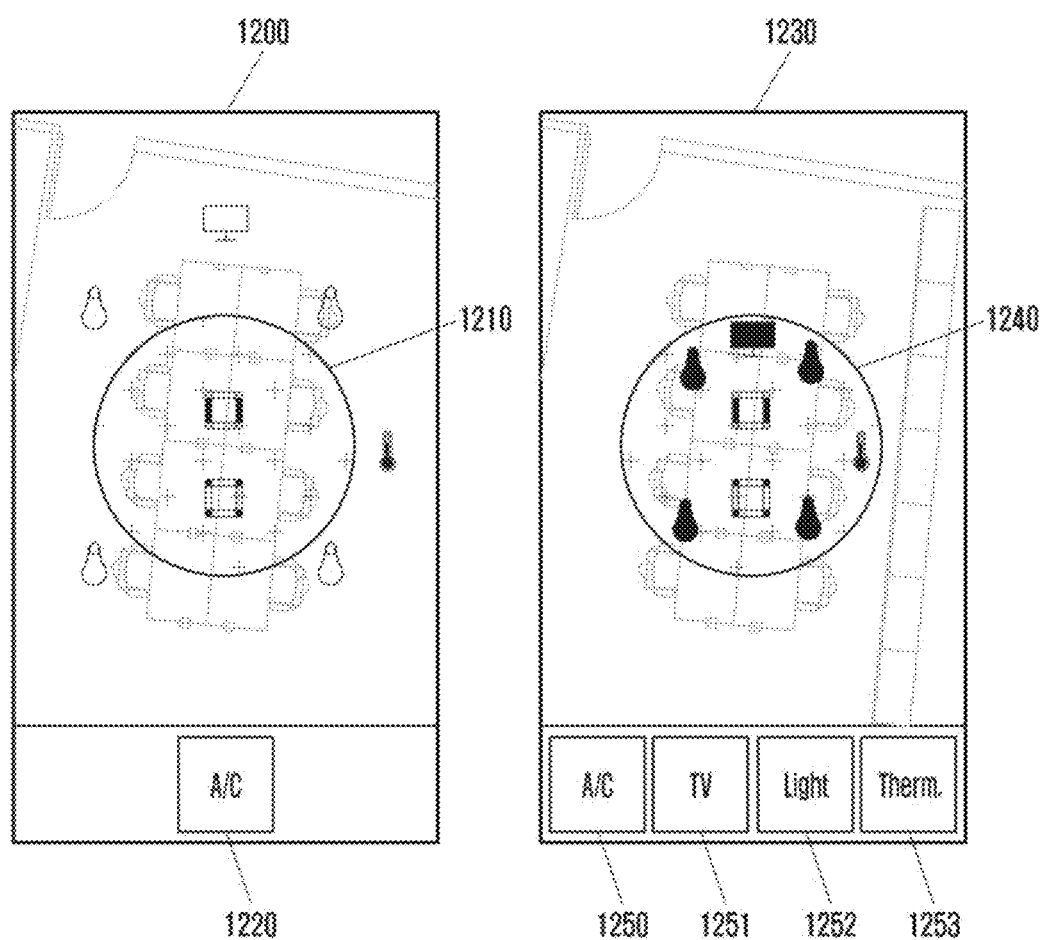
FIG. 12 is a diagram illustrating a process of receiving a user's touch input for a selection area and displaying information about an external device type corresponding to each case where external devices of the same type or different types are selected at a portable electronic device having a touch screen according to an embodiment of the present disclosure.

FIG. 12 is a diagram illustrating a process of receiving a user's touch input for a selection area and displaying information about an external device type corresponding to each case where external devices of the same type or different types are selected at a portable electronic device having a touch screen according to an embodiment of the present disclosure.

As shown in screen 1200 in FIG. 12, the portable electronic device may display external device type information 1220 about external devices of the same type when a selection area 1210 contains location information of the external devices of the same type.

On the other hand, as shown in screen 1230, the portable electronic device may display external device type information 1250, 1251, 1252 and 1253 about external devices of different types when a selection area 1240 contains location information of the external devices of different types.

Figure 13:
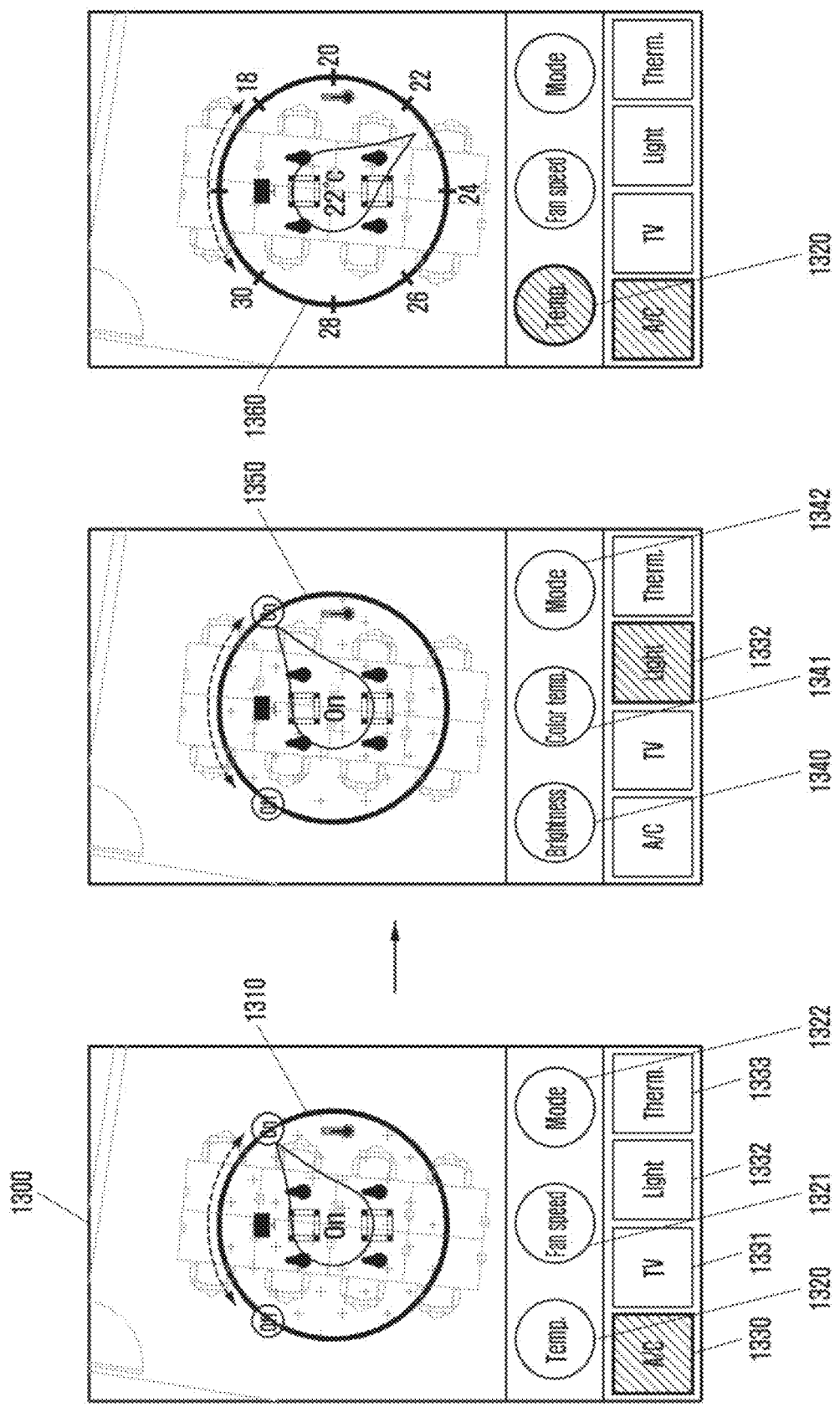
FIG. 13 is a diagram illustrating a process of displaying control status information and control function information of an external device in response to a user's touch input for information about an external device type at a portable electronic device having a touch screen according to an embodiment of the present disclosure.

FIG. 13 is a diagram illustrating a process of displaying control status information and control function information of an external device in response to a user's touch input for information about an external device type at a portable electronic device having a touch screen according to an embodiment of the present disclosure.

As shown in FIG. 13, the portable electronic device may select an air conditioner 1330 in response to a user's input (e.g., touch input) for displayed external device type information 1330, 1331, 1332 and 1333 regarding external devices of different types. Then, the portable electronic device may display control function information 1320, 1321 and 1322 corresponding to the air conditioner 1330 and also display default control function attribute information and current control status information 1310. For example, the default control function attribute information and the current control status information 1310 may be, but not limited to, power on/off.

Similarly, when a light 1332 is selected in response to a user's input (e.g., touch input) for the displayed external device type information 1330 to 1333, the portable electronic device may display control function information 1340, 1341 and 1342 corresponding to the light 1332 and also display default control function attribute information and current control status information 1350. For example, the default control function attribute information and the current control status information 1350 may be, but not limited to, power on/off.

In addition, when the temperature 1320 is selected in response to a user's input (e.g., touch input) for the displayed control function information 1320 to 1322, the portable electronic device may newly display control function attribute information and current control status information 1360 corresponding to the temperature 1320 instead of the displayed control function attribute information and current control status information 1310 or 1350.

FIGS. 14A, 14B, 14C and 14D are diagrams illustrating a process of changing a selection mode for selecting an external device to be controlled to a control mode for controlling the selected external device or changing the control mode to the selection mode in response to a user's touch input for a selection area at a portable electronic device having a touch screen according to an embodiment of the present disclosure.

Figure 14A:
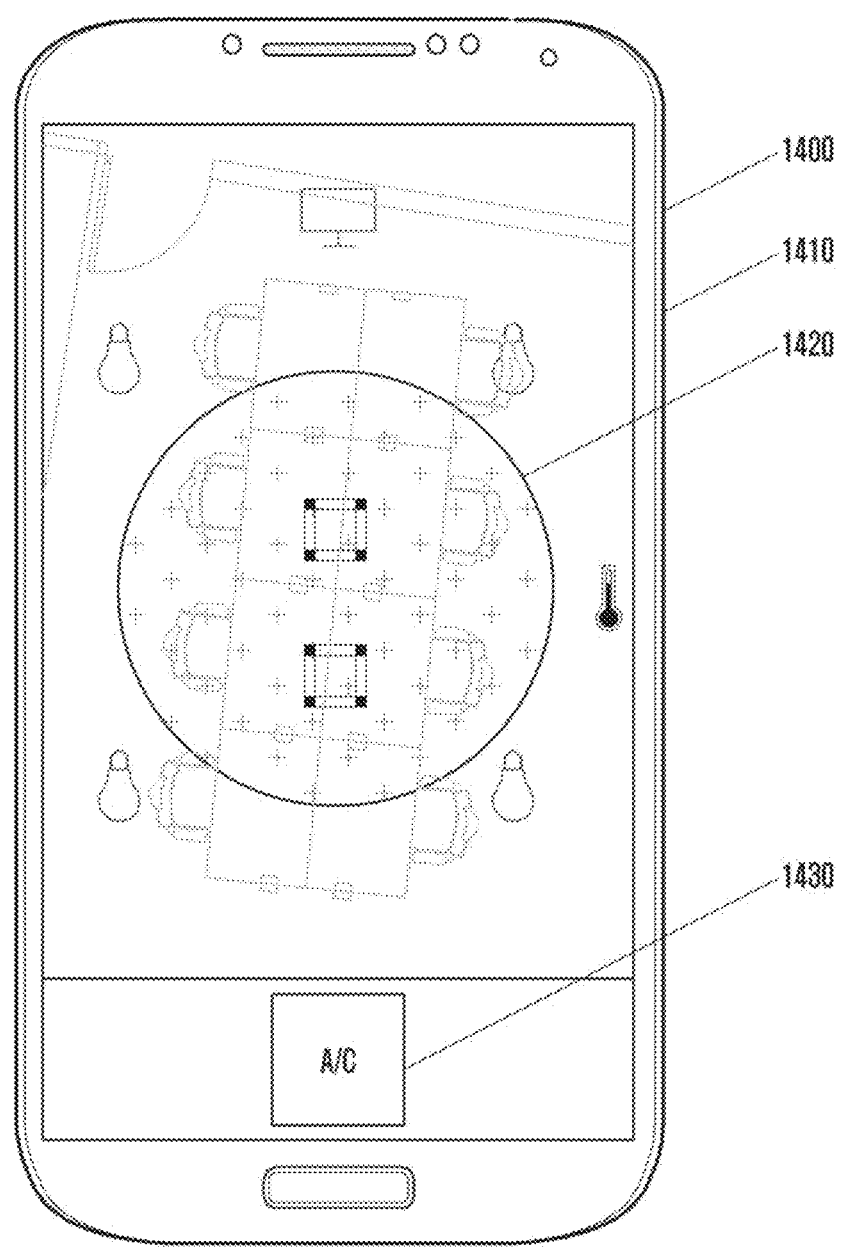

As shown in FIG. 14A, the portable electronic device 1400 may provide a selection mode in which a selection area 1420 and external device type information 1430 are displayed with predetermined sizes at predetermined positions on the touch screen 1410.

Figure 14B:
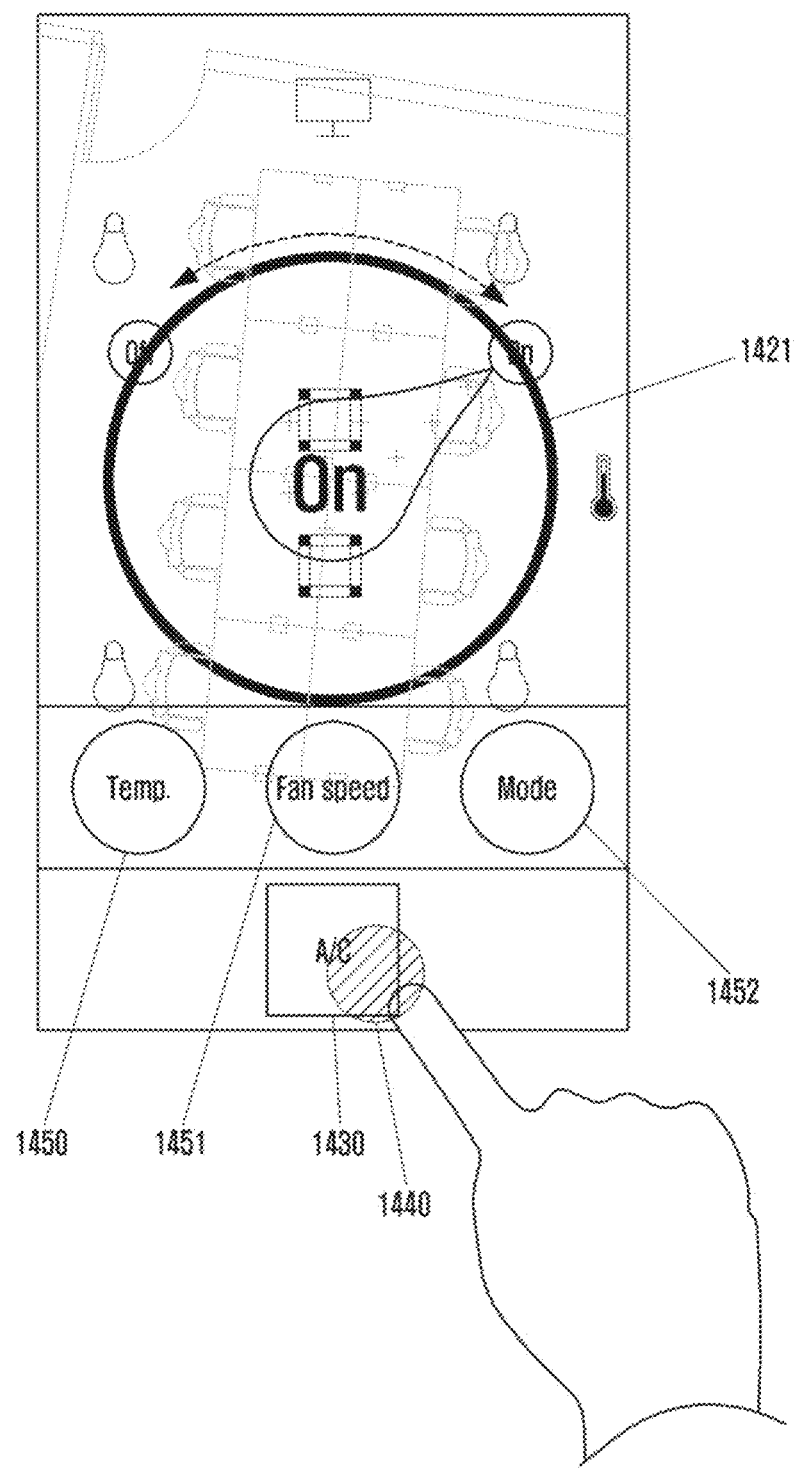

As shown in FIGS. 14A and 14B, when the external device type information 1430 is selected in response to a user's touch input 1440, the portable electronic device 1400 may select an air conditioner as an external device to be controlled, and then change the selection mode to a control mode 1450, 1451, 1452 in which the selection area 1420 displays control function attribute information, set as default for the air conditioner, and current control status information 1421. For example, the default control function attribute information and current control status information 1421 for the air conditioner may be, but not limited to, power on/off.

Figure 14C:
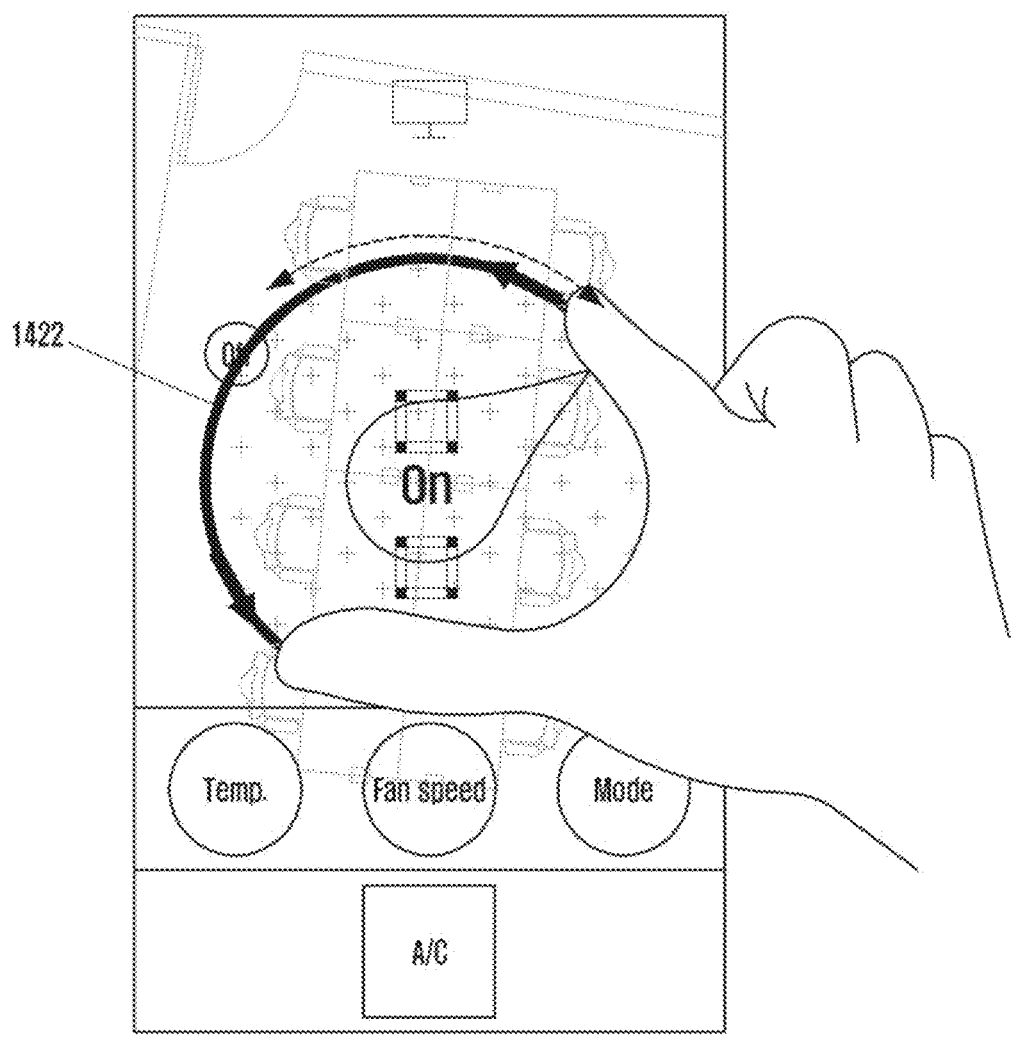

Then, in response to a user's rotate touch input for default control function attribute information and current control status information 1422 in the control mode as shown in FIG. 14C, the portable electronic device 1400 may display changed control function attribute information and current control status information 1423 as shown in FIG. 14D. The user's rotate touch input may be a multi-touch input performed at two or more points simultaneously, or a one-touch input performed at only one point. Additionally, the rotate touch input may have a clockwise or counterclockwise direction depending on the status of a control function to be changed.

The portable electronic device 1400 may generate a control message for controlling at least one external device in response to the rotate touch input. Then, the portable electronic device 1400 may transmit the control message to the at least one external device or a server that manages the at least one external device.

In some embodiment, the portable electronic device 1400 may turn off at least one air conditioner disposed in the selection area 1420 in response to a user's dual touch rotate input. When the power of the at least one air conditioner is turned off, the portable electronic device 1400 may deactivate the control function information corresponding to the air conditioner and display the deactivated information on the touch screen.

According to a certain embodiment, after the control function information is deactivated, the portable electronic device 1400 may change the control mode for the selected external device (e.g., air conditioner) to the selection mode in response to a user's touch input 1460. According to another embodiment, after the control function information is deactivated, the portable electronic device 1400 may release the control mode for change the selected external device (e.g., air conditioner) and change to the selection mode in response to a user's touch-and-hold input 1470 for a changed control value.

FIGS. 15A, 15B, 15C, 15D and 15E are diagrams illustrating a process of changing a selection mode to a control mode in response to a user's touch input, displaying control device type information, control function information, control status information and control function attribute information in the control mode, and controlling an external device in response to a user's touch input for such information at a portable electronic device having a touch screen according to an embodiment of the present disclosure.

Figure 15A:
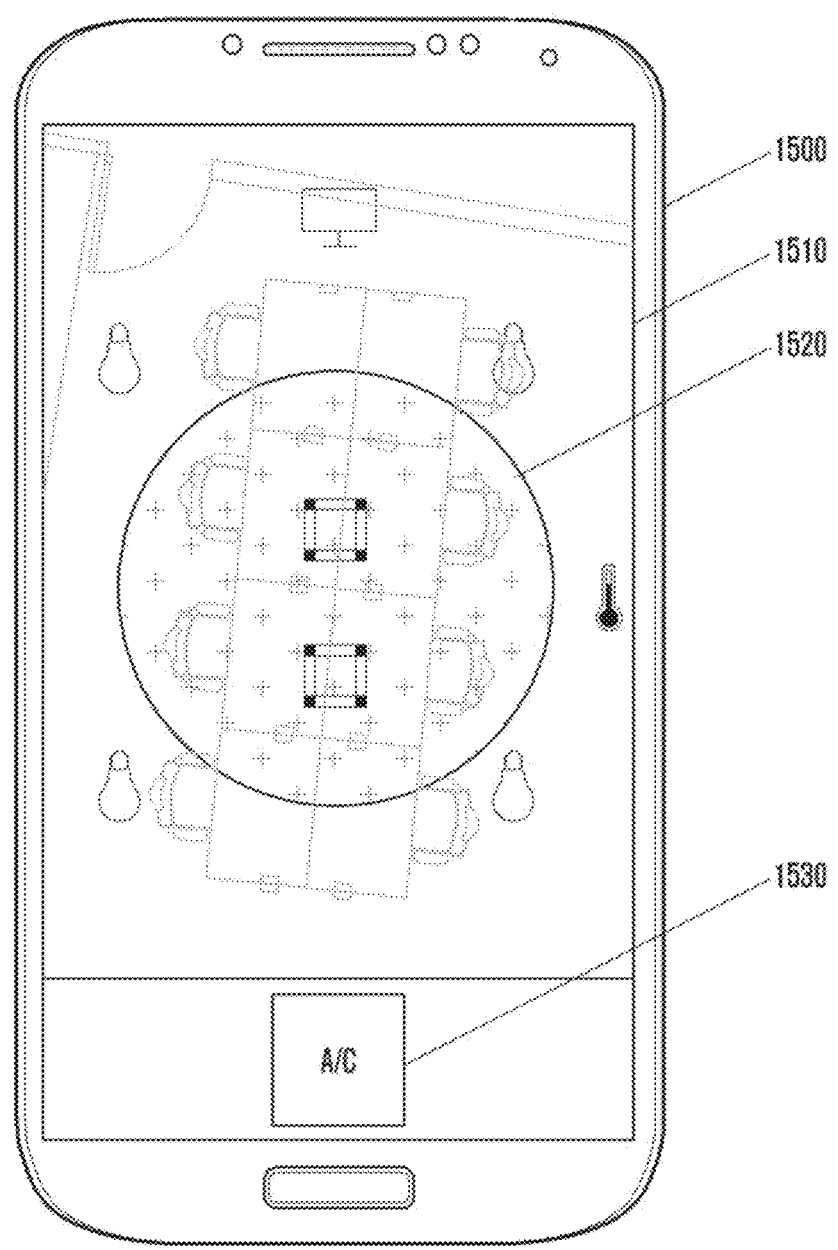

As shown in FIG. 15A, the portable electronic device 1500 may display a selection area 1520 and external device type information 1530 with predetermined sizes at predetermined positions on the touch screen 1510.

Figure 15B:
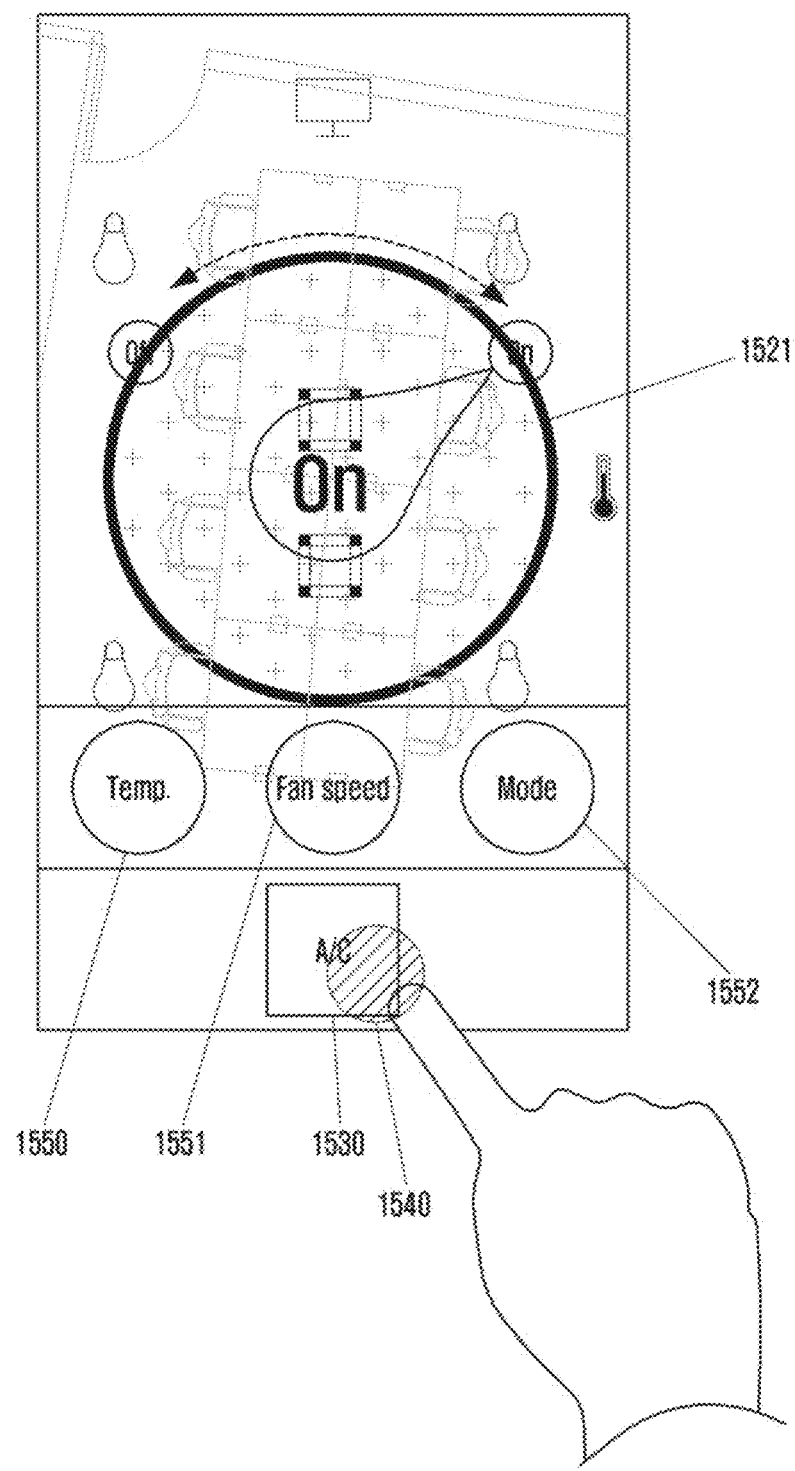

As shown in FIGS. 15A and 15B, when the external device type information 1530 is selected in response to a user's touch input 1540, the portable electronic device 1500 may select an air conditioner as an external device to be controlled, and then change the selection area 1520 to display control function attribute information, set as default, and current control status information 1521. For example, the default control function attribute information and current control status information 1521 may be power on/off. Also, the portable electronic device 1500 may further display control function information 1550, 1551 and 1552 corresponding to the air conditioner.

Figure 15C:
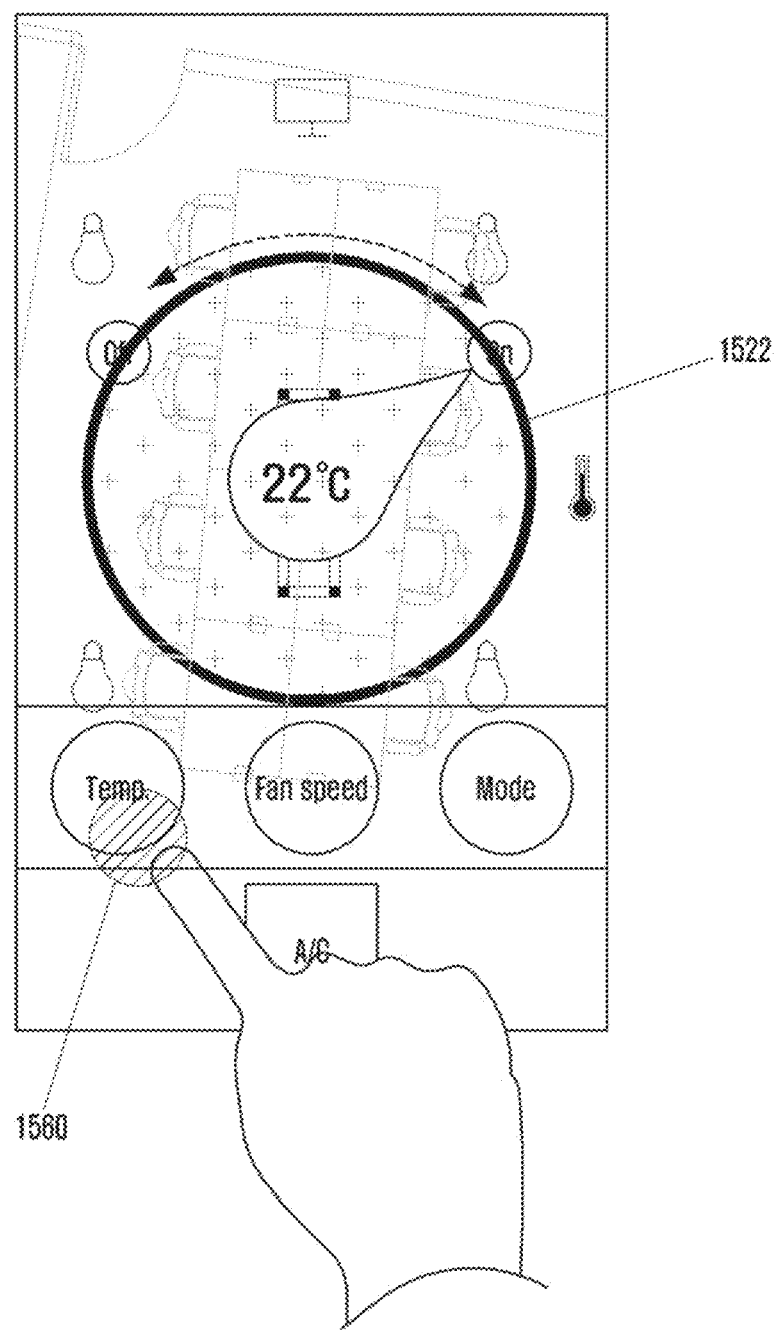

Then, as shown in FIG. 15C, the portable electronic device 1500 may select a temperature 1550 from the displayed control function information 1550 to 1552 in response to a user's touch input 1560, and display control function attribute information and current control status information 1522 to adjust the temperature 1550.

Figure 15D:
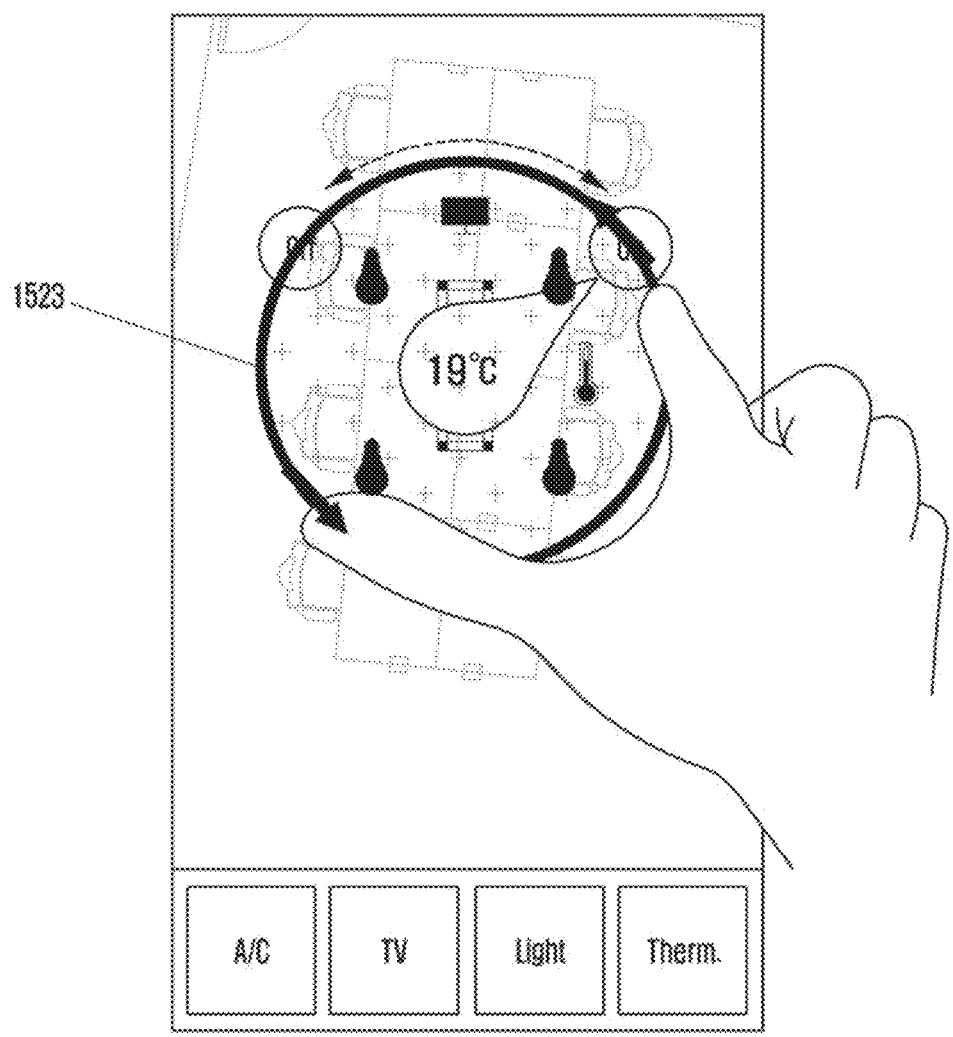

Then, as shown in FIG. 15D, in some embodiments, the portable electronic device 1500 may display changed control status information 1523 for the displayed control function attribute information 1522 in response to a user's rotate touch input for the control function attribute information 1522 to adjust the temperature 1550. The user's rotate touch input may be a multi-touch input or a one-touch input, and may have a clockwise or counterclockwise direction depending on the status of a control function to be changed. For example, the portable electronic device 1500 may lower the setting temperature of the air conditioner from 22 degrees to 19 degrees in response to the user's rotate touch input.

The portable electronic device 1500 may generate a control message (e.g., for lowering the setting temperature of the air conditioner from 22 degrees to 19 degrees) in response to a user's rotate touch input and then transmit the control message to the air conditioner or a server for managing the air conditioner.

Then, as shown in FIG. 15E, after the control status information regarding the control function attribute information for the air conditioner is changed, the portable electronic device 1500 may deselect the selected control function information (e.g., temperature) in response to a user's touch input 1570, and also set (or return to) the default control information (e.g., power on/off).

According to another embodiment, after the control information for the air conditioner is changed, the portable electronic device 1500 may deselect the selected external device (e.g., air conditioner) in response to a user's touch input 1580, and also change the control mode to the selection mode.

According to still another embodiment, after the control information for the air conditioner is changed, the portable electronic device 1500 may deselect the selected external device (e.g., air conditioner) in response to a user's touch-and-hold input 1590 for a changed control value, and also change the control mode to the selection mode.

FIGS. 16A, 16B, 16C, 16D, 16E and 16F are diagrams illustrating a process of performing a common control for a plurality of selected external devices of different types, based on common control function attribute information, in response to a user's touch input at a portable electronic device having a touch screen according to an embodiment of the present disclosure.

Figure 16A:
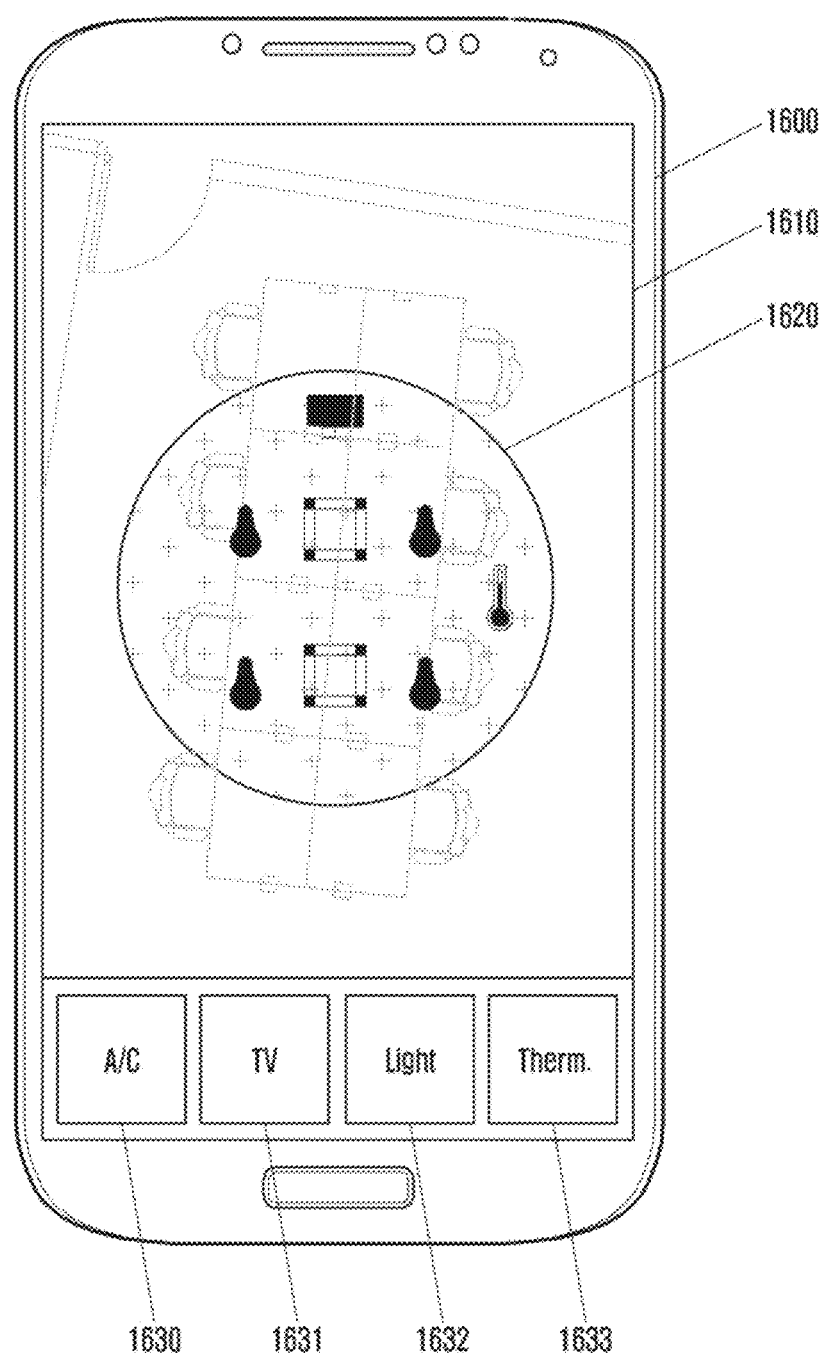
FIGS. 16A, 16B, 16C, 16D, 16E and 16F are diagrams illustrating a process of performing a common control for a plurality of selected external devices of different types, based on common control function attribute information, in response to a user's touch input at a portable electronic device having a touch screen according to an embodiment of the present disclosure.

As shown in FIG. 16A, the portable electronic device 1600 may display a selection area 1620 and external device type information 1630, 1631, 1632 and 1633 with predetermined sizes at predetermined positions on the touch screen 1610.

Figure 16B:
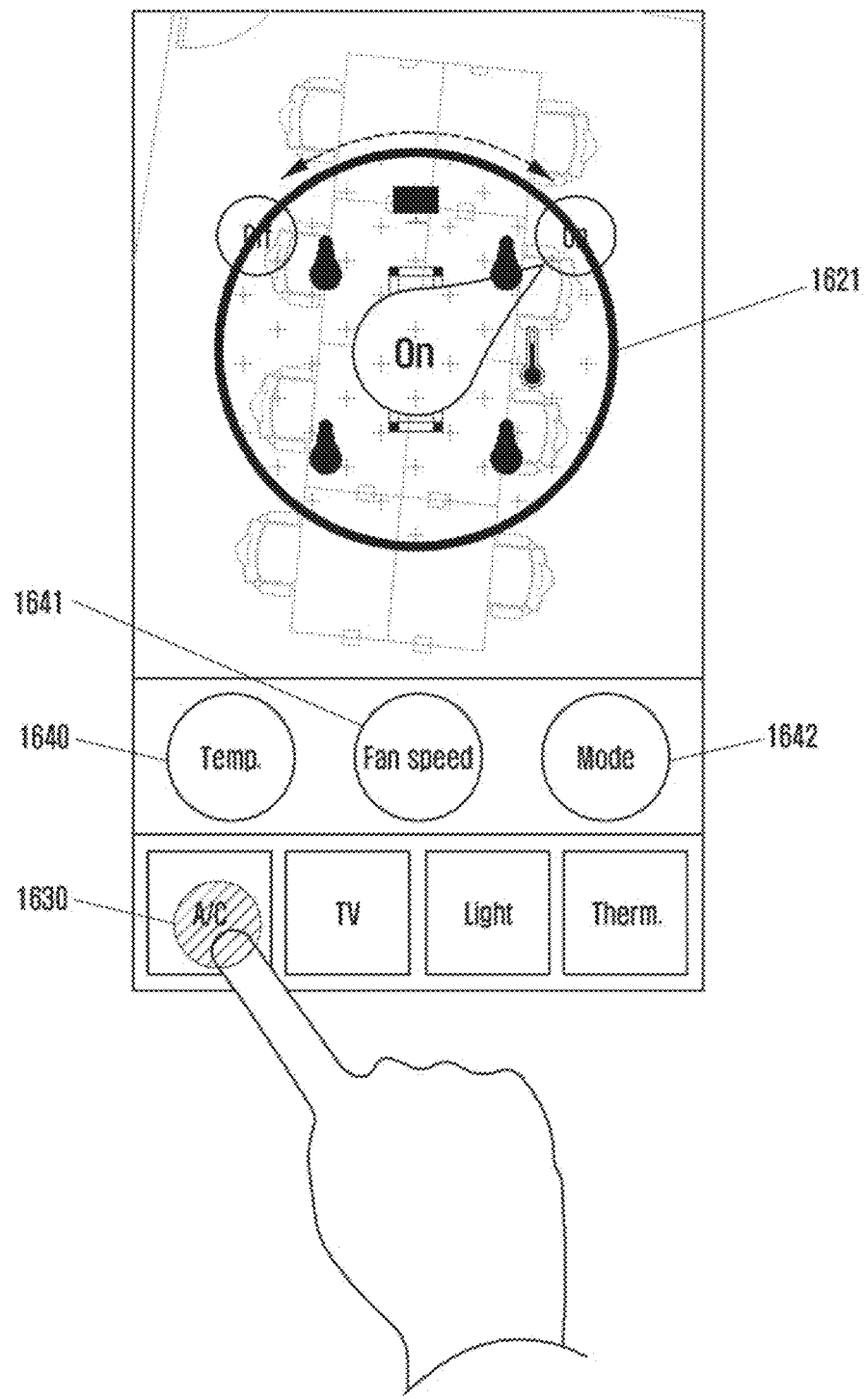

As shown in FIGS. 16A and 16B, when the external device type information 1630 is selected in response to a user's touch input, the portable electronic device 1600 may select an air conditioner as an external device to be controlled, and then change the selection area 1620 to display control function attribute information, set as default, and current control status information 1621. For example, the default control function attribute information and current control status information 1621 may be power on/off. Also, the portable electronic device 1600 may further display control function information 1640, 1641 and 1642 corresponding to the air conditioner.

Figure 16C:
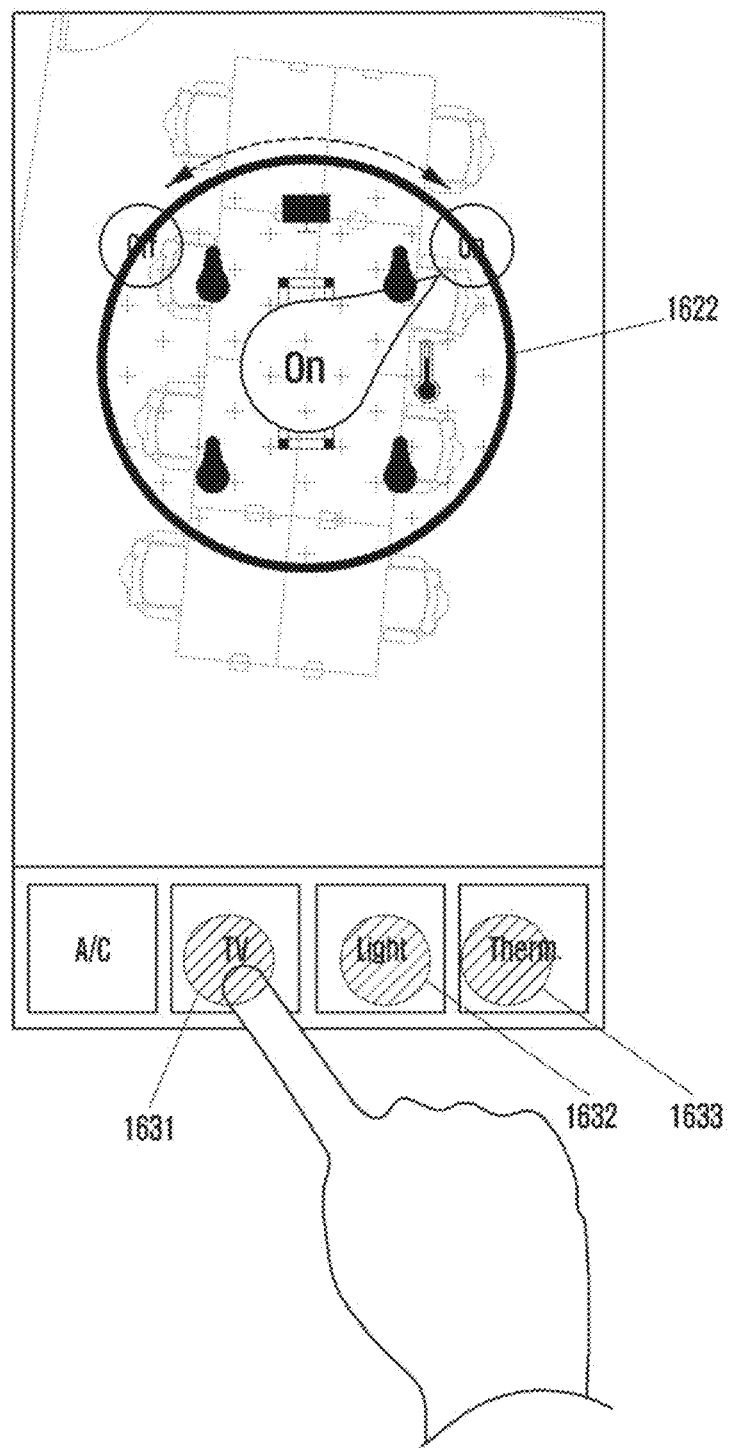

Then, as shown in FIG. 16C, the portable electronic device 1600 may add a TV, a light, and a thermometer as external devices to be controlled by further selecting the external device type information 1631, 1632 and 1633 in response to user's touch inputs. In addition, the portable electronic device 1600 may display common control function attribute information 1622 for the selected external device type information 1630 to 1633. However, since the external devices of different types are selected, the portable electronic device 1600 may not display the control function information for each external device.

Figure 16D:
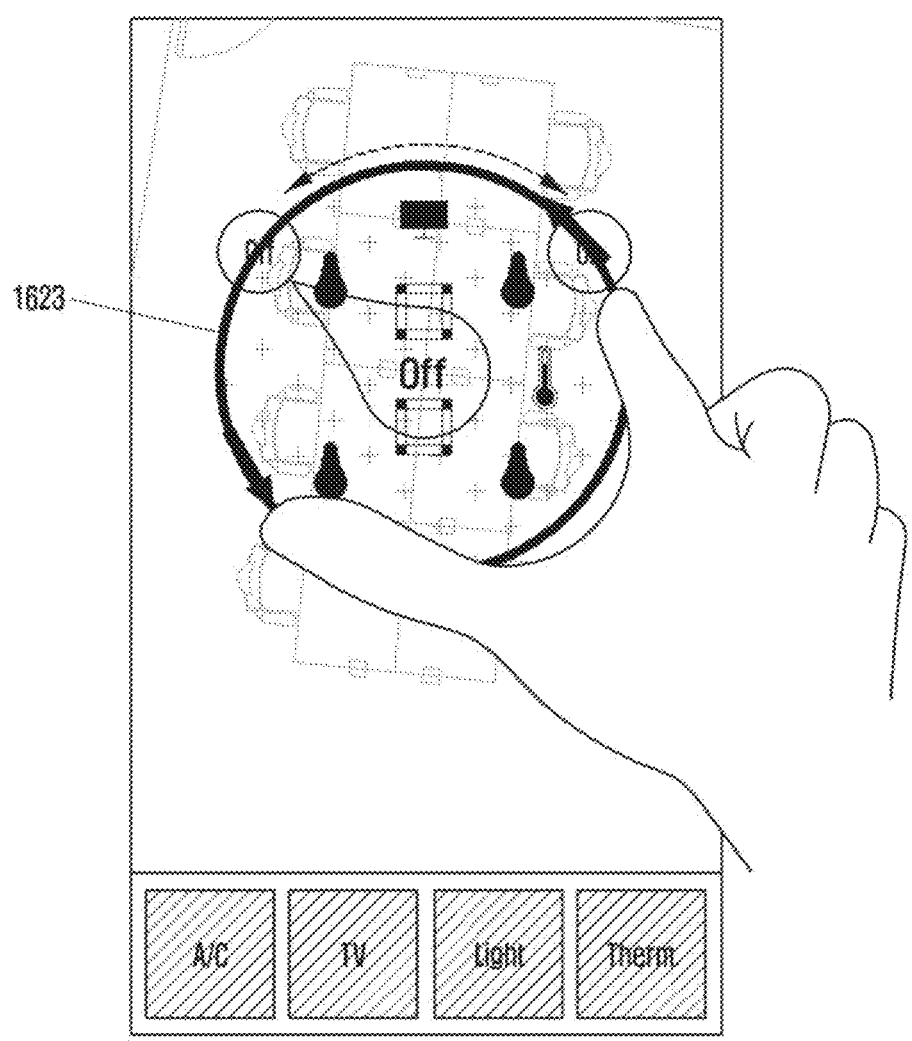
Figure 16E:
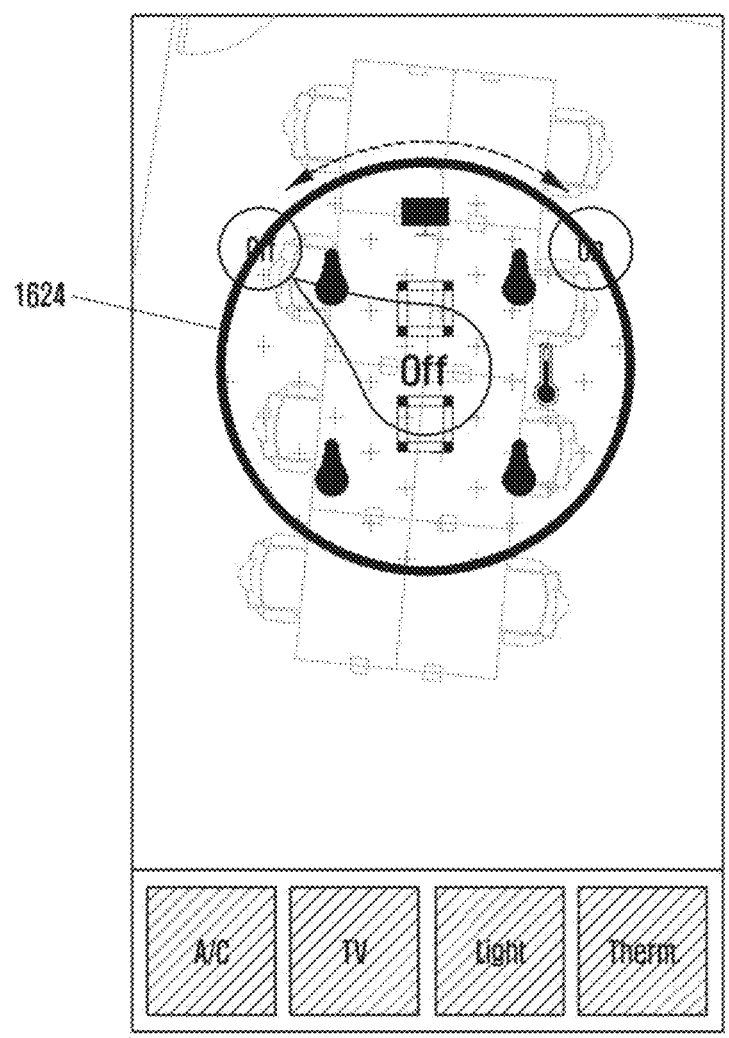
Figure 16F:
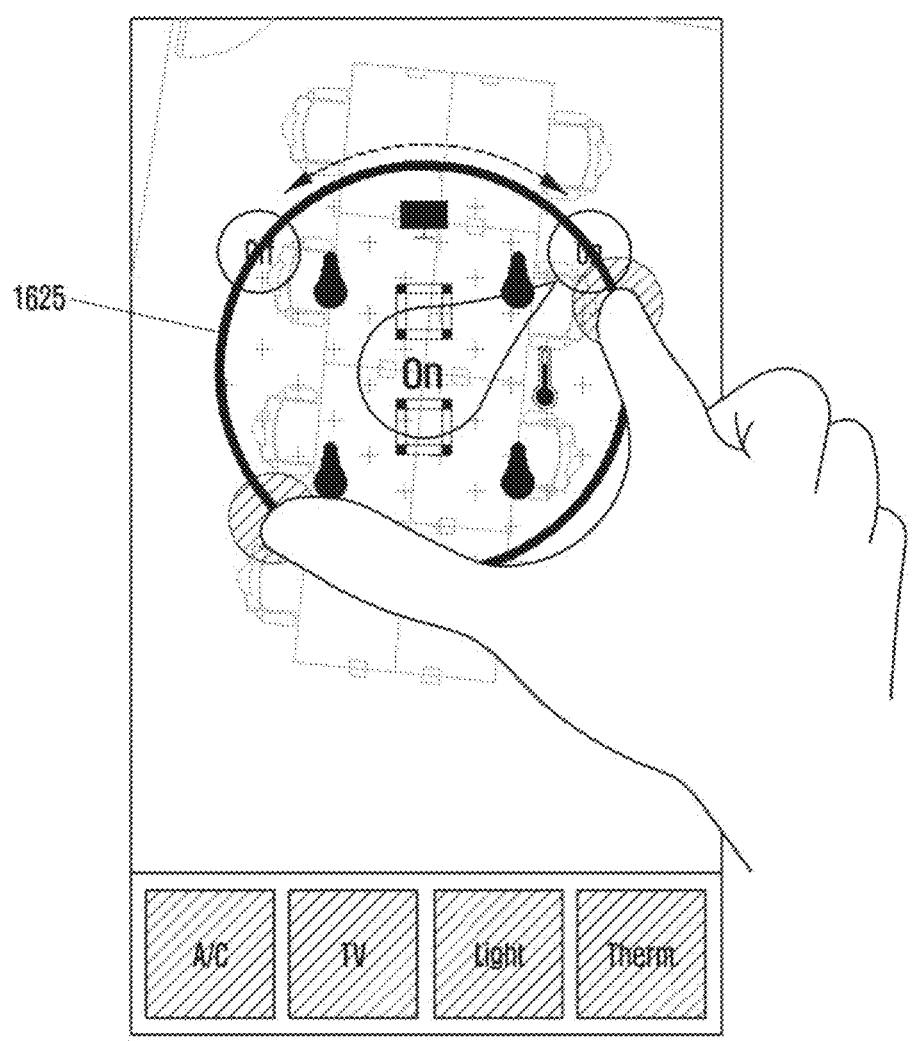

Then, as shown in FIG. 16D, the portable electronic device 1600 may display changed control status information 1623 for the common control function attribute information in response to a user's rotate touch input to adjust the common control function attribute information 1622. The user's rotate input may be a multi-touch input or a one-touch input, and may have a clockwise or counterclockwise direction 1624, 1625 as illustrated in FIGS. 16E and 16F depending on the status of a control function attribute to be changed. For example, in response to a user's dual-touch rotate input, the portable electronic device 1600 may turn on or off the external devices of different types (e.g., air conditioner, TV, light, and thermometer).

Further, the portable electronic device 1600 may generate a control message for collectively changing the power state of the external devices of different types in response to a user's dual-touch rotate input. Then, the portable electronic device 1600 may transmit the control message to each of the external devices of different types or a server that manages the external devices of different types.

FIGS. 17A, 17B, 17C, 17D and 17E are diagrams illustrating a process of controlling external devices of the same type or different types in response to a user's touch input at a portable electronic device having a touch screen according to an embodiment of the present disclosure.

Figure 17A:
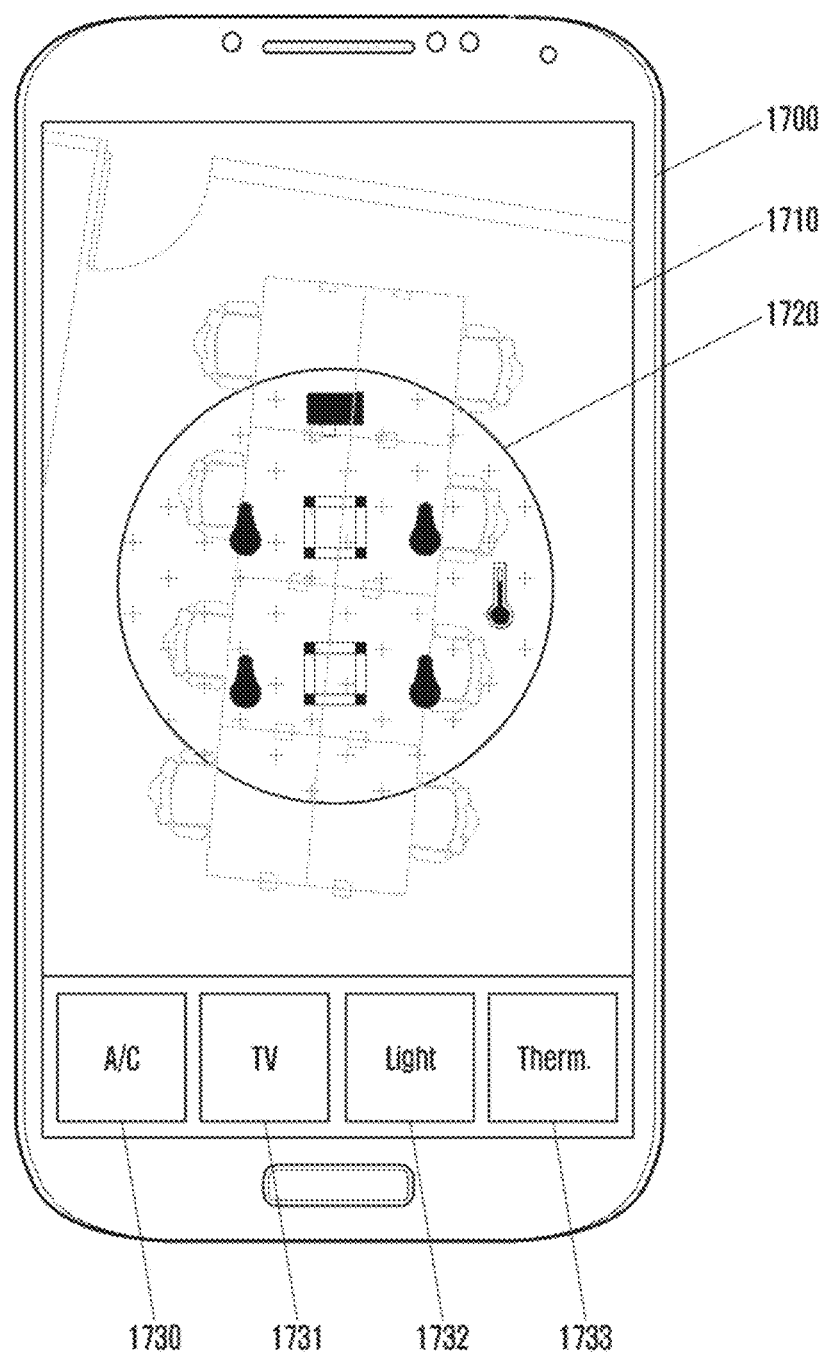
FIGS. 17A, 17B, 17C, 17D and 17E are diagrams illustrating a process of controlling external devices of the same type or different types in response to a user's touch input at a portable electronic device having a touch screen according to an embodiment of the present disclosure.
Figure 17B:
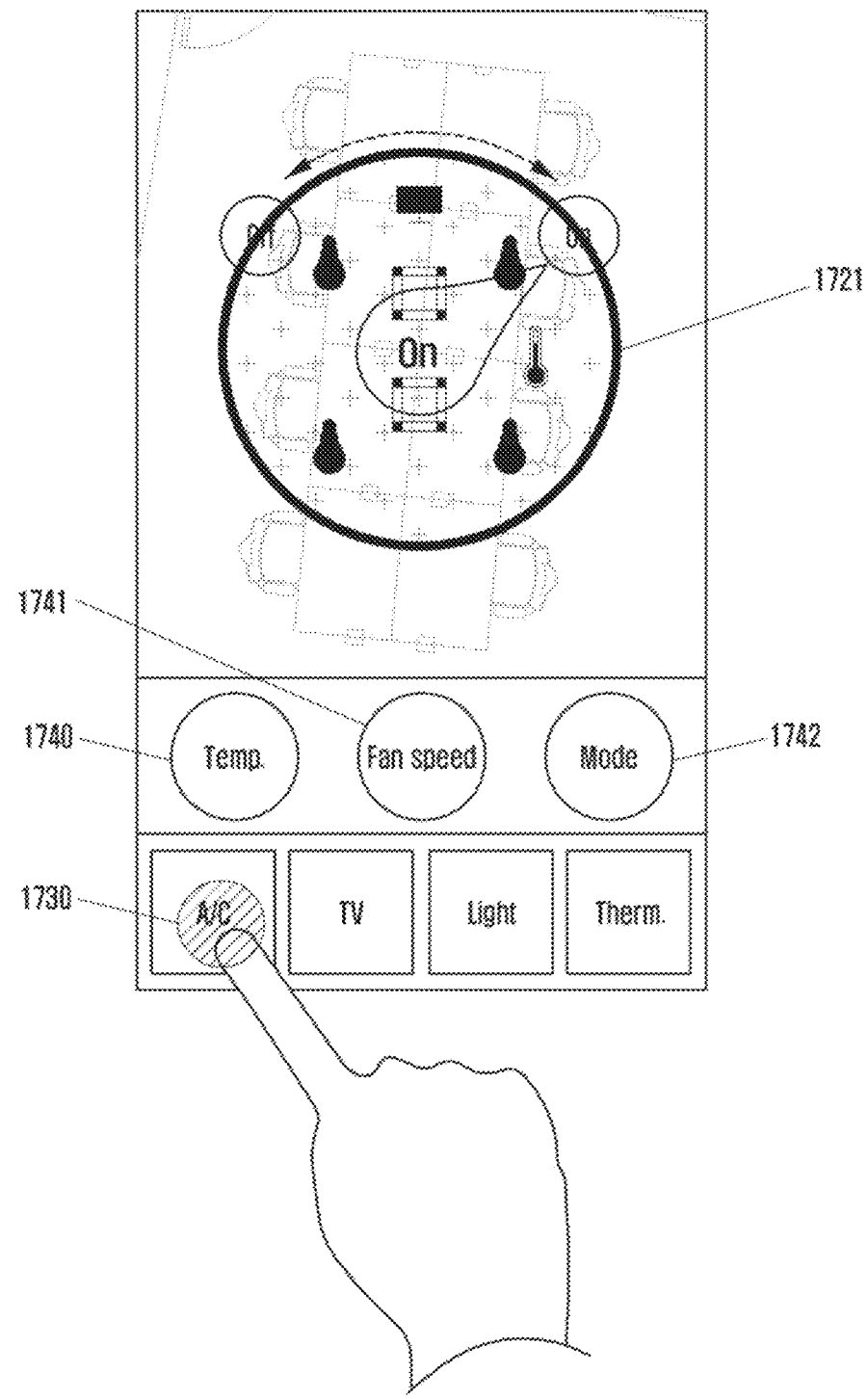
Figure 17C:
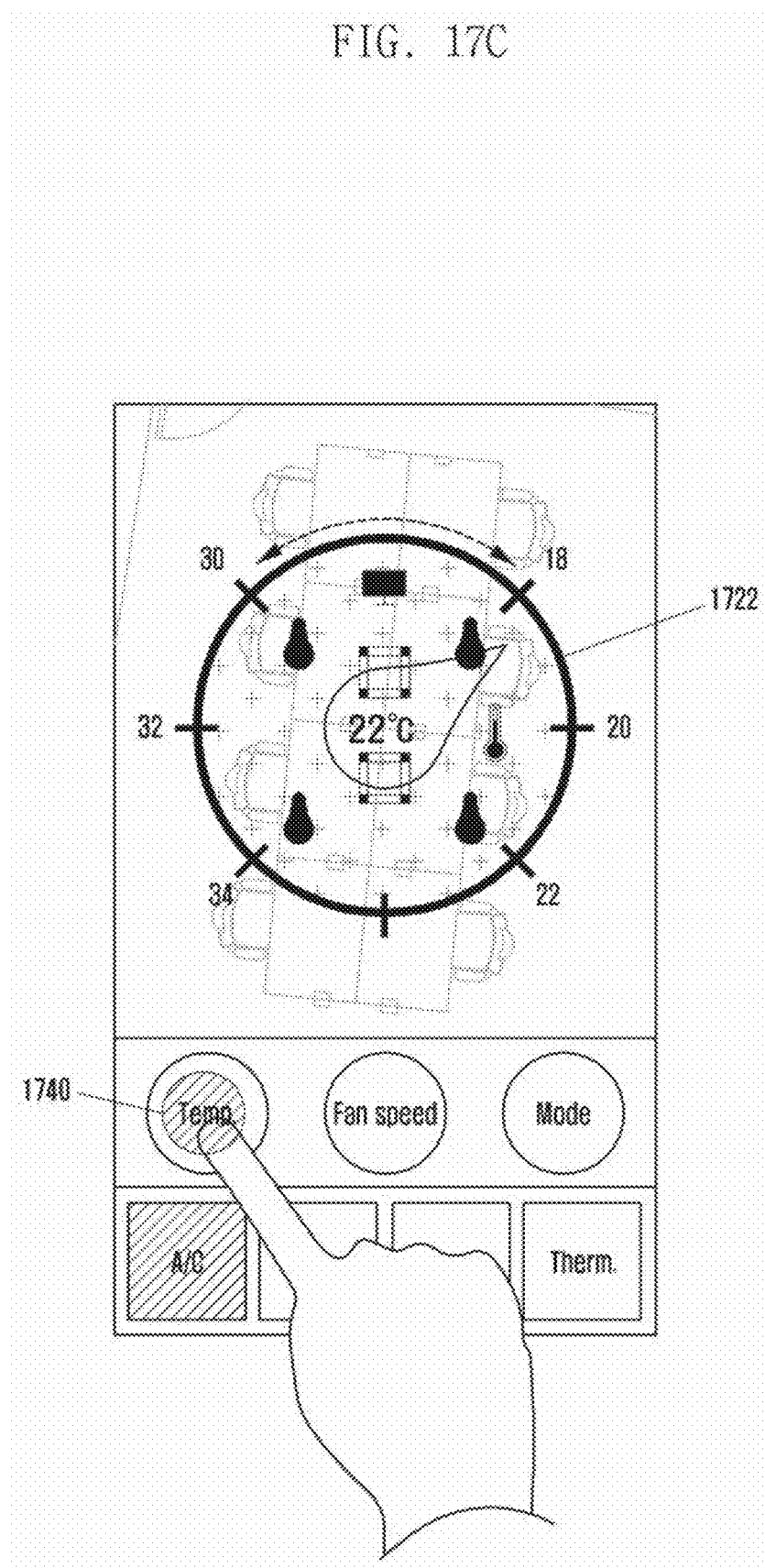

As shown in FIGS. 17A, 17B and 17C, the portable electronic device 1700 may display a selection area 1720 may select an air conditioner, as an external device to be controlled, from external device type information 1730, 1731, 1732 and 1733 in response to a user's first touch input 1730 at predetermined positions on the touch screen 1710, and also display control function information 1740, 1741 and 1742 for the air conditioner. Then, the portable electronic device 1700 may select a temperature from the control function information 1740 to 1742 for the air conditioner in response to a user's second touch input 1740, and adjust the control status information regarding the control attribute information for the temperature of the air conditioner in response to a user's third touch input (e.g., rotate input) and then change the selection area 1720 to display control function attribute information, set as default 1721, and current control status information 1722.

In addition, the portable electronic device 1700 may generate a control message for adjusting the control status information for the temperature of the air conditioner in response to the user's third touch input. Then, the portable electronic device 1700 may transmit the control message to the air conditioner or a server for managing the air conditioner.

Figure 17D:
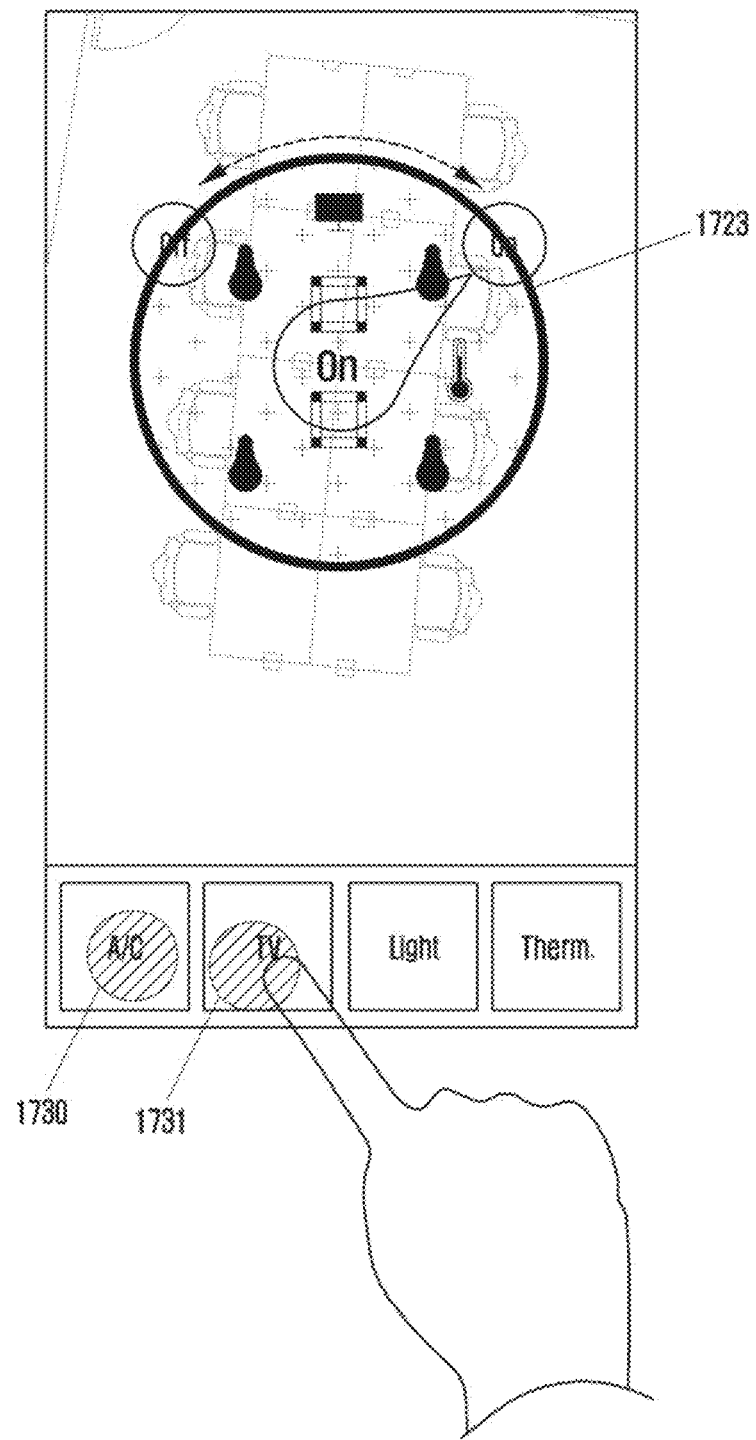
Figure 17E:
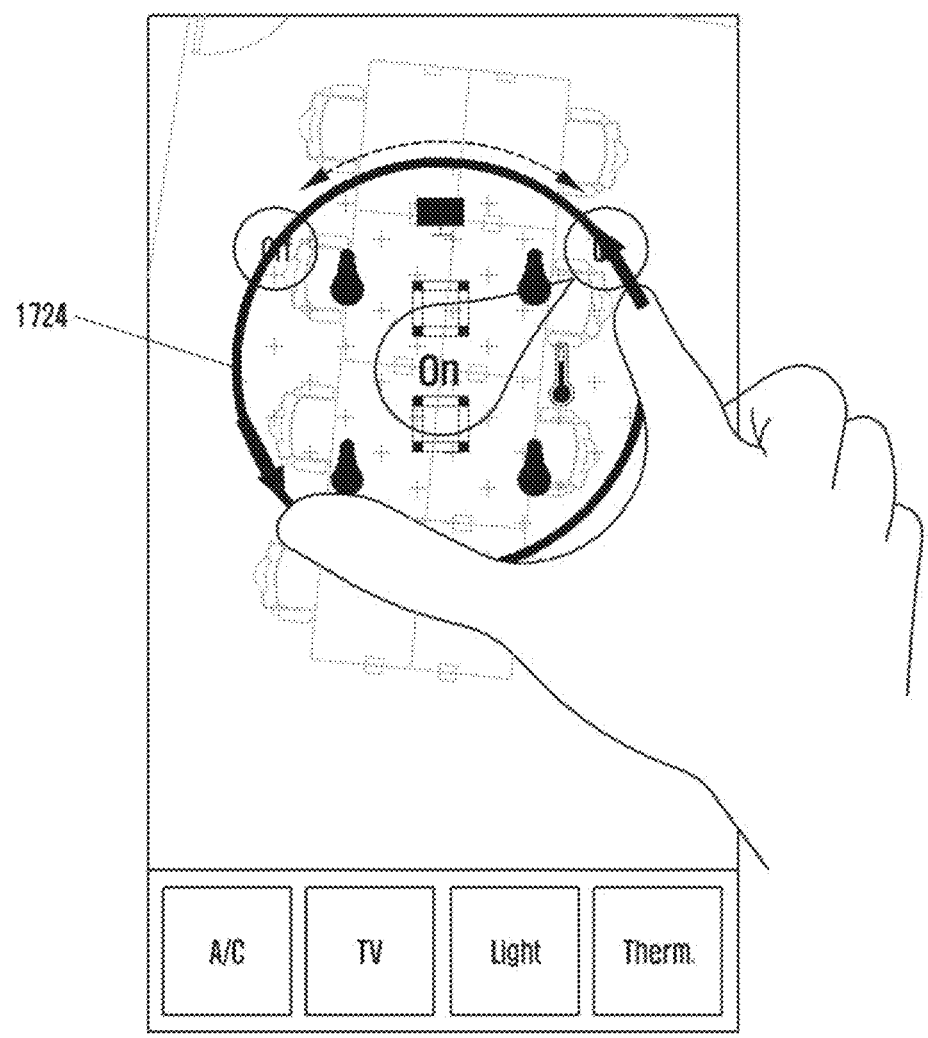

Meanwhile, as shown in FIGS. 17D and 17E, the portable electronic device 1700 may select an air conditioner and a TV, as external devices to be controlled, from the external device type information 1730 to 1733 in response to user's first touch inputs 1730 and 1731, and also display the common control function attribute information 1723 for both the air conditioner and the TV. Then, the portable electronic device 1700 may adjust the control status information 1723 and 1724 regarding the common control function attribute information for the air conditioner and the TV in response to a user's second touch input (e.g., rotate input).

Figure 18:
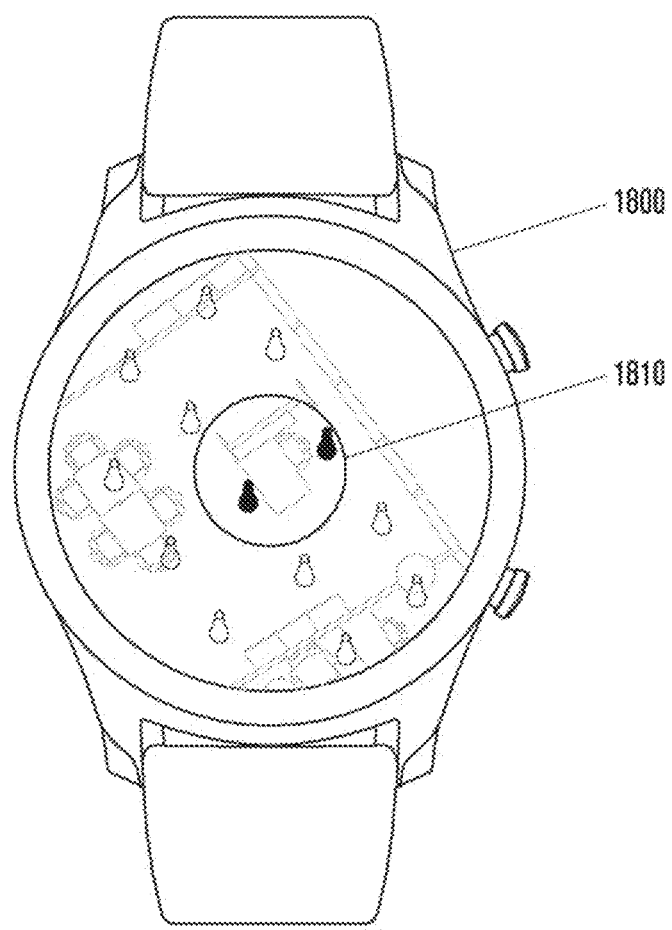
FIG. 18 is a diagram illustrating a selection area for selecting one or more external devices at a wearable electronic device having a touch screen and at least one physical key according to an embodiment of the present disclosure.

FIG. 18 is a diagram illustrating a selection area for selecting one or more external devices at a wearable electronic device having a touch screen and at least one physical key according to an embodiment of the present disclosure.

In this example embodiment of the present disclosure, a wearable electronic device 1800 may be implemented as a watch-type wearable device. Depending on embodiments, a display of the wearable electronic device 1800 may be implemented as a touch screen, or not.

The wearable electronic device 1800 may perform operations in accordance with an example embodiment of the present disclosure in response to a user's touch input for the touch screen equipped in the wearable electronic device 1800. In addition, the wearable electronic device 1800 may perform the operations of the second embodiment in response to a user's input for a physical key (e.g., crown, bezel, etc.) equipped in the wearable electronic device 1800.

As shown in FIG. 18, the wearable electronic device 1800 may display a selection area 1810 having a predetermined shape on a display. As described in the first embodiment, the selection area 1810 of the second embodiment refers to a particular area that is set to allow one or more external devices (or IoT devices) to be selected in response to a user's input in displayed spatial information.

Although the selection area 1810 is shown as a circular shape for convenience of illustration, the selection area 1810 according to embodiments of the present disclosure may be set to have various shapes (e.g., an elliptical shape, a triangular shape, a rectangular shape, a polygonal shape, or a free shape).

The wearable electronic device 1800 may receive location information of a plurality of external devices from a server. Then, based on the location information, the wearable electronic device 1800 may display spatial information (e.g., a map) related to the location information of the plurality of electronic devices. Also, the wearable electronic device 1800 may display the selection area 1810 with a predetermined size at a predetermined position within the spatial information.

Figure 19:
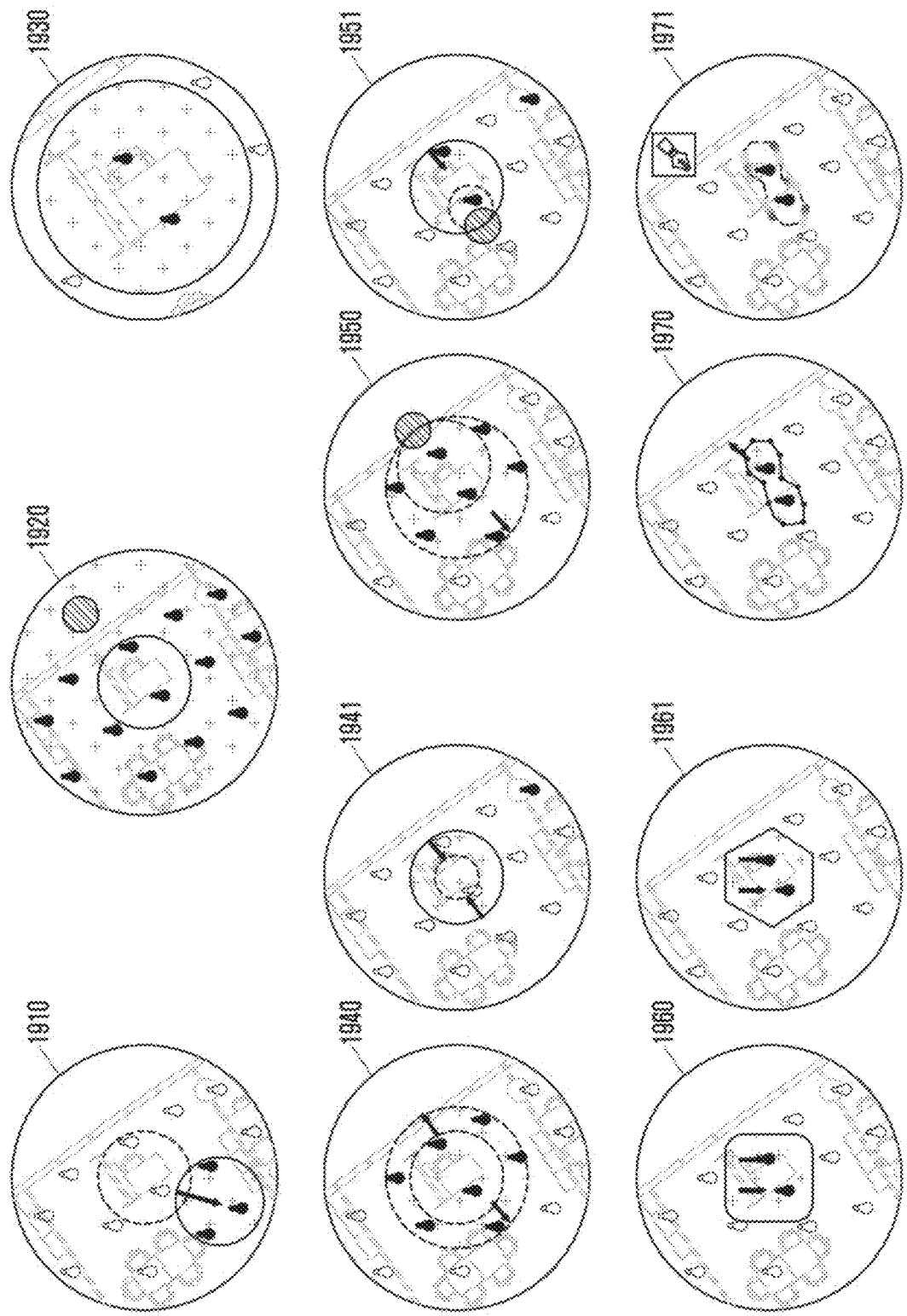
FIG. 19 is a diagram illustrating a process of moving, inverting, extending, reducing, and changing a selection area in response to a user's touch input at a wearable electronic device having a touch screen and at least one physical key according to an embodiment of the present disclosure.

FIG. 19 is a diagram illustrating a process of moving, inverting, extending, reducing, and changing a selection area in response to a user's touch input at a wearable electronic device having a touch screen and at least one physical key according to an embodiment of the present disclosure.

Referring to FIGS. 18 and 19, the wearable electronic device 1800 may move, invert, extend, reduce, and change the selection area 1810 in a manner similar or identical to that described in FIGS. 1 to 11.

Namely, the wearable electronic device 1800 may move, invert, extend, reduce, and change the selection area 1810 in response to a user's touch input for the wearable electronic device 1800 as described above in FIGS. 1 to 11.

Specifically, as shown in screen 1910, the wearable electronic device 1800 may move the selection area 1810 in response to a user's predetermined first touch input (e.g., a touch and drag). As shown in screen 1920, the wearable electronic device 1800 may invert the selection area 1810 in response to a user's predetermined second touch input (e.g., a touch and hold). As shown in screen 1930, the wearable electronic device 1800 may extend the selection area 1810 in response to a user's predetermined third touch input (e.g., a double tap).

In addition, as shown in screen 1940 or 1941, the wearable electronic device 1800 may symmetrically extend or reduce the selection area 1810 in response to a user's predetermined fourth touch input (e.g., a pinch-to-zoom). As shown in screen 1950 or 1951, the wearable electronic device 1800 may asymmetrically extend or reduce the selection area 1810 in response to a user's predetermined fifth touch input (e.g., a unidirectional pinch-to-zoom).

In addition, as shown in screen 1960 or 1961, the wearable electronic device 1800 may change the shape of the selection area 1810 in response to a user's predetermined sixth touch input (e.g., a touch and flick). As shown in screen 1970 or 1971, the wearable electronic device 1800 may change the shape of the selection area 1810 by entering a free-point editing mode or a free pen mode in response to a user's predetermined seventh touch input (e.g., a pen mode icon tab).

Additionally or alternatively, the wearable electronic devices 2000, 2100, 2200 and 2300 shown in FIGS. 20 to 23 may move, invert, extend, reduce, and change selection areas 2010 to 2310 in response to user inputs for physical keys (e.g., crown, bezel, button, etc.) equipped in the wearable electronic devices 2000 to 2300.

FIG. 20 is a diagram illustrating a process of extending or reducing a selection area in response to a user's input for a physical key (e.g., crown rotate, crown double click) at a wearable electronic device having a touch screen and at least one physical key according to an embodiment of the present disclosure.

As shown in FIG. 20, the wearable electronic device 2000 may symmetrically extend 2012 or reduce 2011 the selection area 2010 in response to a user input 2020 for a first crown of the wearable electronic device 2000. For example, this user input 2020 for the first crown may be, but not limited to, a crown rotate input.

In addition, the wearable electronic device 2000 may symmetrically extend or reduce the selection area 2013 in response to a user input 2030 for the first crown of the wearable electronic device 2000. For example, this user input 2030 for the first crown may be, but not limited to, a double click input.

FIG. 21 is a diagram illustrating a process of changing a shape of a selection area in response to a user's input for a physical key (e.g., crown rotate) at a wearable electronic device having a touch screen and at least one physical key according to an embodiment of the present disclosure.

As shown in FIG. 21, the wearable electronic device 2100 may change the shape of the selection area 2110 in response to a user input 2120 for a second crown of the wearable electronic device 2100. For example, this user input 2120 for the second crown may be, but not limited to, a crown rotate input.

Figure 22:
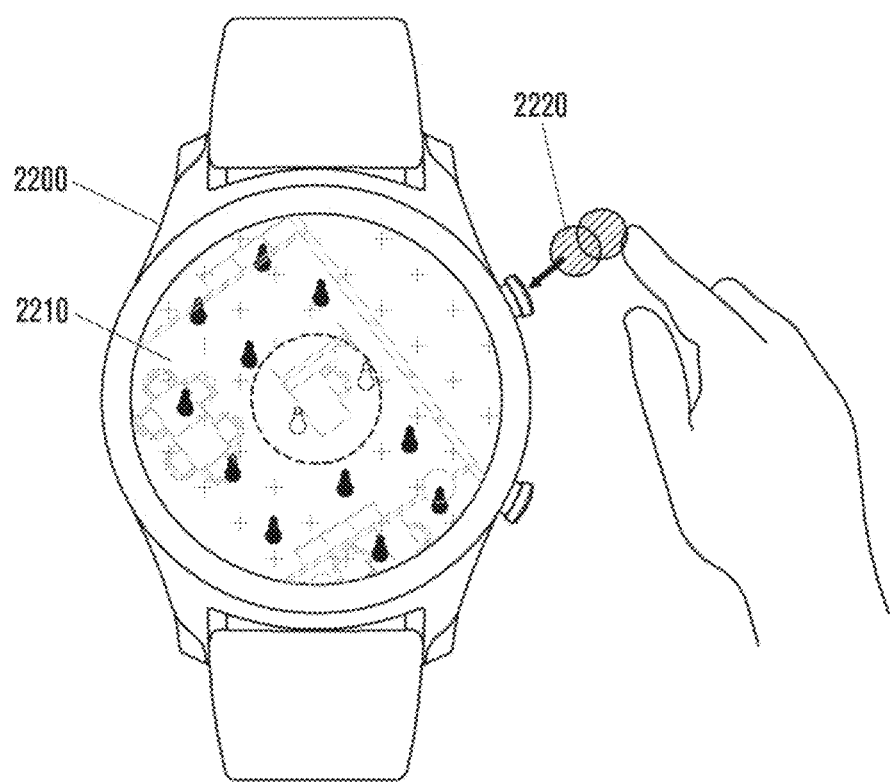
FIG. 22 is a diagram illustrating a process of inverting a selection area in response to a user's input for a physical key (e.g., crown long push) at a wearable electronic device having a touch screen and at least one physical key according to an embodiment of the present disclosure.

FIG. 22 is a diagram illustrating a process of inverting a selection area in response to a user's input for a physical key (e.g., crown long push) at a wearable electronic device having a touch screen and at least one physical key according to an embodiment of the present disclosure.

As shown in FIG. 22, the wearable electronic device 2200 may invert the selection area in response to a user input 2220 for the first crown of the wearable electronic device 2200 and then display the inverted selection area 2210. For example, this user input 2220 for the first crown may be, but not limited to, a long push input.

Meanwhile, in FIGS. 23A, 23B, 24A, 24B, 25A, 25B, 25C, 25D, 26A and 26B, the wearable electronic device may control at least one external device included in the selection area in response to a user's touch input for the wearable electronic device in a similar manner as described above in FIGS. 12 to 17.

Figure 23A:
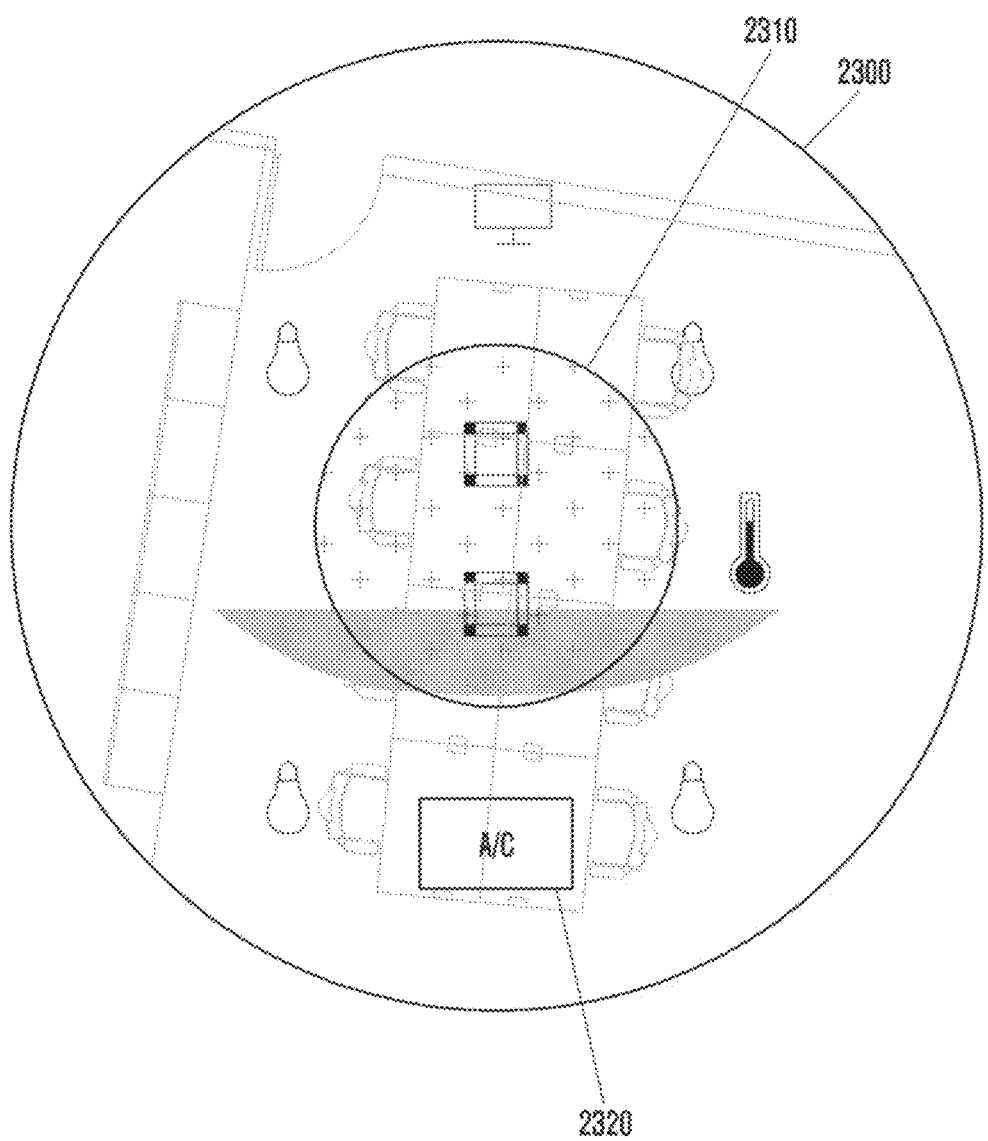
FIGS. 23A and 23B are diagrams illustrating a process of displaying information about an external device type in case where external devices of the same type or different types are selected at a wearable electronic device having a touch screen and at least one physical key according to an embodiment of the present disclosure.
Figure 23B:
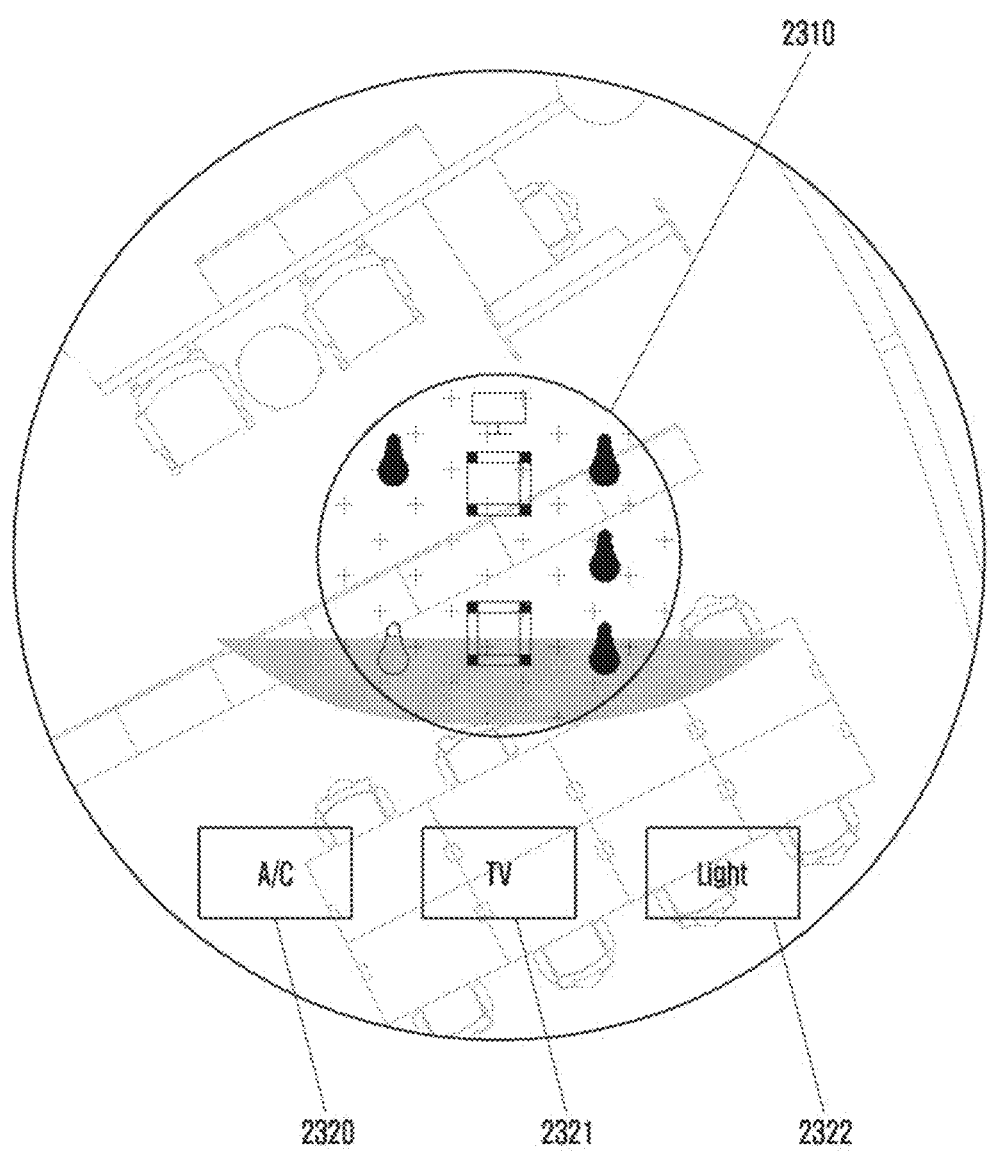

FIGS. 23A and 23B are diagrams illustrating a process of displaying information about an external device type in case where external devices of the same type or different types are selected at a wearable electronic device having a touch screen and at least one physical key according to the second embodiment of the present disclosure.

As shown in FIG. 23A, the wearable electronic device may display, on the touch screen 2300, a selection area 2310 and type information 2320 of external devices included in the selection area 2310. In this case, since only air conditioners as the external devices of the same type are included in the selection area 2310, the type information 2320 of the external devices may indicate only the air conditioner.

On the other hand, as shown in FIG. 23B, the wearable electronic device may display, on the touch screen, the selection area 2310 and the type information 2320, 2321 and 2322 of external devices included in the selection area 2310. In this case, since the selection area 2310 includes external devices of different types such as an air conditioner, a TV, and a light, illumination, the type information 2320 to 2322 of the external devices may indicate the air conditioner, the TV, and the light.

Figure 24A:
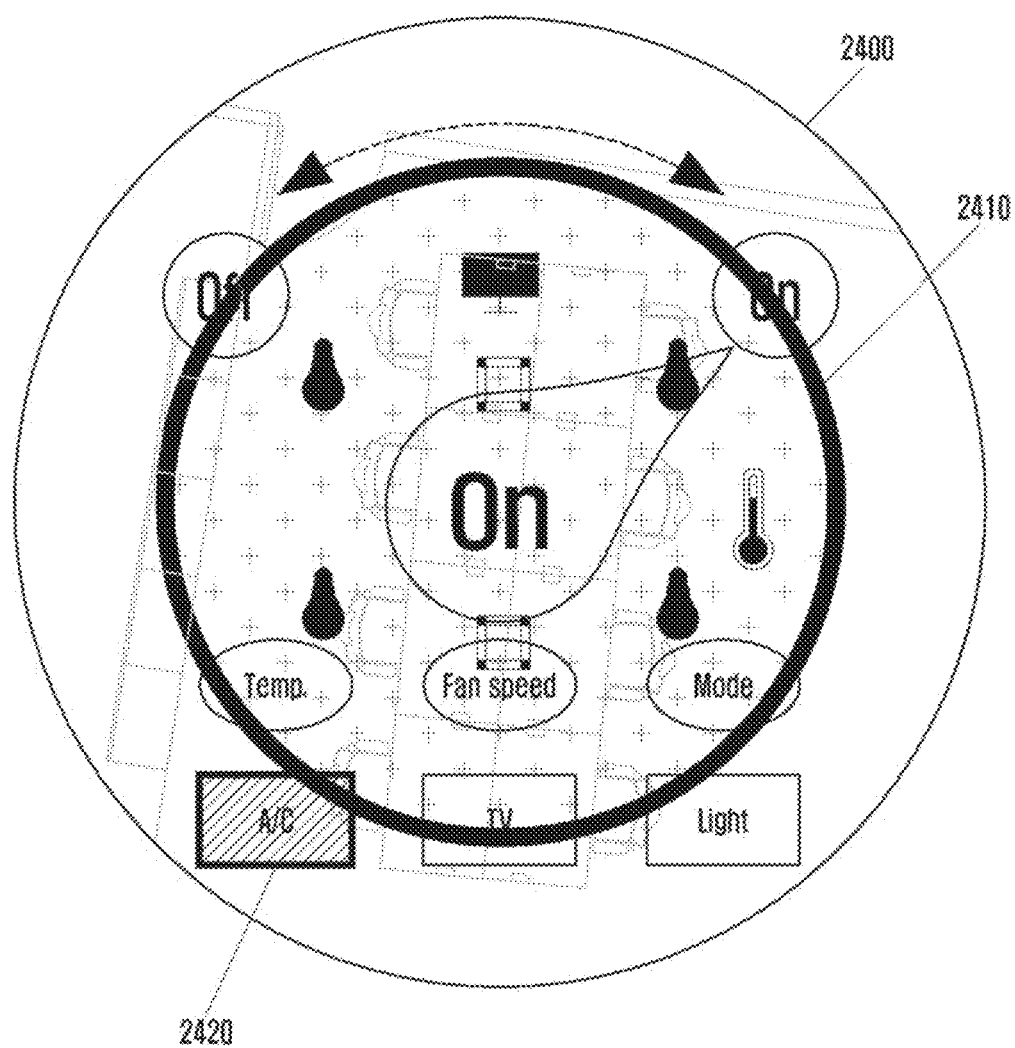
FIGS. 24A and 24B are diagrams illustrating a process of displaying control function information of an external device selected in response to a user's touch input at a wearable electronic device having a touch screen and at least one physical key according to an embodiment of the present disclosure.
Figure 24B:
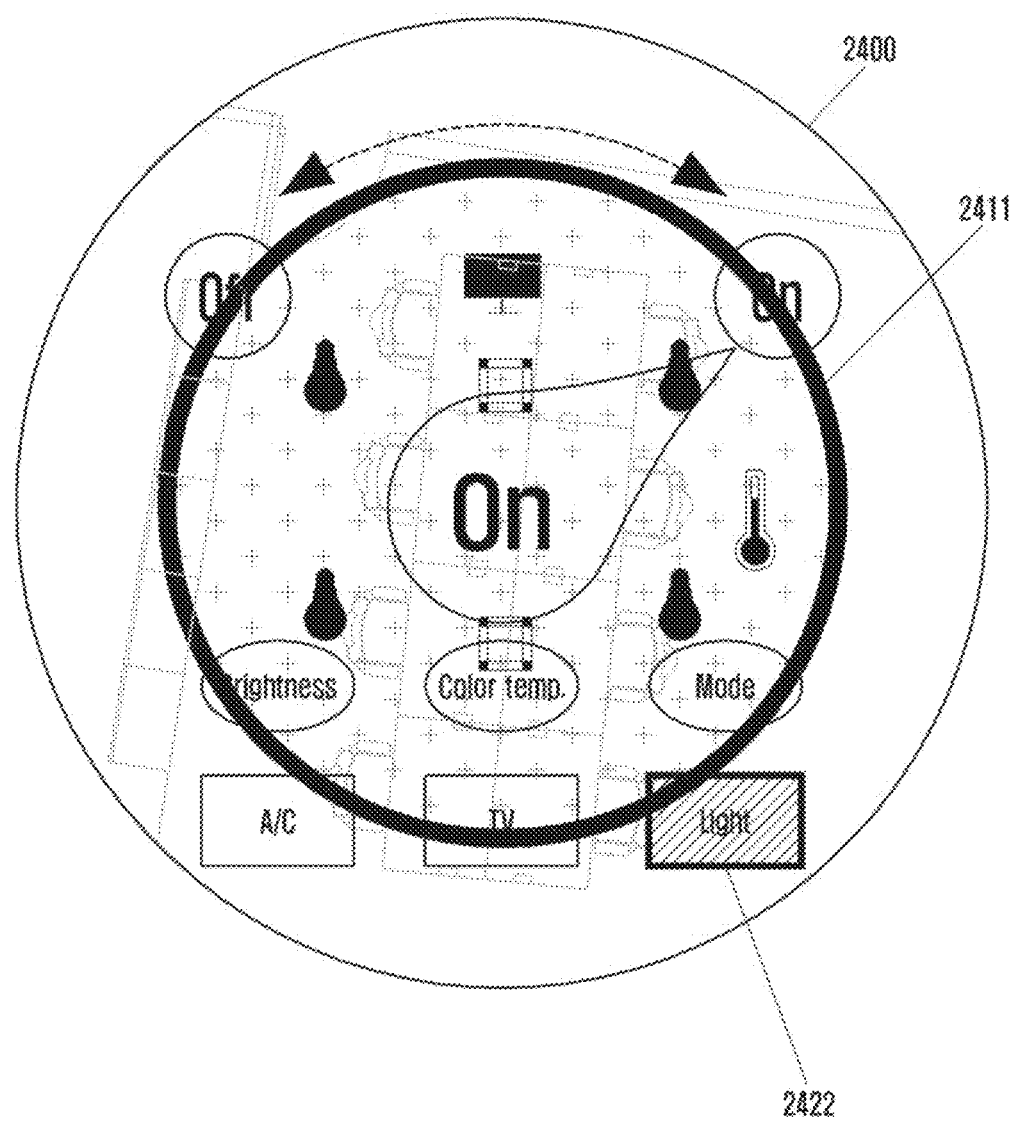

FIGS. 24A and 24B are diagrams illustrating a process of displaying control function information of an external device selected in response to a user's touch input at a wearable electronic device having a touch screen and at least one physical key according to an embodiment of the present disclosure.

As shown in FIG. 24A, the wearable electronic device may display, on the touch screen 2400, control function attribute information 2410, set as default, and control function information (e.g., a temperature, a fan speed, a mode) in response to a user's touch input for selecting external device type information 2420. In this case, the default control function attribute information 2410 may be power on/off for an external device (e.g., an air conditioner) corresponding to the selected external device type information 2420.

Similarly, as shown in FIG. 24B, the wearable electronic device may display, on the touch screen 2400, control function attribute information 2411, set as default, and control function information (e.g., a brightness, a color temperature, a mode) in response to a user's touch input for selecting external device type information 2422. In this case, the default control function attribute information 2411 may be power on/off for an external device (e.g., a light) corresponding to the selected external device type information 2422.

FIGS. 25A, 25B, 25C and 25D are diagrams illustrating a process of displaying external device type information, control function information, control function attribute information, and current control status information in response to a user's input, and controlling an external device in response to a user's touch input at a wearable electronic device having a touch screen and at least one physical key according to an embodiment of the present disclosure.

Figure 25A:
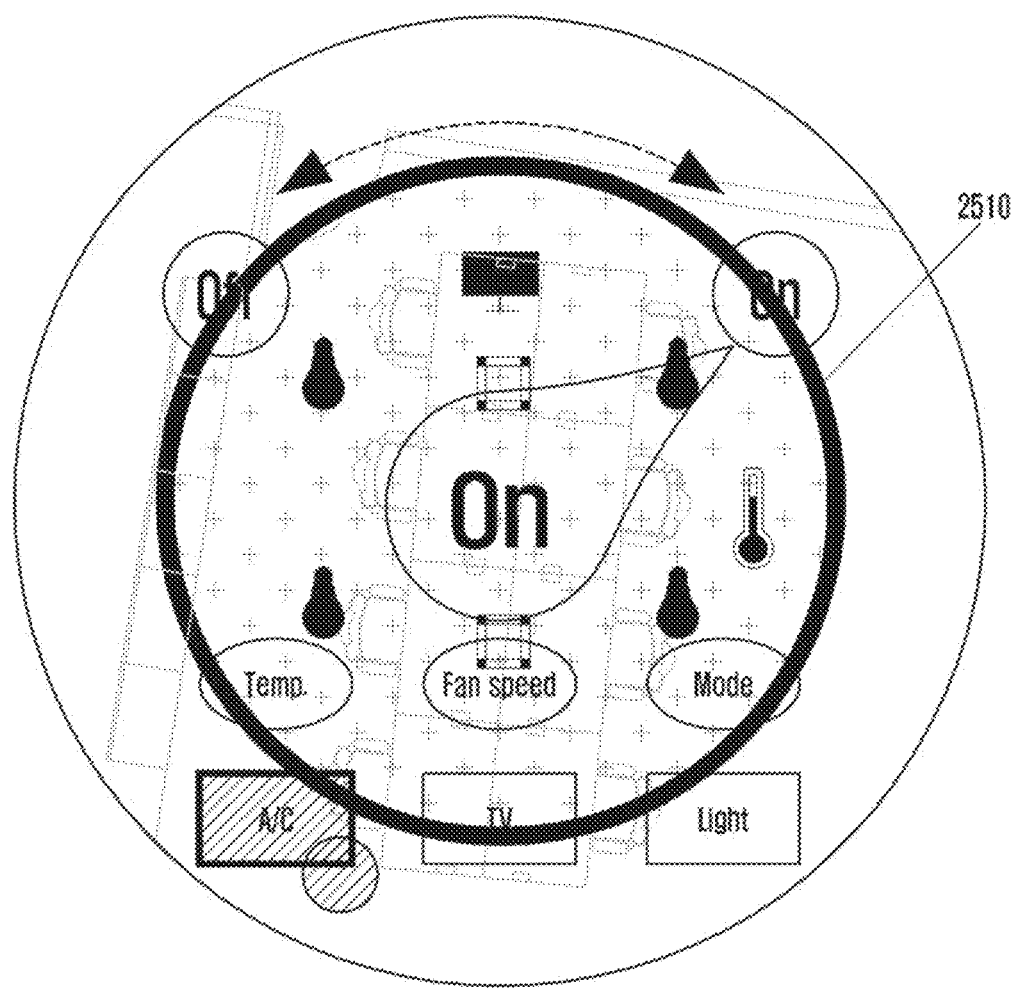
FIGS. 25A, 25B, 25C and 25D are diagrams illustrating a process of displaying external device type information, control function information, control function attribute information, and current control status information in response to a user's input, and controlling an external device in response to a user's touch input at a wearable electronic device having a touch screen and at least one physical key according to an embodiment of the present disclosure.
Figure 25B:
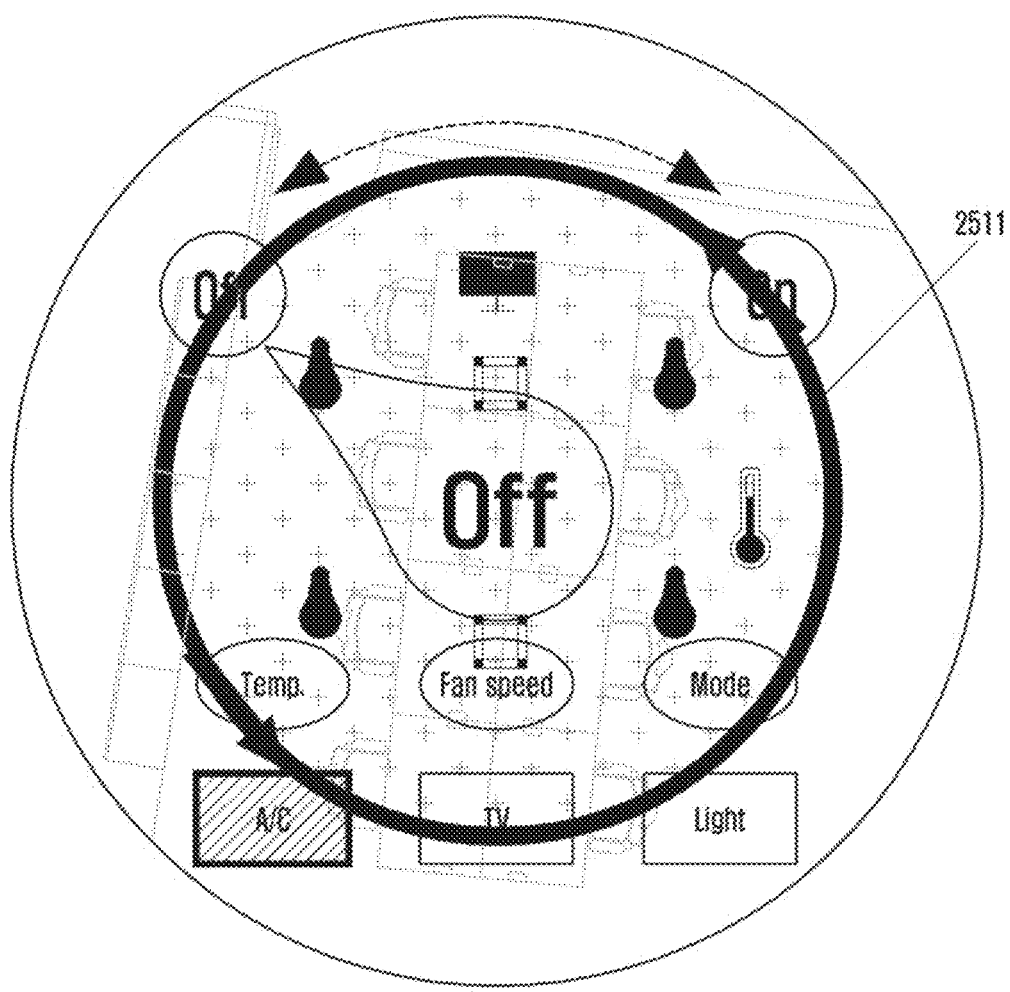

As shown in FIGS. 25A and 25B, the wearable electronic device may display control function attribute information 2510, set as default, in response to a user input for selecting one or more external devices (e.g., an air conditioner) from the external device type information. Then, in response to a user input for the displayed control function attribute information 2510, the wearable electronic device may change control status information regarding the displayed control function attribute information and then display the changed control status information 2511. For example, the wearable electronic device may display control status information regarding power on/off which is the default control function attribute information 2510 for the air conditioner in response to a user input (e.g., an A/C icon tap input or a crown rotate-and-click input) for the external device type information, and then turn on or off the air conditioners included in the selection area in response to a user input (e.g., a rotate touch input or a bezel rotate input).

Figure 25C:
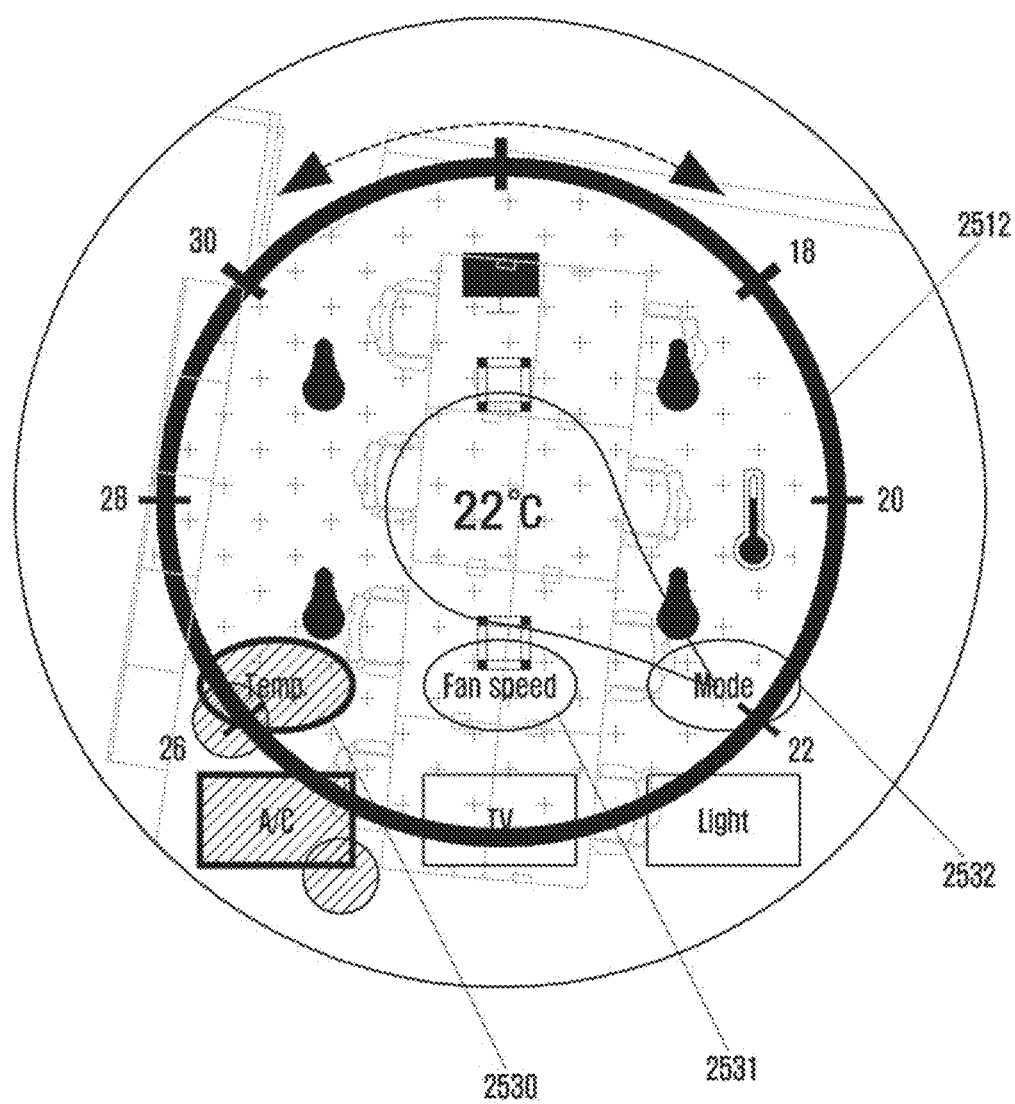
Figure 25D:
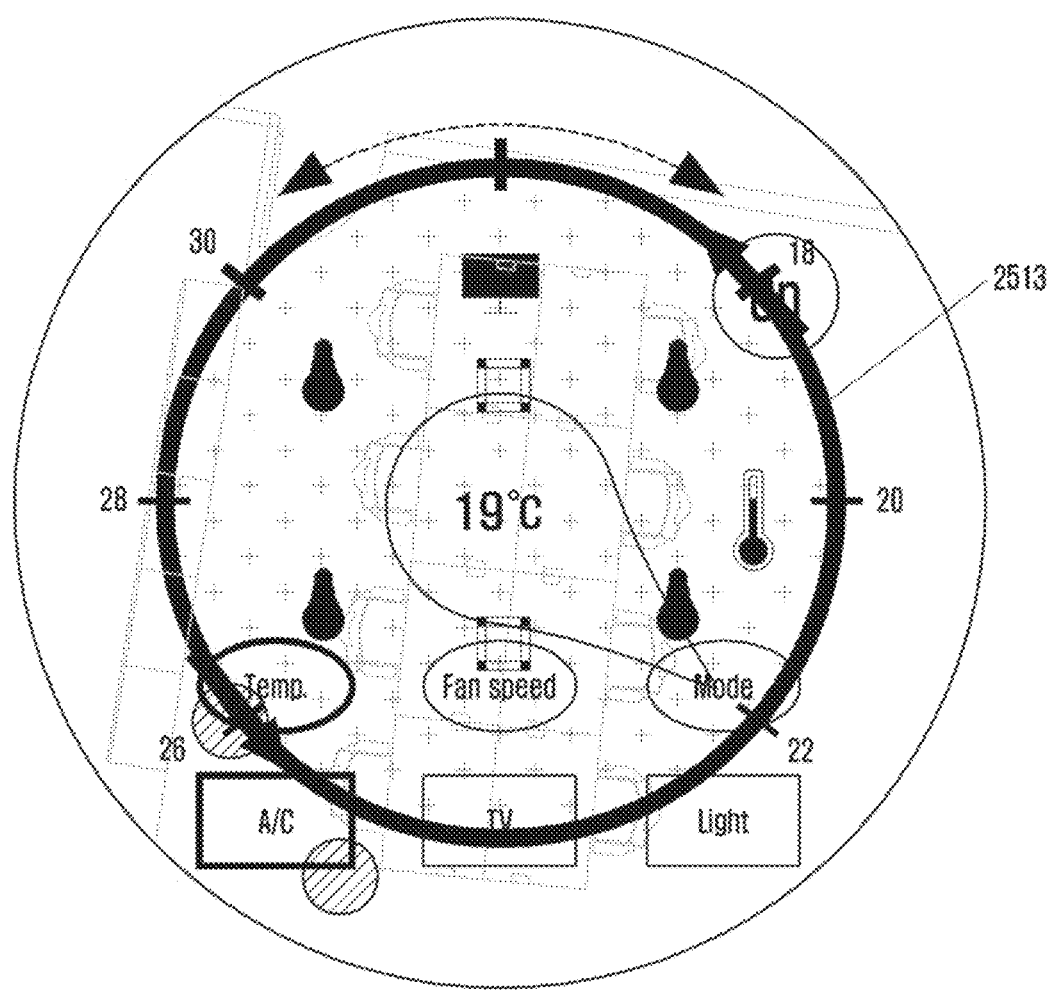

As shown in FIGS. 25C and 25D, in response to a user input for selecting any one (e.g., temperature) of control function information 2530, 2531 and 2532 for the selected external device (e.g., air conditioner), the wearable electronic device may display control function attribute information and control status information 2512 corresponding to the selected control function information 2530. Then, in response to a user input for the displayed control function attribute information 2512, the wearable electronic device may display control status information 2513 regarding changed control function attribute information. For example, the wearable electronic device may set the temperature of the air conditioners included in the selection area from 22 degrees to 19 degrees in response to a user input.

Also, in response to a user input, the wearable electronic device may generate a control message for adjusting the temperature of the air conditioners included in the selection area. Then, the wearable electronic device may transmit the control message to the air conditioners or a server for managing the air conditioners so that the temperature of the air conditioners is set to 19 degrees.

Figure 26A:
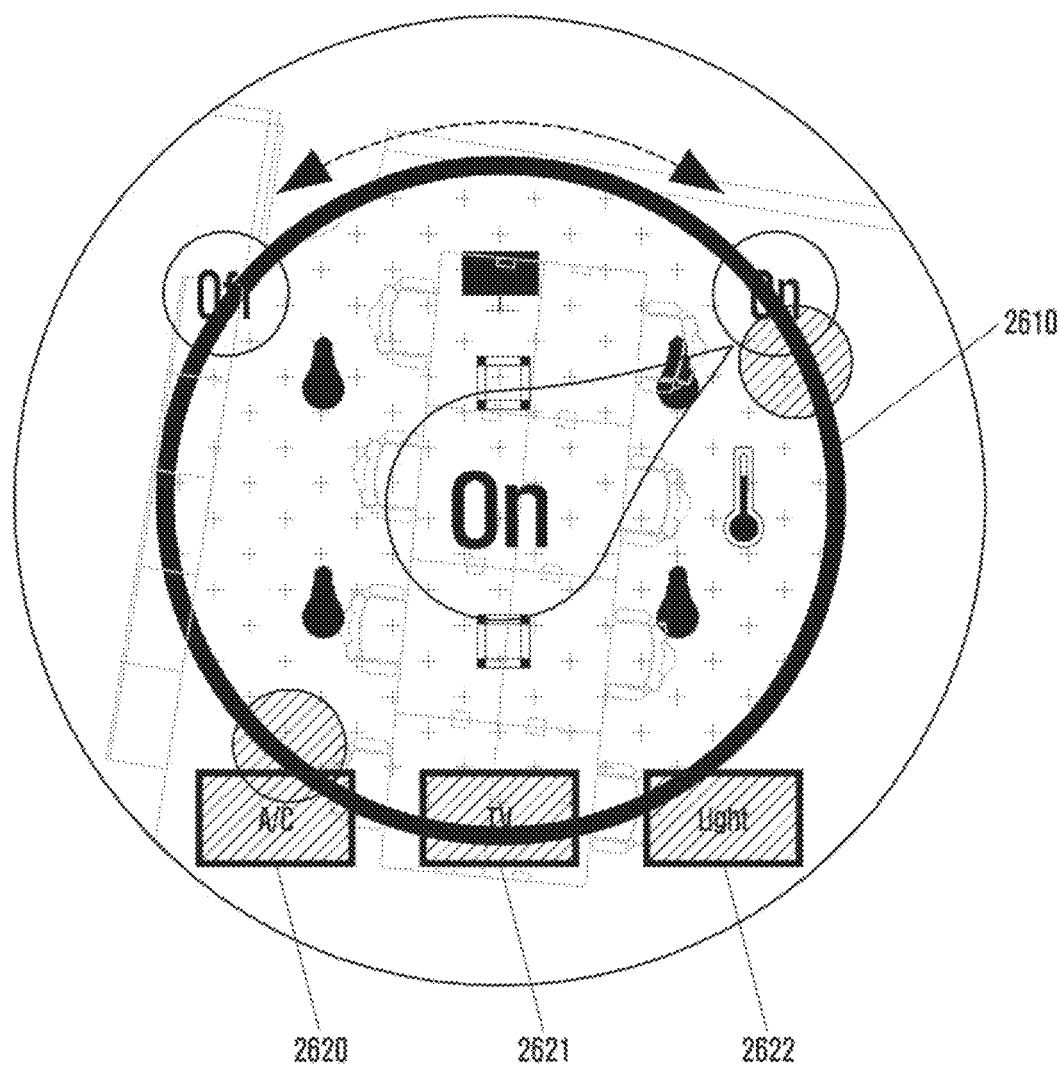
FIGS. 26A and 26B are diagrams illustrating a process of performing a common control for a plurality of external devices of different types, based on common control function attribute information, in response to a user's touch input at a wearable electronic device having a touch screen and at least one physical key according to an embodiment of the present disclosure.
Figure 26B:
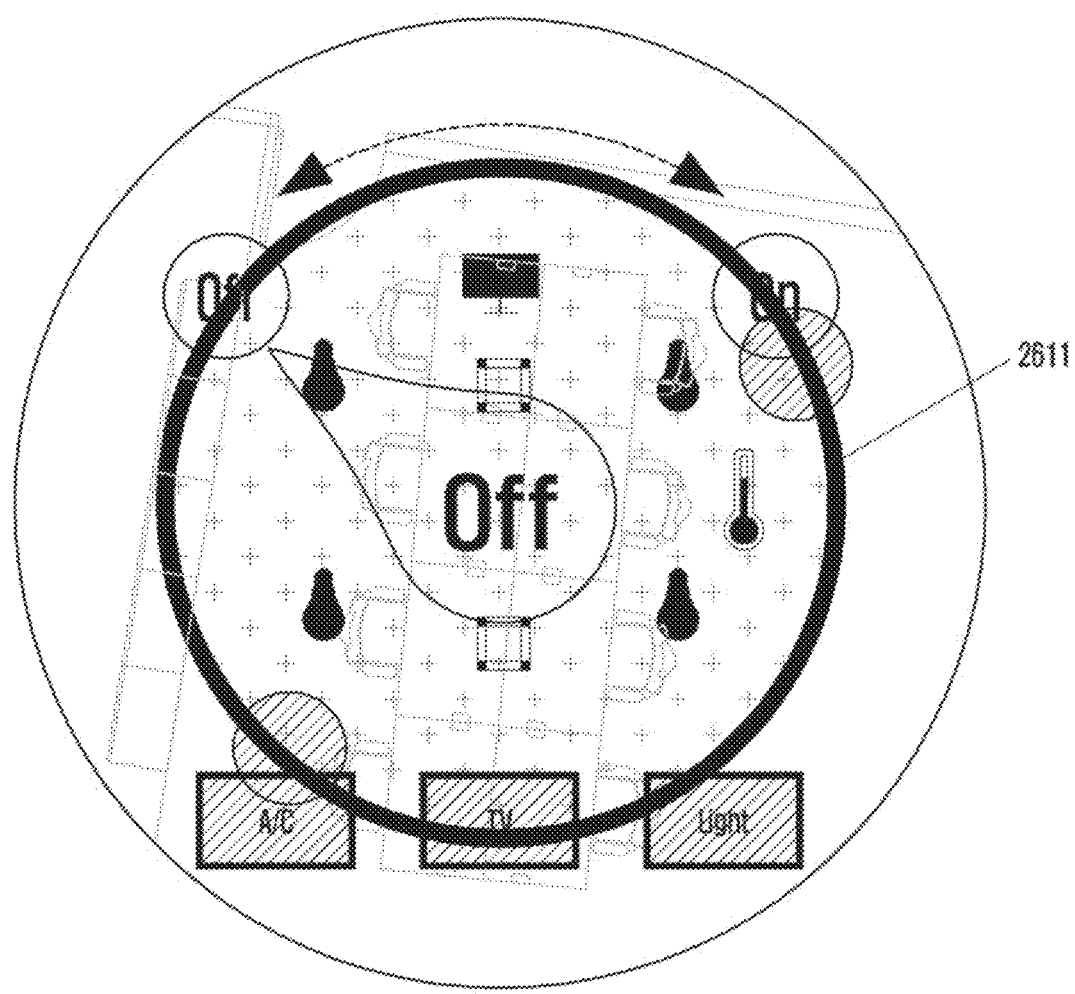

FIGS. 26A and 26B are diagrams illustrating a process of performing a common control for a plurality of external devices of different types, based on common control function attribute information, in response to a user's touch input at a wearable electronic device having a touch screen and at least one physical key according to an embodiment of the present disclosure.

As shown in FIGS. 26A and 26B, the wearable electronic device may display common control function attribute information 2610 in response to a user input for selecting external devices of different types (e.g., an air conditioner, a TV, a light) from the external device type information 2620, 2621 and 2622. Then, in response to a user input for the common control function attribute information 2610, the wearable electronic device may change control status information 2610 regarding the common control function attribute information and then display the changed control status information 2611. For example, the wearable electronic device may simultaneously turn off the power of the air conditioner, the TV, and the light included in the selection area in response to a user input.

The wearable electronic device may generate a control message for collectively adjusting the power of the air conditioner, the TV, and the light included in the selection area in response to a user input. Thereafter, the wearable electronic device may transmit the control message to all of the air conditioner, the TV, and the light or to a server that manages all of the air conditioner, the TV, and the light, so that the power may be controlled simultaneously.

Meanwhile, in FIGS. 27, 28A, 28B, 28C, 28D, 28E, 28F, 28G 19, 30 and 31, the wearable electronic device may control one or more external devices included in the selection area in response to a user input for a physical key (e.g., a crown, a bezel, a button, etc.) provided in the wearable electronic device. Excepting an input means, the operations performed in FIGS. 27 to 31 are substantially the same as or similar to those performed in FIGS. 12 to 17.

Figure 27:
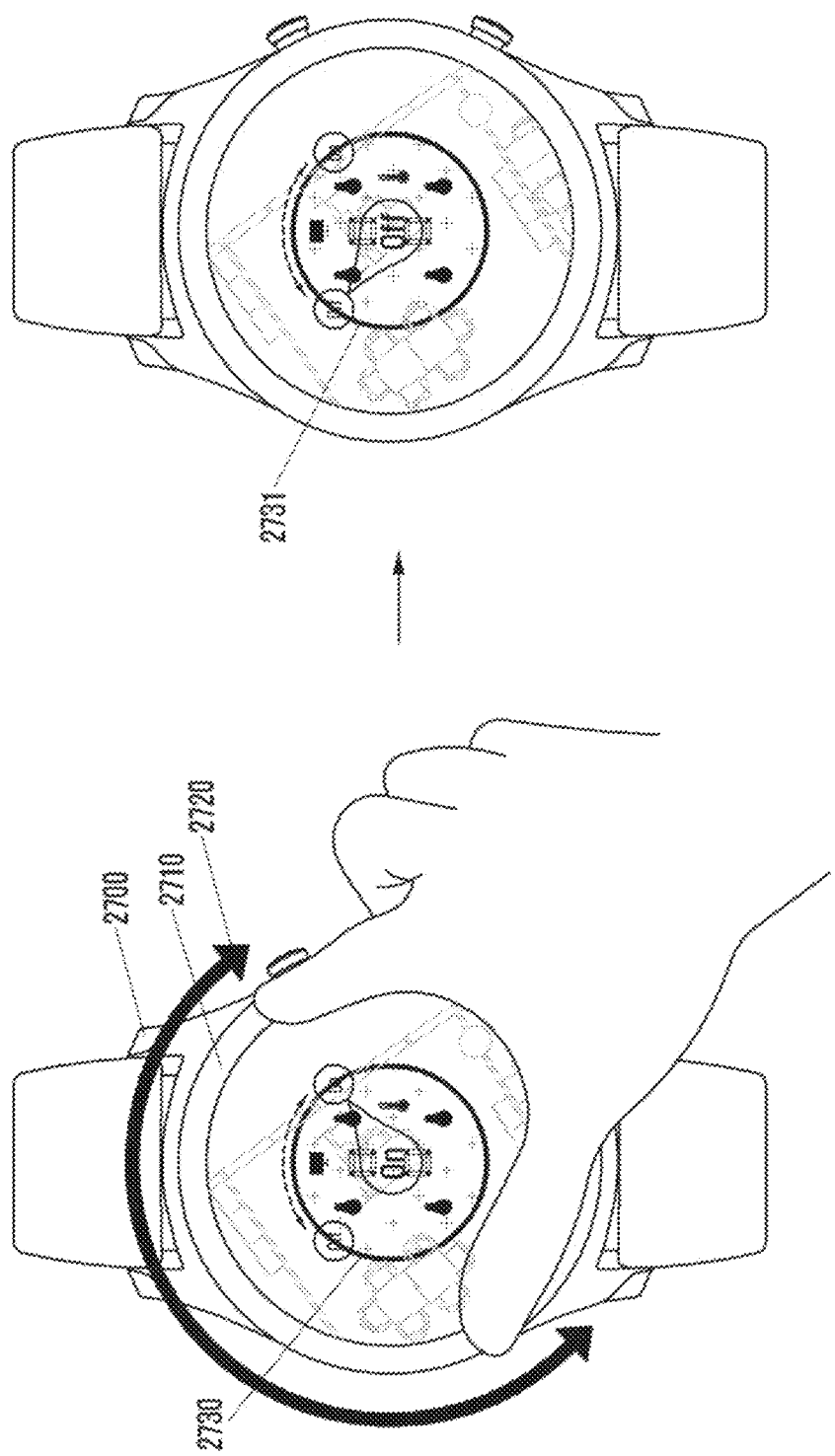
FIG. 27 is a diagram illustrating a process of changing a control status of an external device in response to a physical key input (e.g., bezel rotate) at a wearable electronic device having a touch screen and at least one physical key according to an embodiment of the present disclosure.

FIG. 27 is a diagram illustrating a process of changing a control status of an external device in response to a physical key input (e.g., bezel rotate) at a wearable electronic device having a touch screen and at least one physical key according to an embodiment of the present disclosure.

As shown in FIG. 27, the wearable electronic device 2700 may extend or reduce the selection area 2730, select at least one external device disposed in the selection area, and display changed control information 2731 in response to a user's rotate input 2720 for a bezel 2710 of the wearable electronic device 2700. For example, the wearable electronic device 2700 may turn off the power of air conditioners included in the selection area in response to the user's rotate input for the bezel 2710.

Also, the wearable electronic device 2700 may generate a control message for collectively adjusting the power of air conditioners included in the selection area in response to the user's rotate input. Then, the wearable electronic device 2700 may transmit the control message to the air conditioners or a server for managing the air conditioners so as to collectively control the power of the air conditioners.

FIGS. 28A, 28B, 28C, 28D, 28E, 28F and 28G are diagrams illustrating a process of entering a mode for selecting type information of an external device to be controlled through a physical key input (e.g., crown click), selecting the external device to be controlled from the type information displayed on a screen through a physical key input (e.g., crown rotate and click), selecting attribute information of a detailed control function to be controlled from displayed control function information of the selected external device through a physical key input (e.g., crown rotate and click), displaying current control status information based on the selected detailed control function, and changing a control status in response to a physical key input (e.g., crown rotate) at a wearable electronic device having a touch screen and at least one physical key according to an embodiment of the present disclosure.

Figure 28A:
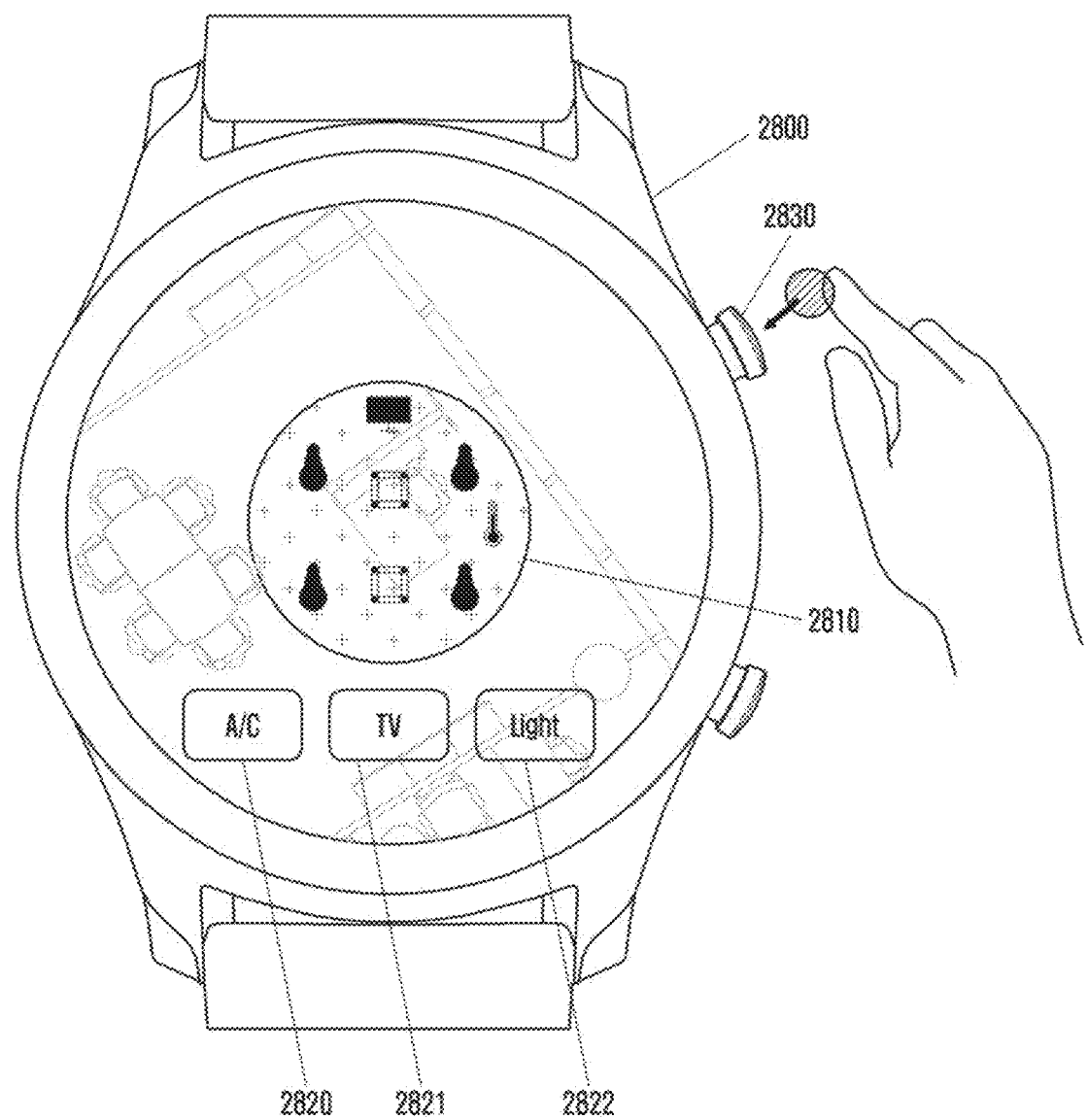
FIGS. 28A, 28B, 28C, 28D, 28E, 28F and 28G are diagrams illustrating a process of entering a mode for selecting type information of an external device to be controlled through a physical key input (e.g., crown click), selecting the external device to be controlled from the type information displayed on a screen through a physical key input (e.g., crown rotate and click), selecting attribute information of a detailed control function to be controlled from displayed control function information of the selected external device through a physical key input (e.g., crown rotate and click), displaying current control status information based on the selected detailed control function, and changing a control status in response to a physical key input (e.g., crown rotate) at a wearable electronic device having a touch screen and at least one physical key according to an embodiment of the present disclosure.

As shown in FIG. 28A, in response to a user input (e.g., a crown click input) for a first crown 2830 of the wearable electronic device 2800, the wearable electronic device 2800 may display a selection area 2810 and enter a mode for selecting device type information 2820, 2821, 2822 to 2822 of an external device to be controlled.

Figure 28B:
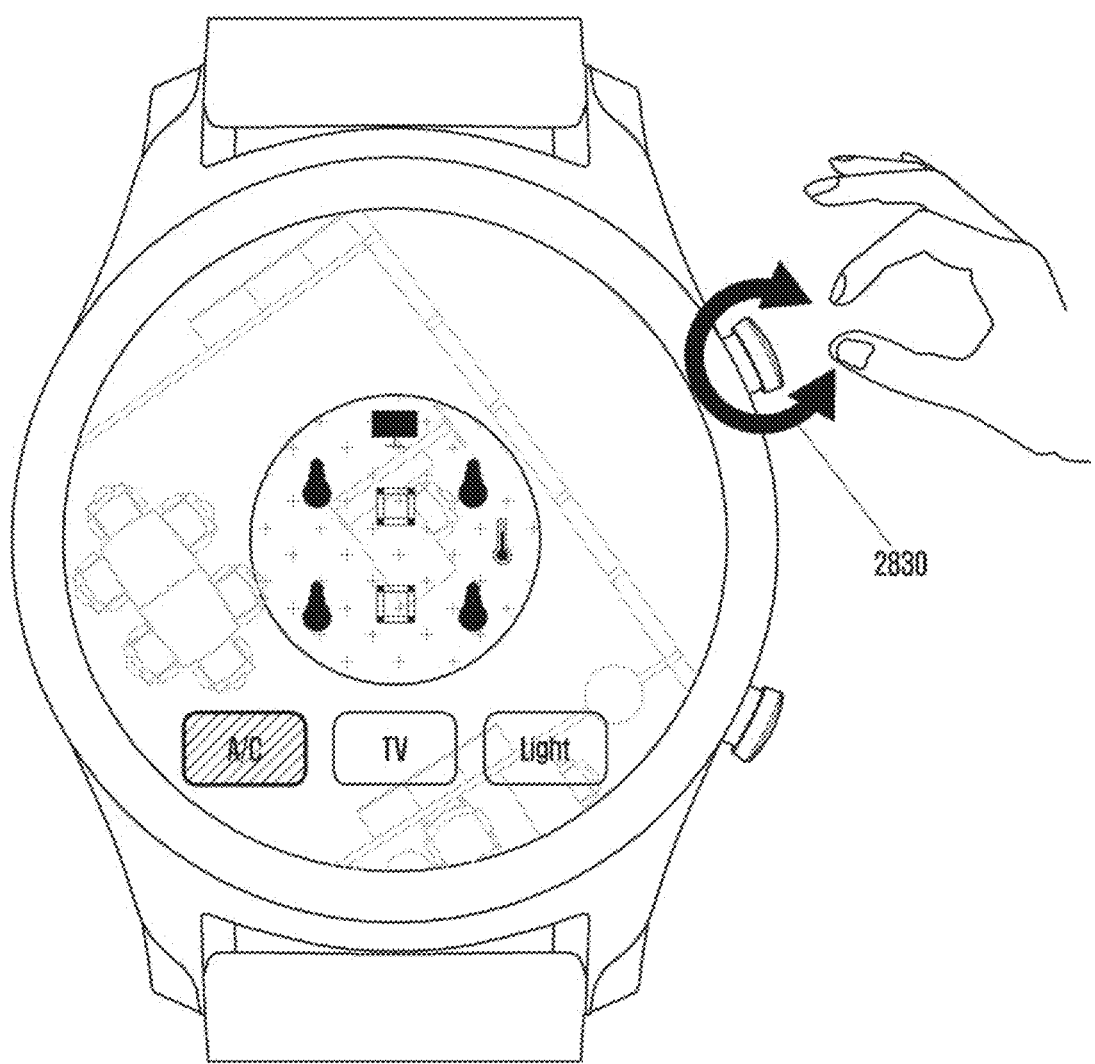

As shown in FIG. 28B, in response to a user input (e.g., a crown rotate input) for the first crown 2830, the wearable electronic device 2800 may navigate the device type information of an external device to be controlled.

Figure 28C:
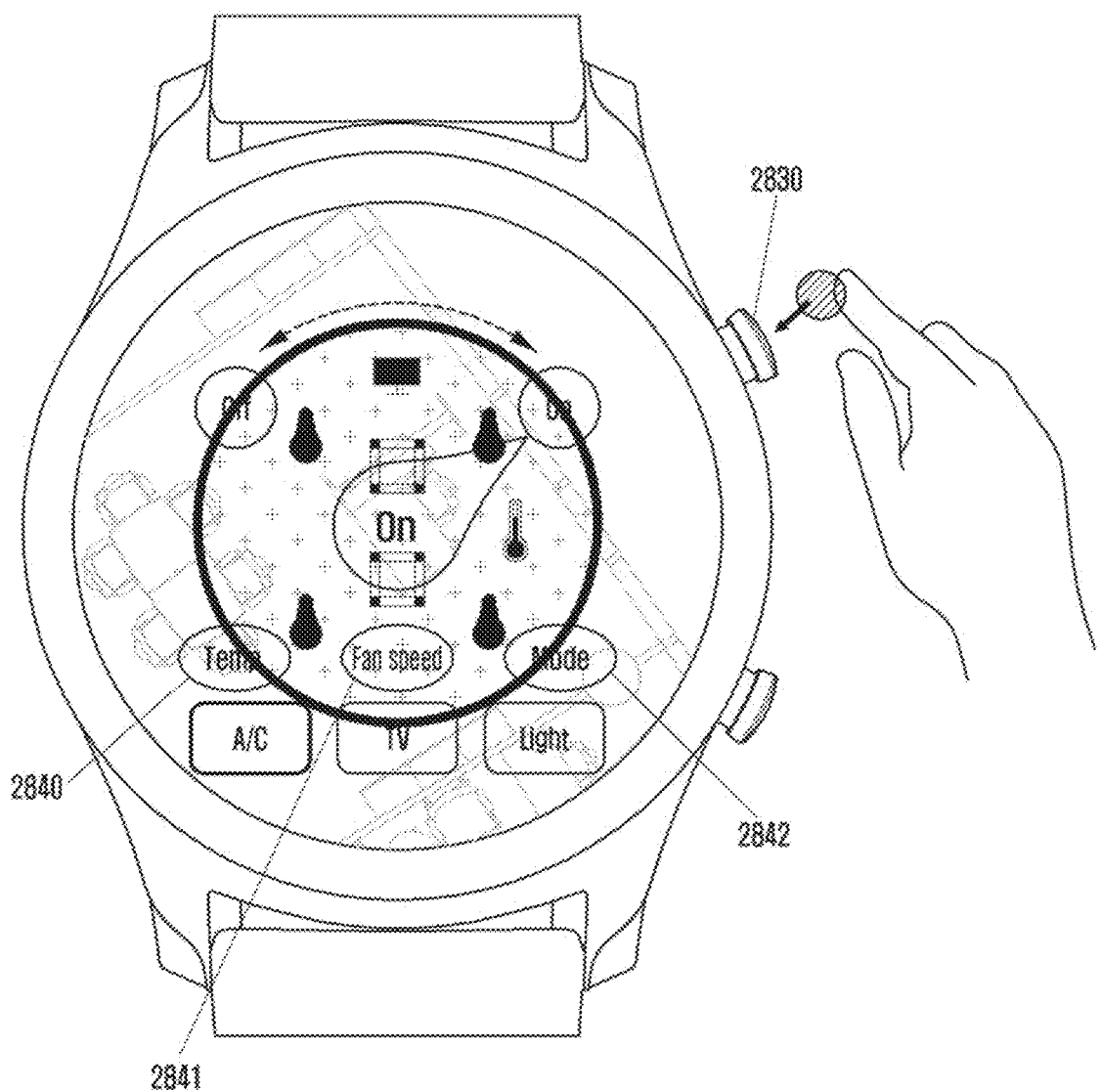

As shown in FIG. 28C, in response to a user input (e.g., a crown click input) for the first crown 2830, the wearable electronic device 2800 may select the device type information (e.g., an air conditioner) of an external device to be controlled. At this time, the control function attribute information (e.g., power on/off), set as default, for the selected external device (e.g., an air conditioner) and control function information 2840, 2841 and 2842 (e.g., a temperature, a fan speed, a mode) for the selected external device may be displayed.

Figure 28D:
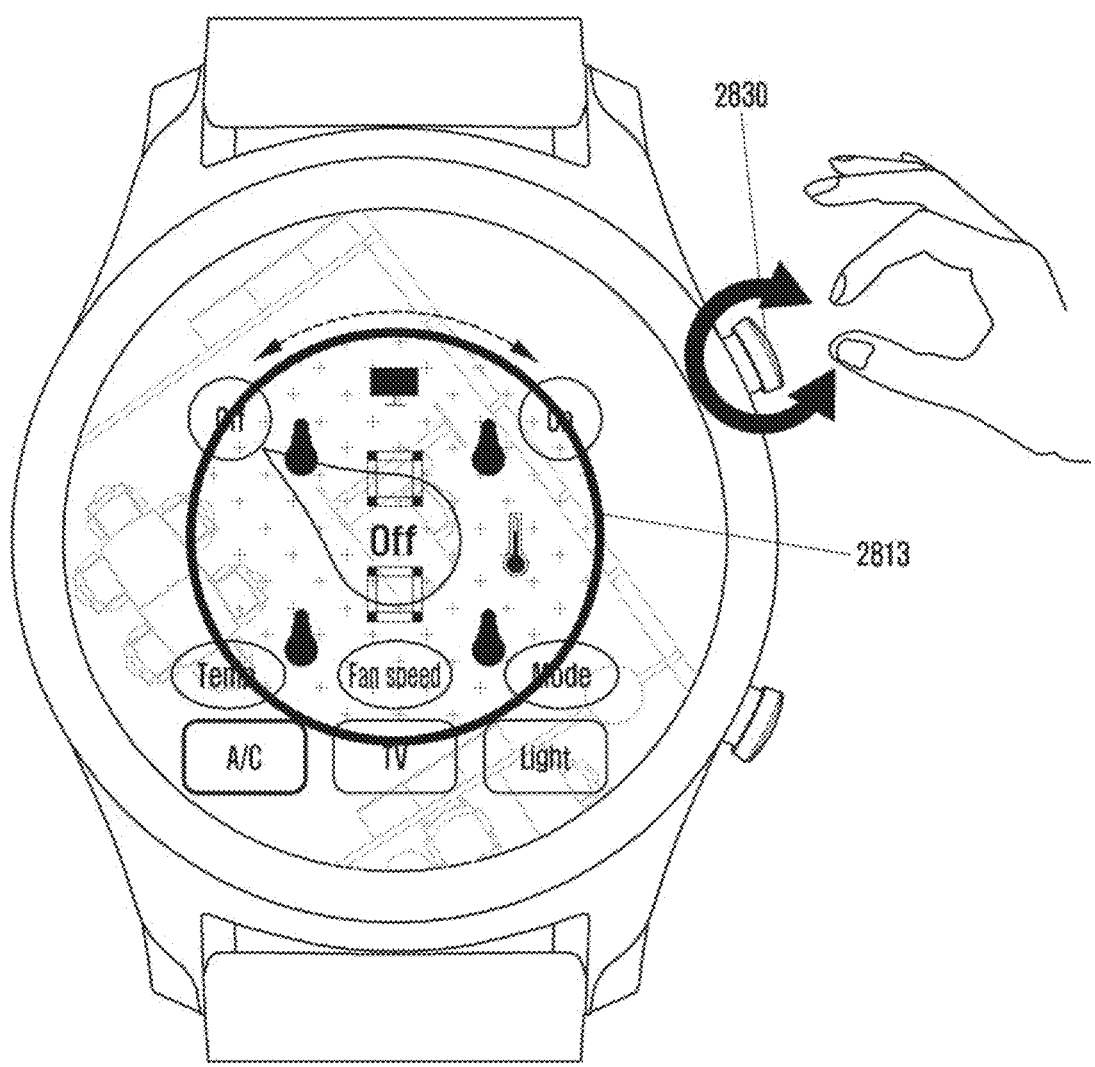

As shown in FIG. 28D, in response to a user input (e.g., a crown rotate input) for the first crown 2830, the wearable electronic device 2800 may change a control status 2813 regarding the default control function attribute information for the selected external device. For example, the wearable electronic device 2800 may collectively turn off the power of air conditioners included in the selection area in response to the user input (e.g., a crown rotate input).

Figure 28E:
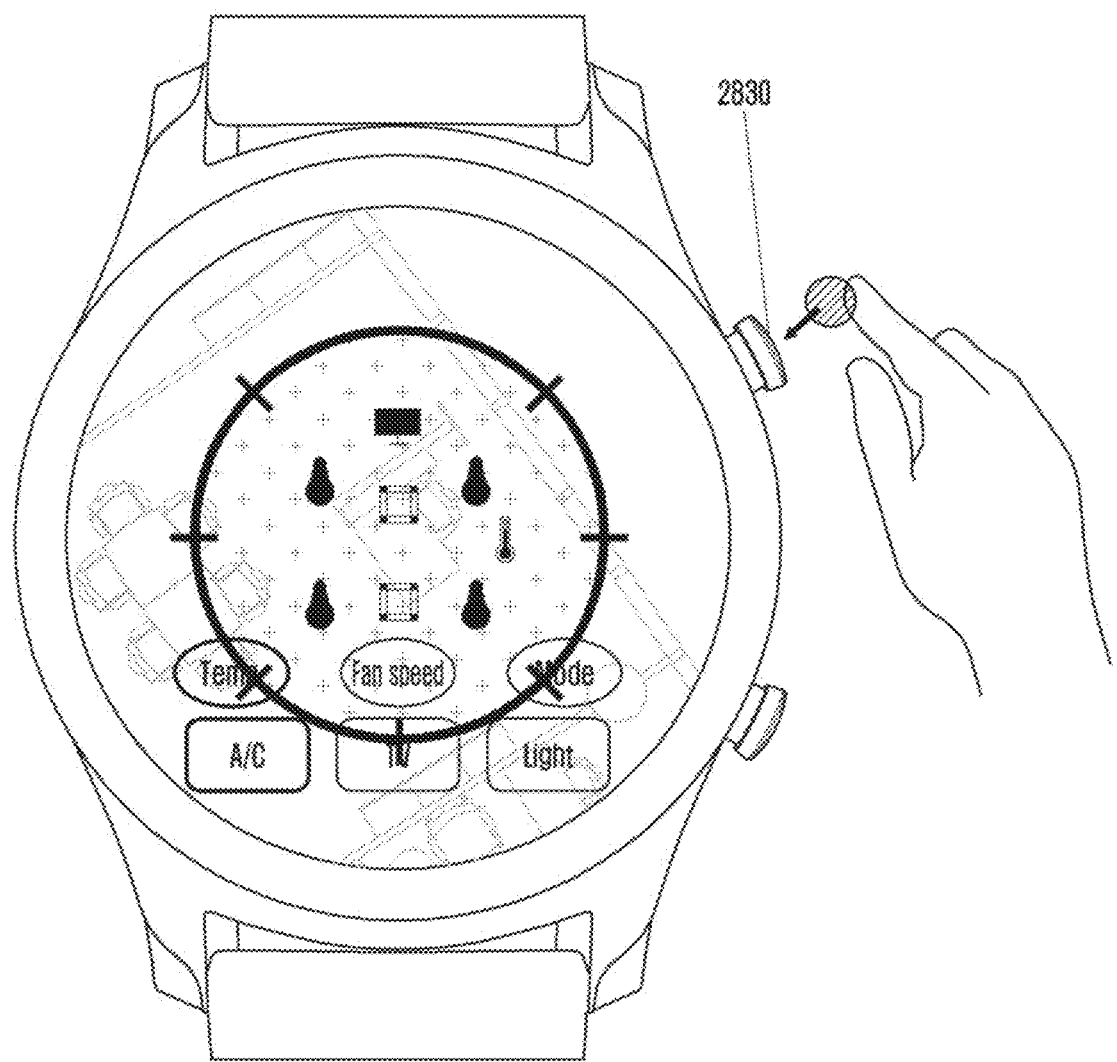

As shown in FIG. 28E, in response to a user input (e.g., a crown click input) for the first crown 2830, the wearable electronic device 2800 may enter a mode for selecting the control function information (e.g., a temperature, a fan speed, a mode) for the selected external device (e.g., an air conditioner).

Also, although not shown, the wearable electronic device 2800 may navigate the control function information for the selected external device in response to a user input (e.g., a crown rotate input) for the first crown 2830.

Figure 28F:
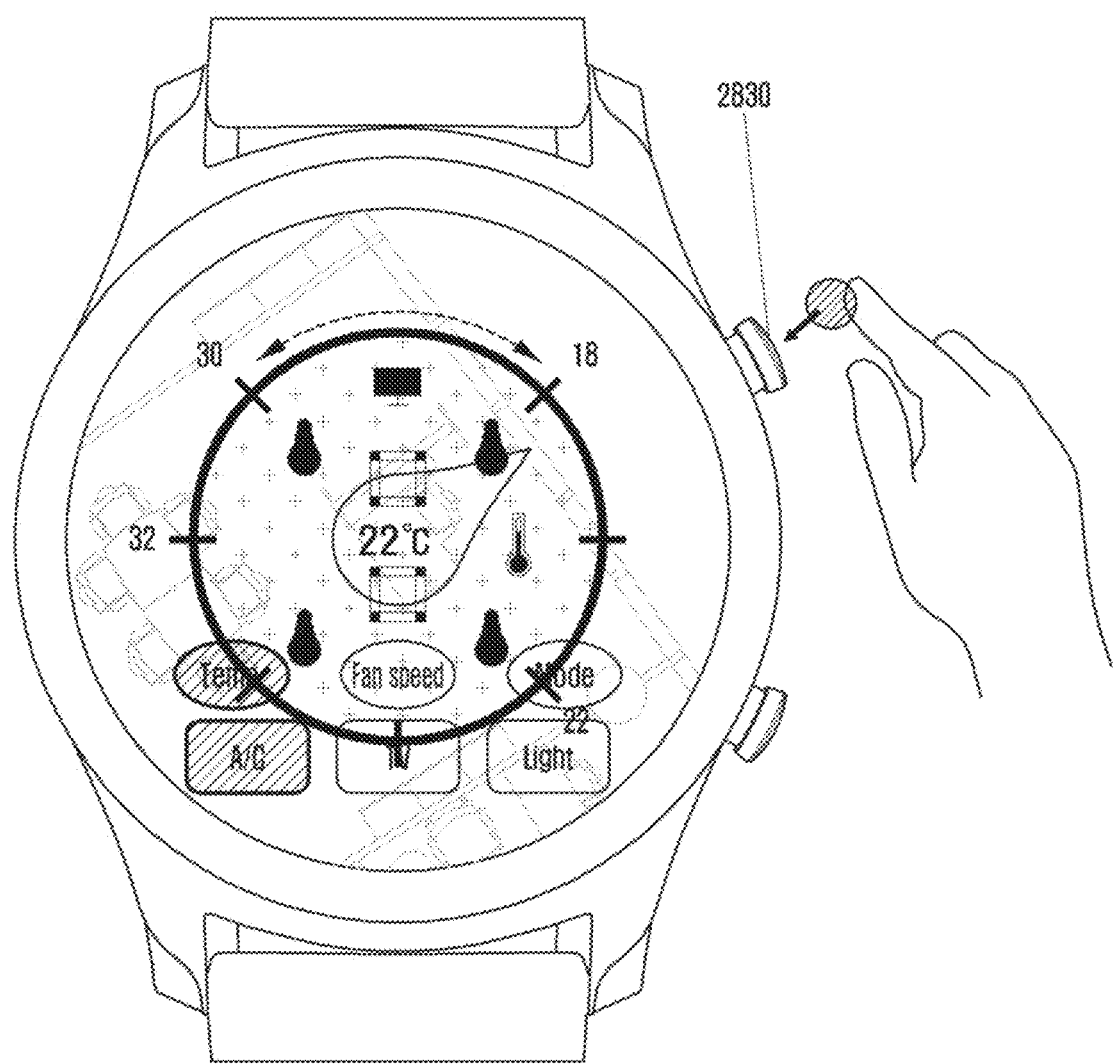

As shown in FIG. 28F, in response to a user input (e.g., a crown click input) for the first crown 2830, the wearable electronic device 2800 may select the control function information (e.g., a temperature, a fan speed, a mode) to be controlled.

Figure 28G:
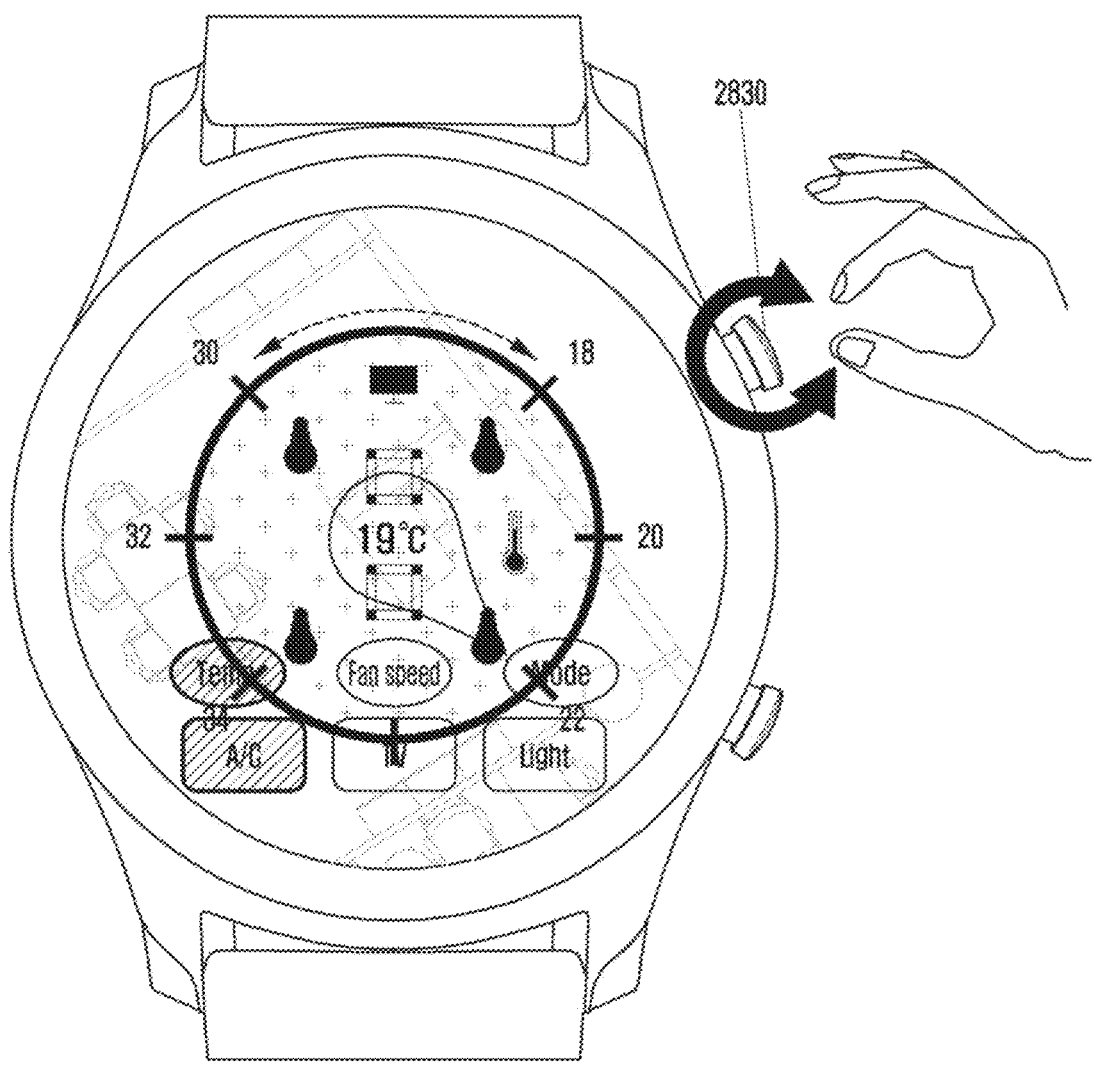

As shown in FIG. 28G, in response to a user input (e.g., a crown rotate input) for the first crown 2830, the wearable electronic device 2800 may adjust the selected control function information (e.g., a temperature). For example, the wearable electronic device 2800 may adjust the setting temperature of the air conditioners included in the selection area from 22 degrees to 19 degrees in response to the user input (e.g., a crown rotate input).

FIG. 29 is a diagram illustrating a process of selecting an external device to be controlled through a touch input and controlling power of the selected external device through a physical key input (e.g., crown rotate) at a wearable electronic device having a touch screen and at least one physical key according to an embodiment of the present disclosure.

As shown in FIG. 29, in response to a user input (e.g., an A/C icon click input) for selecting external device type information 2920, the wearable electronic device 2900 may display control function attribute information (e.g., power on/off), set as default, and control status information 2910 (e.g., power on). Then, in response to a user's rotate input for the first crown 2930, the wearable electronic device 2900 may display changed control status information 2911 (e.g., A/C power off).

Figure 30:
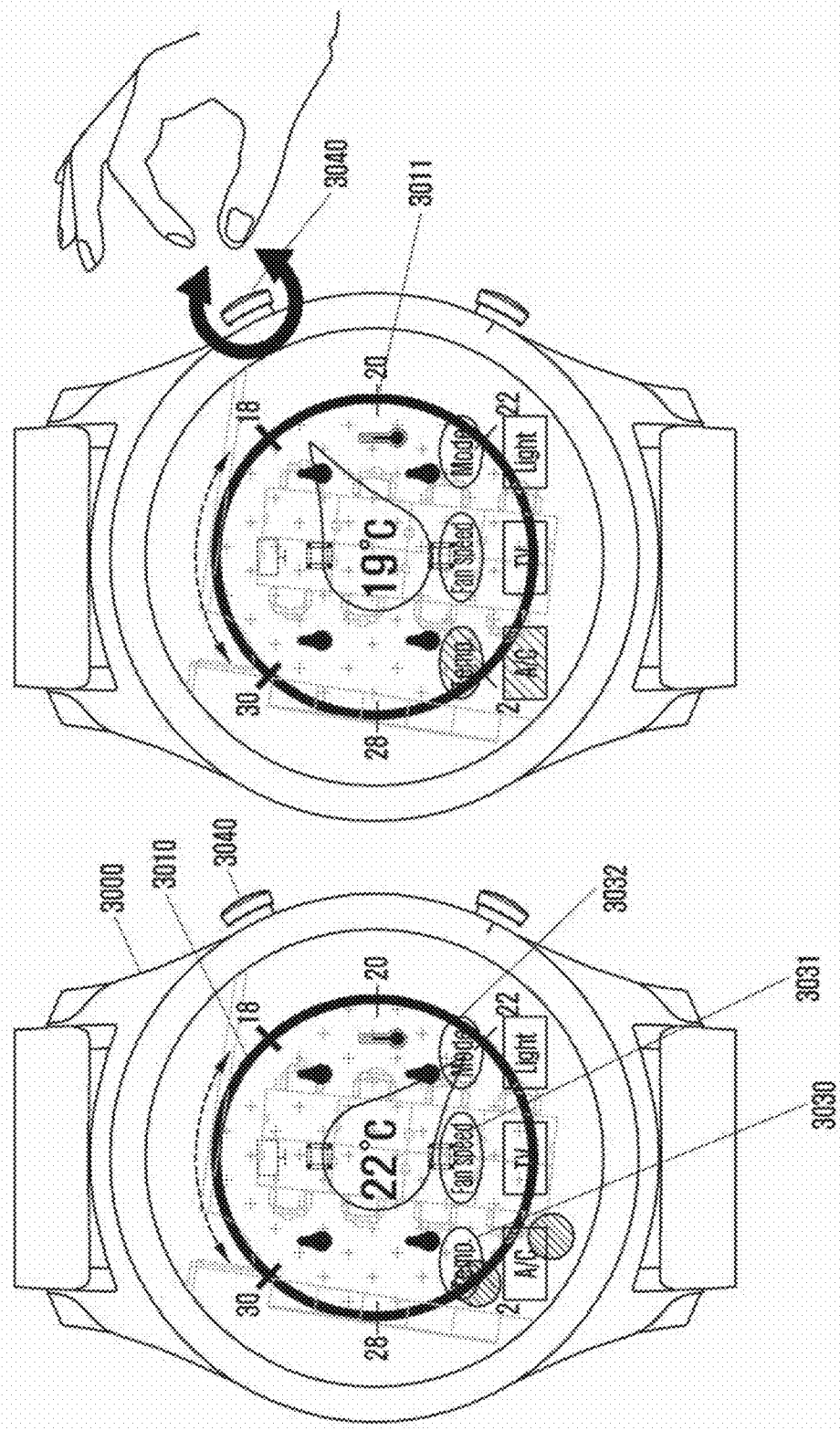
FIG. 30 is a diagram illustrating a process of selecting a control function of an external device to be controlled through a touch input and performing a detailed control for the selected control function of the external device through a physical key input (e.g., crown rotate) at a wearable electronic device having a touch screen and at least one physical key according to an embodiment of the present disclosure.

FIG. 30 is a diagram illustrating a process of selecting a control function of an external device to be controlled through a touch input and performing a detailed control for the selected control function of the external device through a physical key input (e.g., crown rotate) at a wearable electronic device having a touch screen and at least one physical key according to an embodiment of the present disclosure.

As shown in FIG. 30, in response to a user's touch input for selecting any one of control function information 3030, 3031 and 3032 of a selected external device, the wearable electronic device 3000 may display control function attribute information corresponding to the selected control function information 3030 and current control status information 3010 (e.g., setting temperature of 22 degrees). Then, in response to a user's rotate input for the first crown 3040, the wearable electronic device 3000 may display changed control status information 3011 (e.g., setting temperature of 19 degrees) regarding the control function attribute information.

Figure 31:
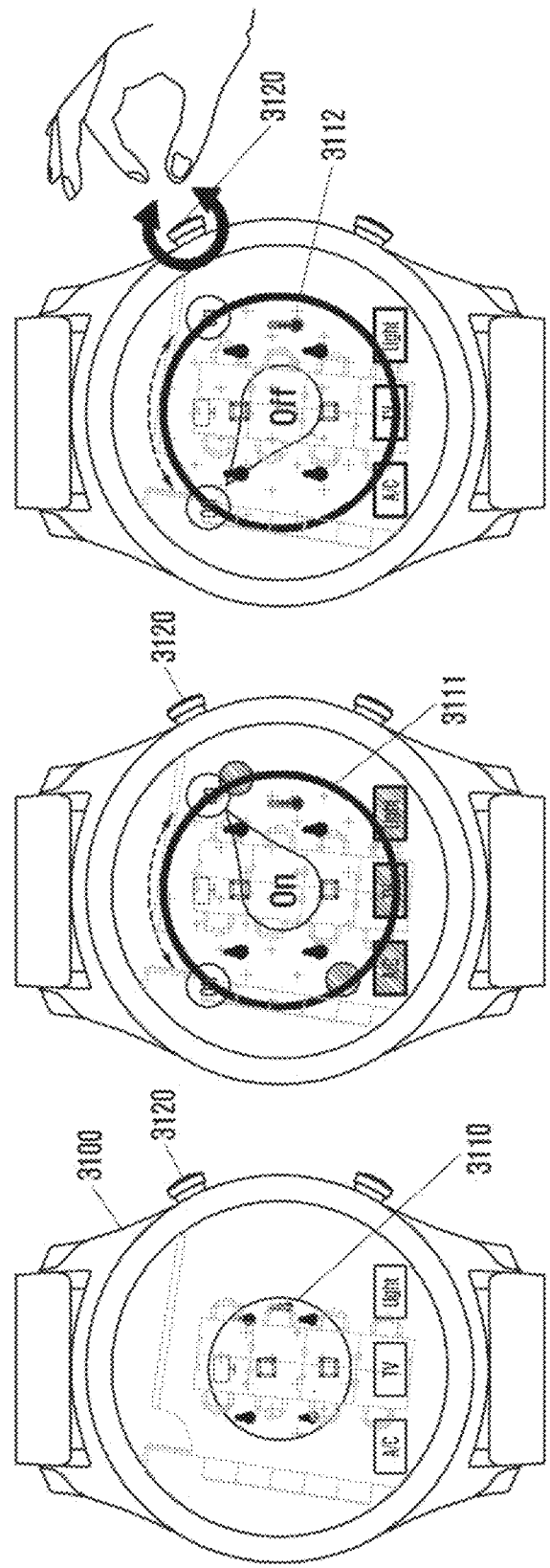
FIG. 31 is a diagram illustrating a process of performing a common control for a plurality of external devices of different types, based on common control function attribute information, through a touch input (e.g., multi-touch rotate) at a wearable electronic device having a touch screen and at least one physical key according to an embodiment of the present disclosure.

FIG. 31 is a diagram illustrating a process of performing a common control for a plurality of external devices of different types, based on common control function attribute information, through a touch input (e.g., multi-touch rotate) at a wearable electronic device having a touch screen and at least one physical key according to an embodiment of the present disclosure.

As shown in FIG. 31, the wearable electronic device 3100 may collectively control external devices of different types included in the selection area 3110. Then, in response to a user's touch input (e.g., a click input on icons of A/C, TV and light) for selecting the external devices indicated by device type information, the wearable electronic device 3100 may display common control function attribute information and control status information 3111 for the selected external devices. Also, in response to a user's rotate input for the first crown 3120, the wearable electronic device 3100 may display control status information 3112 regarding the changed common control function attribute information.

Figure 32:
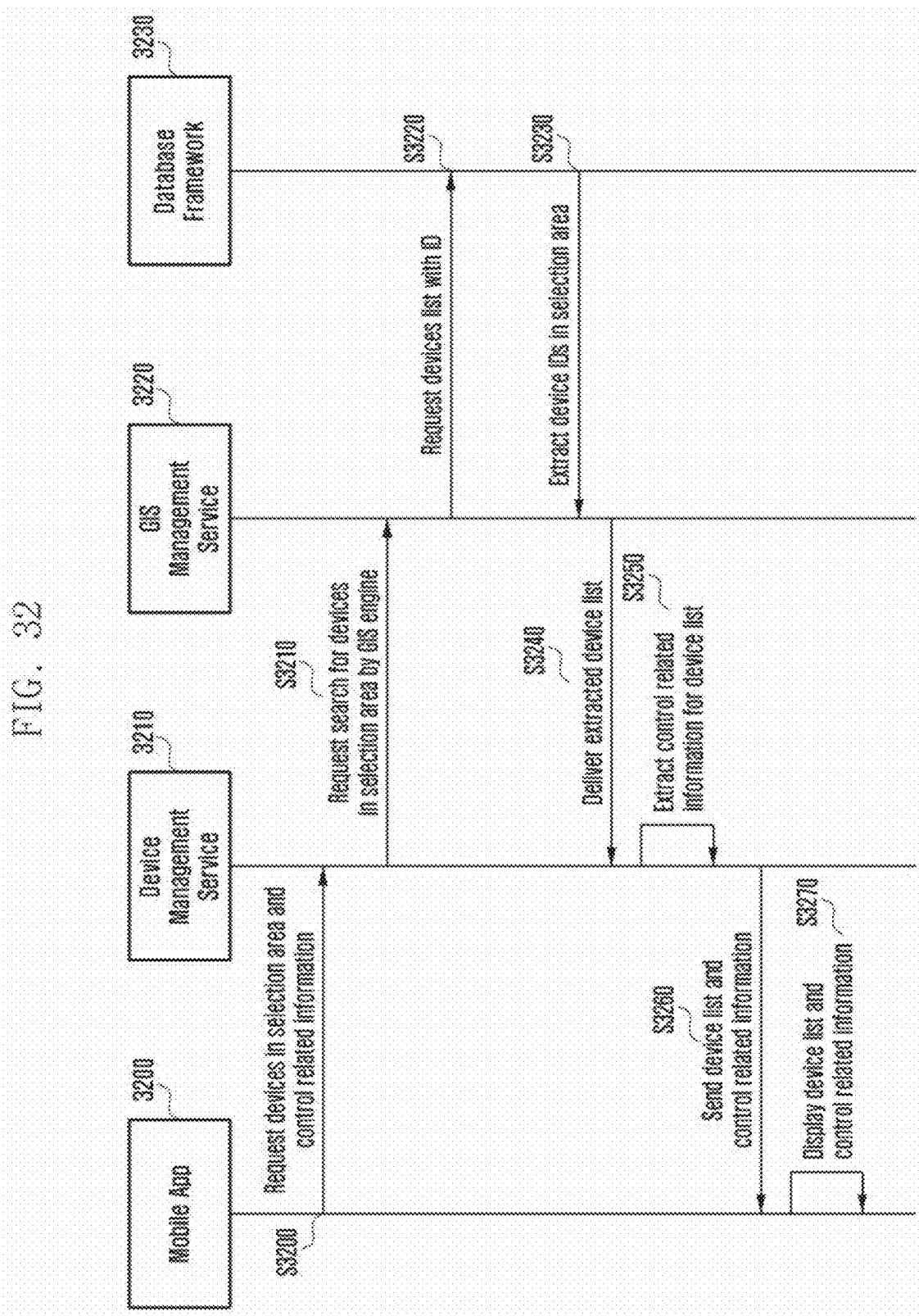
FIG. 32 is a sequence diagram illustrating a flow of message packets exchanged between a mobile application installed in a portable or wearable electronic device and a server through communication in case of selecting one or more external devices according to an embodiment of the present disclosure.

FIG. 32 is a sequence diagram illustrating a flow of message packet exchanged between a mobile application installed in a portable or wearable electronic device and a server through communication in case of selecting one or more external devices according to an embodiment of the present disclosure.

The portable electronic device (or wearable electronic device) according to embodiments of the present disclosure may communicate with servers 3210, 3220 and 3230 by executing a mobile application 3200 installed therein.

The servers 3210, 3220 and 3230 may include a device management service module 3210, a geographic information system (GIS) management service module 3220, and a database framework module 3230. Such modules may be integrated into a single server, or may be configured as separate independent modules.

Referring to FIG. 32, at step S3200, the mobile application 3200 may request the device management service module 3210 to provide device type information about external device in a selection area, and control related information such as control function information, control function attribute information, and control status information.

At step S3210, the device management service module 3210 may request the GIS management service module 3220 to search for external devices in the selection area by a GIS engine. Then, at step S3220, the GIS management service module 3220 may request the database framework module 3230 to provide identification (ID) information of the external devices in the selected area. Here, the external device ID information is device information that can uniquely distinguish external devices from each other, and may be, but not limited to, a device serial number, a device UID, a manufacture number, and the like.

At step S3230, the GIS management service module 3220 may receive, from the database framework module 3230, the external device ID information extracted from the selection area. At step S3240, the GIS management service module 3220 may deliver the external device ID information (e.g., the extracted device list) to the device management service module 3210.

At step S3250, the device management service module 3210 may extract the control related information, namely, the control function information, the control function attribute information, and the control status information with respect to the external device ID information. At step S3260, the device management service module 3210 may deliver the received external device ID information (e.g., the extracted device list) and the extracted control related information (e.g., the control function information, the control function attribute information, and the control status information) to the mobile application 3200.

At step S3270, the mobile application 3200 may display the received external device ID information and the received control related information on the portable electronic device or the wearable electronic device.

Figure 33:
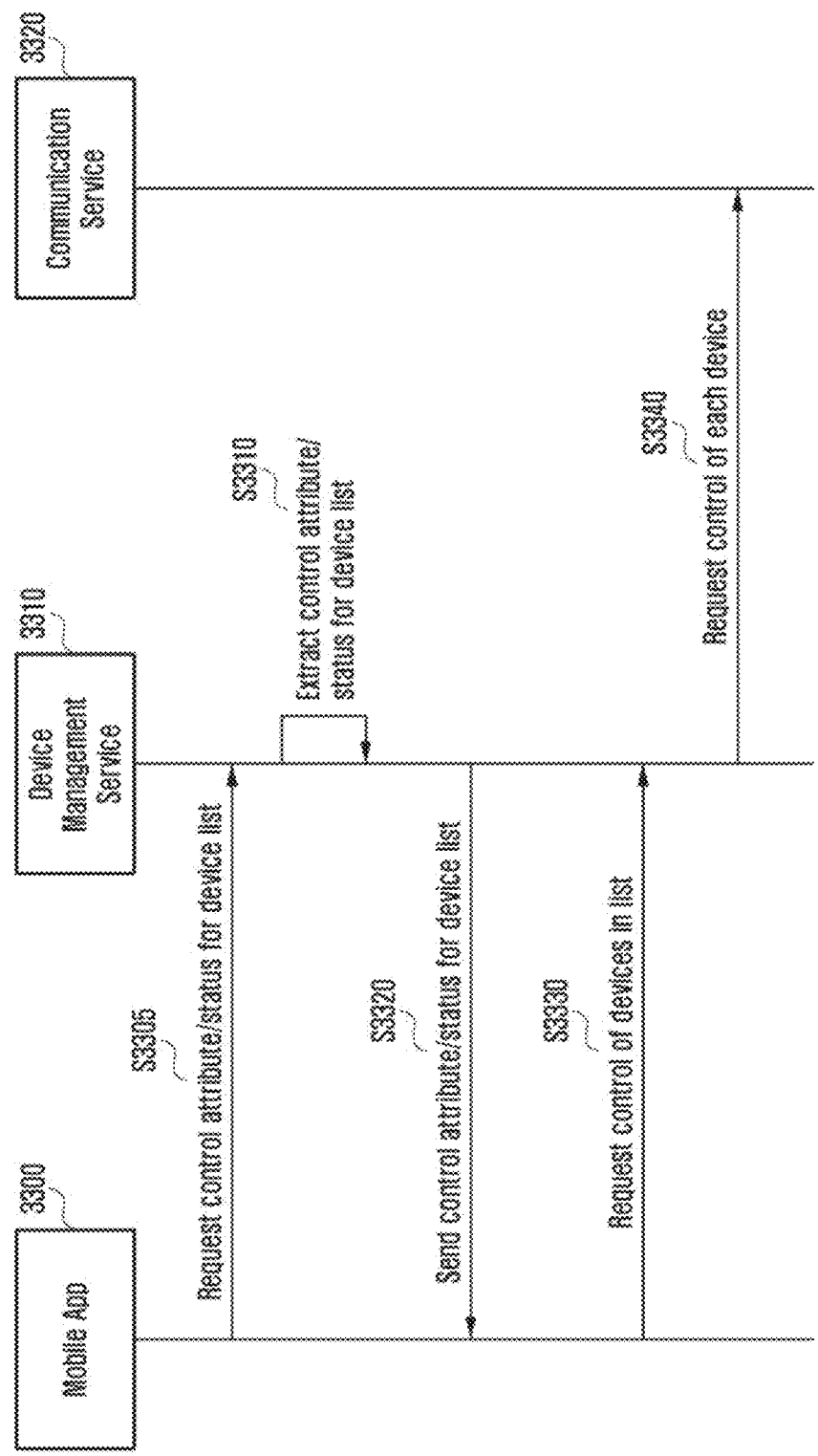
FIG. 33 is a sequence diagram illustrating a flow of message packets exchanged between a mobile application installed in a portable or wearable electronic device and a server through communication in case of controlling one or more external devices according to an embodiment of the present disclosure.

FIG. 33 is a sequence diagram illustrating a flow of message packet exchanged between a mobile application installed in a portable or wearable electronic device and a server through communication in case of controlling one or more external devices according to an embodiment of the present disclosure.

The portable electronic device (or wearable electronic device) according to embodiments of the present disclosure may communicate with servers 3310 and 3320 by executing a mobile application 3300 installed therein.

The servers 3310 and 3320 may include a device management service module 3310 and a communication service module 3320. Such modules may be integrated into a single server, or may be configured as separate independent modules.

Referring to FIG. 33, at step S3305, the mobile application 3300 may request the device management service module 3310 to provide control function attribute information and control status information about external devices in a selection area.

At step S3310, the device management service module 3310 may extract the control function attribute information about each external device and the control status information regarding a control function attribute. At step S3320, the device management service module 3310 may transmit the extracted information to the mobile application 300. Although not shown in FIG. 33, if the requested information is not stored, or old information that is not updated more than a certain time (e.g., one hour), the device management service module 3320 may send a message of requesting such information to a corresponding external device and receive the requested information from the external device.

At step S3330, the mobile application 3300 may request the device management service module 3310 to perform a detailed control of external devices. At step S3340, the device management service module 3310 may request the communication service module 3320 to control each external device 3320. Although not shown, the communication service module 3320 may deliver such a control request message (i.e., a control command) to each of the external devices, thereby requesting the external devices to change the status of at least one control function attribute.

Figure 34:
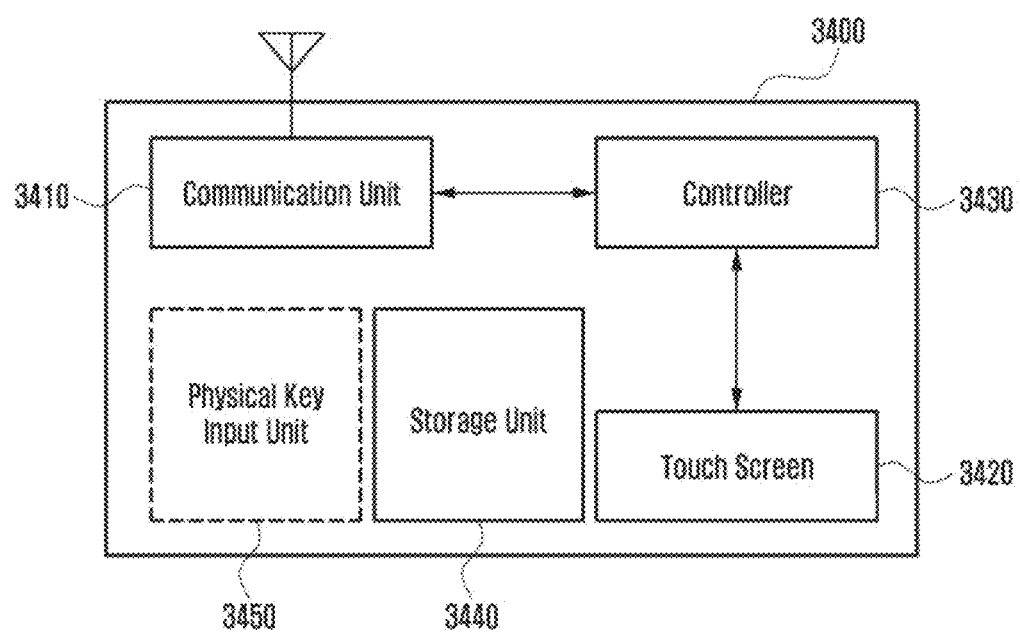
FIG. 34 is a block diagram illustrating a configuration of a portable or wearable electronic device according to an embodiment of the present disclosure.

FIG. 34 is a block diagram illustrating a configuration of a portable or wearable electronic device according to an embodiment of the present disclosure.

As shown in FIG. 34, the portable electronic device or wearable electronic device 3400 according to an embodiment of the present disclosure includes a communication unit (e.g., including communication circuitry) 3410, a touch screen 3420, a controller (e.g., including processing circuitry) 3430, and a storage unit 3440. In particular, the wearable electronic device may further include a physical key input unit (e.g., including a physical input) 3450 including, for example, and without limitation, a bezel, a button, a crown, or the like.

The communication unit 3410 may include various communication circuitry and receive, from a server, external device location information related to a plurality of external devices and spatial information (e.g., map).

The touch screen 3420 may display the external device location information, the spatial information, and at least one selection area. In addition, the touch screen 3420 may receive a first touch input for selecting at least one external device from the displayed external device location information, and also receive a second touch input for controlling the selected at least one external device.

The controller 3430 may include various processing circuitry and control the communication unit 3410 and the touch screen 3420.

In response to the first touch input, the controller 3430 may control the touch screen 3420 to change the size of the selection area and to display the size-changed selection area. Also, the controller 3430 may select at least one external device location information included in the changed selection area.

In addition, the controller 3430 may control the touch screen 3420 to display external device type information, control function information, control function attribute information, and control status information regarding the selected at least one external device location information. Also, in response to the second touch input, the controller 3430 may change the control status information of a control function attribute for at least one control function, and control the touch screen 3420 to display the changed control status information.

The control information may be common control function attribute information for external devices of different types.

In addition, the controller 3430 may change the size of the selection area to include all of the at least one external device in response to the first touch input. Also, when the first touch input is released, the controller 3430 may control the size-changed selection area to be displayed with a predetermined size at a predetermined position in the spatial information.

The touch screen 3420 may receive a third touch input for the selection area to move the selection area in the spatial information and/or receive a fourth touch input for an outer area of the selection area to select at least one external device included in the outer area.

In addition, the touch screen 3420 may receive a fifth touch input for the selection area to change the shape of the selection area to another predetermined shape.

The controller 3430 may select the external device type information for the at least one external device, and control the touch screen 3420 to display the control function information, the control function attribute information, and the control status information corresponding to the selected external device type information.

If the selected external device type information indicates the external devices of different types, the control function attribute information may be common control attribute information for collectively controlling the at least one external device.

The portable electronic device or wearable electronic device according to another embodiment of the present disclosure may include the communication unit 3410 that receives location information related to a plurality of external devices from a server, the touch screen 3420 that displays a selection area for at least one external device in spatial information (e.g., map) based on the location information and receiving a touch input from a user, at least one physical key input unit 3450 including various physical inputs that receives a first input for changing a size of the selection area to select at least one of the plurality of external devices and also receives a second input for controlling the selected at least one external device, and a controller 3430 that controls the communication unit 3410 and the touch screen 3420 in response to the first and second inputs.

The first input may be an input for a first physical key, and the second input may be an input for a second physical key. Each of the first and second physical keys may be a crown, a bezel, a button, and the like provided in the wearable electronic device.

While the present disclosure has been illustrated and described with reference to various example embodiments thereof, it is clearly understood that the same is by way of illustration and example only and is not limiting. It will be understood by those skilled in the art that various changes in form and details may be made therein without departing from the subject matter and scope of the present disclosure.

What is claimed is:

1. A smart watch for selecting and controlling an external device comprising:
   a display;
   communication circuitry; and
   a processor, wherein the processor is configured to:
   receive, from a server, location information for a plurality of external devices through the communication circuitry;
   identify spatial information which is in a form of digital image based on the location information for the plurality of external devices;
   display the spatial information and a selection area within the spatial information on the display;
   obtain a first input for a size of the displayed selection area;
   based on the first input, change the size of the displayed selection area to select at least one of the external devices located within the changed selection area;
   obtain a second input for controlling the at least one external device; and
   transmit a control information corresponding to the second input through the communication circuitry.

2. The smart watch of claim 1, wherein the processor is further configured to:
   change at least one of the size, a shape or a position of the displayed selection area in response to the first input; and
   select the location information of the at least one external device displayed in the changed selection area.

3. The smart watch of claim 2, wherein when the first input is released after at least one of the size, a shape or a position of the displayed selection area is changed in response to the first input, the displayed spatial information is scaled down or up such that the changed selection area is displayed with a predetermined size at a predetermined position corresponding to the initially displayed selection area.

4. The smart watch of claim 2, wherein when the location information of the at least one external device is selected, at least one of: external device type information, control function information, control function attribute information, or current control status information for the at least one external device is displayed.

5. The smart watch of claim 4, wherein the processer is further configured to:
   change the current control status information for the control function attribute information displayed on the display in response to the second input; and
   generate a control information for the at least one external device corresponding to the changed control status information.

6. The smart watch of claim 5, wherein the second input comprises a rotate input for the selection area.

7. The smart watch of claim 2, wherein when the location information of the selected at least one external device includes location information of a plurality of external devices of different types, common control function attribute information for the plurality of external devices of different types is displayed on the display.

8. The smart watch of claim 7, wherein the common control function attribute information includes information for collectively turning on or off power of the at least one external device, and the power of the at least one external device is collectively turned on or off in response to the second input.

9. The smart watch of claim 1, wherein the first and second inputs are received via a physical input module comprising at least one of: a crown or a bezel.

10. The smart watch of claim 9 wherein the first input includes at least one of: a crown rotate input or a bezel rotate input.

11. An electronic device for selecting and controlling an external device comprising:
    a touch screen;
    communication circuitry;
    a processor, wherein the processor is configured to:
    receive, from a server, location information for a plurality of external devices via the communication circuitry;
    identify spatial information which is in a form of digital image based on the location information for the plurality of external devices;
    display the spatial information on the touch screen;
    obtain a first touch input for determining a shape of a selection area displayed within the spatial information;
    based on the first touch input, select at least one of the external devices located within the determined the shape of the selection area;
    obtain a second touch input for controlling the at least one external device; and
    transmit a control information corresponding to the second touch input via the communication circuitry.

12. The electronic device of claim 11, wherein the processor is further configured to:
    identify at least one of a size, the shape or a position of the selection area in response to the first touch input; and
    select the location information of the at least one external device displayed in the determined selection area.

13. The electronic device of claim 12, wherein the first touch input comprises a drawing input for the selection area.

14. The electronic device of claim 13, wherein when the first touch input is released after at least one of the size, the shape or the position of the displayed selection area is determined in response to the first touch input, the displayed spatial information is scaled down or up such that the determined selection area is displayed with a predetermined size at a predetermined position corresponding to the initially displayed selection area.

15. The electronic device of claim 12, wherein when the location information of the at least one external device is selected, at least one of:
external device type information, control function information, control function attribute information, or current control status information for the at least one external device is displayed.

16. The electronic device method of claim 15, wherein the processor is further configured to:
change the current control status information for the control function attribute information displayed on the touch screen in response to the second touch input; and
generate a control information for the at least one external device corresponding to the changed control status information.

17. The electronic device of claim 16, wherein the second touch input comprises a rotate touch input for the selection area.

18. The electronic device of claim 12, wherein when the location information of the selected at least one external device includes location information of a plurality of external devices of different types, common control function attribute information for the plurality of external devices of different types is displayed on the touch screen.

19. The electronic device of claim 18, wherein the common control function attribute information includes information for collectively turning on or off power of the at least one external device, and the power of the at least one external device is collectively turned on or off in response to the second touch input.

20. The electronic device of claim 11, wherein the first touch input includes a plurality of touch inputs,
wherein the selection area includes a plurality of selection areas according to the plurality of touch inputs.

* * * * *